(12) United States Patent
Aoshima et al.

(10) Patent No.: US 9,145,497 B2
(45) Date of Patent: Sep. 29, 2015

(54) COLORANT-CONTAINING PARTICLES, COLORANT-CONTAINING PARTICLE DISPERSION, AND POLYMER COMPOUND

(71) Applicant: FUJIFILM Corporation, Tokyo (JP)

(72) Inventors: Toshihide Aoshima, Ashigarakami-gun (JP); Takashi Katoh, Ashigarakami-gun (JP); Hidenori Takahashi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/175,173

(22) Filed: Feb. 7, 2014

(65) Prior Publication Data

US 2014/0163148 A1 Jun. 12, 2014

Related U.S. Application Data

(63) Continuation of application No. PCT/JP2012/070955, filed on Aug. 20, 2012.

(30) Foreign Application Priority Data

Aug. 26, 2011 (JP) .................................. 2011-184367

(51) Int. Cl.
| C08L 33/04 | (2006.01) |
| G02F 1/167 | (2006.01) |
| C08K 9/04 | (2006.01) |
| C09B 69/10 | (2006.01) |
| C08K 5/5419 | (2006.01) |
| C08F 290/06 | (2006.01) |

(52) U.S. Cl.
CPC .............. *C08L 33/04* (2013.01); *C08F 290/068* (2013.01); *C08K 5/5419* (2013.01); *C08K 9/04* (2013.01); *C09B 69/10* (2013.01); *G02F 1/167* (2013.01)

(58) Field of Classification Search
CPC . G02F 1/167; G02F 2001/1678; G09G 3/344; C08K 9/04; C08K 5/5419; C08L 33/00; C08L 33/04; C08L 83/04; C09B 67/0013; C09B 67/009; C09B 69/10
See application file for complete search history.

(56) References Cited

U.S. PATENT DOCUMENTS

| 6,858,164 | B2 | 2/2005 | Yanagisawa |
| 8,076,392 | B2 | 12/2011 | Shimohara et al. |
| 2002/0146572 | A1 | 10/2002 | Yanagisawa |
| 2004/0265756 | A1* | 12/2004 | Horie .............................. 430/434 |
| 2005/0270628 | A1* | 12/2005 | Miyazaki et al. .............. 359/296 |
| 2008/0241485 | A1* | 10/2008 | Shimohara et al. ......... 428/195.1 |
| 2009/0268274 | A1* | 10/2009 | Masuzawa et al. ............ 359/296 |

FOREIGN PATENT DOCUMENTS

| JP | 2002-338642 A | 11/2002 |
| JP | 2008-222843 A | 9/2008 |
| JP | 2009-138172 A | 6/2009 |
| JP | 2009-215381 A | 9/2009 |
| JP | 2011-27781 A | 2/2011 |

OTHER PUBLICATIONS

Japanese Office Action dated Nov. 11, 2014, which issued in corresponding Japanese Patent Application No. 2011-184367.
International Preliminary Report on Patentability dated Mar. 13, 2014, issued in PCT/JP2012/070955 (Forms PCT/IB/338, PCT/IB/373, PCT/ISA/237, PCT/IB/326).
International Search Report, issued in PCT/JP2012/070955, dated, Nov. 20, 2012.
Writtten Opinion of the International Searching Authority, issued in PCT/JP2012/070955, dated, Nov. 20, 2012.

* cited by examiner

*Primary Examiner* — Satya Sastri
(74) *Attorney, Agent, or Firm* — Birch, Stewart, Kolasch & Birch, LLP

(57) ABSTRACT

A colorant-containing particle that comprises a colorant and a polymer represented by $(A^1-R^2)_n-R^1-(R^3-P^1)_m$ wherein $R^1$ is organic linking group; $R^2$ is single bond or divalent linking group; $A^1$ is monovalent organic group containing organic dye residue etc., m is 1 to 8, n is 2 to 9, m+n is 3 to 10; $R^3$ is single bond or divalent linking group; $P^1$ is polymer backbone containing Si, has excellent dispersibility and dispersion stability.

10 Claims, No Drawings

COLORANT-CONTAINING PARTICLES, COLORANT-CONTAINING PARTICLE DISPERSION, AND POLYMER COMPOUND

CROSS-REFERENCE TO RELATED APPLICATIONS

This application is a continuation application of International Application No. PCT/JP2012/070955, filed Aug. 20, 2012, which in turn claims the benefit of priority from Japanese Application No. 2011-184367, filed Aug. 26, 2011, the disclosures of which Applications are incorporated by reference herein in their entirety.

BACKGROUND OF THE INVENTION

1. Field of the Invention

The present invention relates to colorant-containing particles useful for various applications, and to dispersions containing same. The present invention also relates to polymer compounds useful for various applications, including dispersants.

2. Background Art

Electrophoretic display media, a type of memory displays, have been actively studied. For display, this display mode uses charged particles (electrophoretic particles), and applies an electric field to, for example, a cell sealing the electrophoretic particles and a dispersion medium between a pair of electrode substrates to alternately move the electrophoretic particles toward and away from the viewing surface and the back face.

The particles (electrophoretic particles) constitute an important factor in this technique, and various techniques have been developed. For example, various additives, such as dispersants, have been proposed to suppress aggregation of the electrophoretic particles. Dispersants having different charge polarity from the charge polarity of the particles are also proposed to improve the charge stability of the electrophoretic particles (for example, Patent Documents 1 and 2).

Patent Documents 1 and 2 disclose polymers produced by copolymerizing a monomer having an acidic group or a basic group, and a silicon-containing monomer. These publications also disclose adding the polymer to, for example, a display particle dispersion containing a silicone oil.

CITATION LIST

Patent Document

Patent Document 1: JP-A-2002-338642
Patent Document 2: JP-A-2011-27781

SUMMARY OF THE INVENTION

However, sufficient dispersibility cannot be obtained with the polymers described in Patent Documents 1 and 2, and the initial viscosity of the dispersion tends to be high. Further, dispersion stability is insufficient, and the dispersion viscosity considerably increases over time.

The present invention has been made to solve the foregoing problems. Specifically, it is an object of the present invention to provide a colorant-containing particle and a color-containing particle dispersion having excellent dispersibility and dispersion stability, and polymer compounds useful as, for example, dispersants that contribute to improving the dispersibility and the dispersion stability of the particles.

The present inventors conducted intensive studies to investigate the reasons for the insufficient dispersibility of the polymers of Patent Documents 1 and 2, and found that this shortcoming was due to the random presence of an acidic group or a basic group in the polymer, weakening the compatibility between the polymer and a dispersion medium, and also due to the steric effects of the predetermined silicon-containing constituting unit, weakening the compatibility between colorant-containing particles and the polymer.

After further studies, the present inventors found that a polymer having a plurality of terminal structures or terminal functional groups with particle adsorbability was highly effective at improving dispersibility and the dispersion stability of the dispersed particles when used as a particle dispersant. It was also found that a structurally less restricted polymer, free from steric repulsion, can be easily synthesized when such structures or functional groups are introduced to the polymer terminal with the use of a multifunctional mercaptan compound. The present invention was completed on the basis of these findings after further studies.

Specifically, the foregoing object is achieved by using the following means.

[1] A colorant-containing particle that comprises a colorant and a first polymer represented by the following formula (1):

wherein $R^1$ represents an (m+n)-valent organic linking group; $R^2$ each represents a single bond or a divalent linking group; $A^1$ each represents a monovalent organic group containing at least one selected from the group consisting of an organic dye residue, a heterocyclic residue, an acidic group, a group having a basic nitrogen atom, a urea group, a urethane group, a group having a coordinating oxygen atom, a hydrocarbon group of 4 or more carbon atoms, an alkoxysilyl group, an epoxy group, an isocyanate group, and a hydroxyl group; n groups of $A^1$ may be the same or different; n groups of $R^2$ may be the same or different; m represents a number from 1 to 8, n represents a number from 2 to 9, wherein m+n satisfies 3 to 10; $R^3$ each represents a single bond or a divalent linking group; $P^1$ represents a polymer backbone containing a Si atom, and may include a plurality of constituting units; m groups of $R^3$ may be the same or different; and m groups of $P^1$ may be the same or different.

[2] The colorant-containing particle of [1], further comprising a second polymer having a charged group.

[3] The colorant-containing particle of [1] or [2], wherein $A^1$ in the formula (1) is an acidic group, and the charged group of the second polymer is a basic group.

[4] The colorant-containing particle of [1] or [2], wherein $A^1$ in the formula (1) is a basic group, and the charged group of the second polymer is an acidic group.

[5] The colorant-containing particle of any one of [1] to [4], wherein the first polymer has a constituting unit derived from a silicone macromer having a weight-average molecular weight of 1,000 to 10,000.

[6] The colorant-containing particle of any one of [1] to [5], wherein $P^1$ in the formula (1) is a polymer backbone represented by the following formula (2):

wherein $P^2$ represents a constituting unit derived from a silicone macromer; $P^3$ represents a constituting unit that does not contain silicone, and that does not have an ionically dissociable group; $P^4$ represents a constituting unit that does not contain silicone, and that has an ionically dissociable group;

x, y, and z each represent a molar fraction of the constituting unit, and x+y+z=100 wherein y and z may be 0, but are not simultaneously 0.

[7] The colorant-containing particle of any one of [1] to [6], wherein, in the formula (2), x is 10 to 30, y is 10 to 30, and z is 40 to 80.

[8] The colorant-containing particle of any one of [1] to [7], wherein the colorant-containing particle is an electrophoretic particle.

[9] A colorant-containing particle dispersion that comprises the colorant-containing particle of any one of [1] to [8], and a dispersion medium.

[10] The colorant-containing particle dispersion of [9], wherein the dispersion medium contains at least one selected from silicone oil and paraffinic hydrocarbon.

[11] A polymer compound represented by the following formula (1'):

$$(A^1\text{-}R^4\text{—}S)_n\text{—}R^1\text{—}(R^3\text{—}P^1)_m \qquad (1')$$

wherein $R^1$ represents an (m+n)-valent organic linking group; $R^4$ each represents a single bond or a divalent linking group; S represents a sulfur atom; $A^1$ each represents a monovalent organic group containing at least one selected from the group consisting of an organic dye residue, a heterocyclic residue, an acidic group, a group having a basic nitrogen atom, a urea group, a urethane group, a group having a coordinating oxygen atom, a hydrocarbon group of 4 or more carbon atoms, an alkoxysilyl group, an epoxy group, an isocyanate group, and a hydroxyl group; n groups of $A^1$ may be the same or different; n groups of $R^4$ may be the same or different; m represents a number from 1 to 8, n represents a number from 2 to 9, wherein m+n satisfies 3 to 10; $R^3$ each represents a single bond or a divalent linking group; $P^1$ represents a polymer backbone containing a Si atom, and may include a plurality of constituting units; m groups of $R^3$ may be the same or different; m groups of $P^1$ may be the same or different and are a polymer backbone represented by the following formula (2):

$$\text{—}(P^2)_x\text{—}(P^3)_y\text{—}(P^4)_z \qquad (2)$$

wherein $P^2$ represents a constituting unit derived from a silicone macromer; $P^3$ represents a constituting unit that does not contain silicone, and that does not have an ionically dissociable group; $P^4$ represents a constituting unit that does not contain silicone, and that has an ionically dissociable group; x, y, and z each represent a molar fraction of the constituting unit, and x+y+z=100, wherein y and z may be 0, but are not simultaneously 0.

The present invention can provide a colorant-containing particle and a color-containing particle dispersion having excellent dispersibility and dispersion stability, and polymer compounds useful as, for example, dispersants that contribute to improving the dispersibility and the dispersion stability of the particles.

MODE FOR CARRYING OUT THE INVENTION

The present invention is described below in detail.

1. Colorant-Containing Particle

The present invention is concerned with a colorant-containing particle that includes at least a colorant, and a first polymer represented by the formula (1) below. The colorant-containing particle of the present invention is configured to include the colorant and the first polymer, and, as required, other materials (for example, a second polymer described later). The state of the colorant and the first polymer in the particle is not particularly limited. The colorant may be dispersed and mixed in the first polymer, or the particle surface

of the colorant may be coated with the first polymer. Further, the colorant may be surrounded by other materials (for example, a second polymer, described later), and the first polymer may be adsorbed to the surface of such materials.

(1) First Polymer Represented by Formula (1)

The first polymer represented by the formula (1) below has $A^1$ at the polymer terminal, specifically a plurality of monovalent organic groups that includes at least one group selected from an organic dye residue, a heterocyclic residue, an acidic group, a group having a basic nitrogen atom, a urea group, a urethane group, a group having a coordinating oxygen atom, a hydrocarbon group of 4 or more carbon atoms, an alkoxysilyl group, an epoxy group, an isocyanate group, and a hydroxyl group. The first polymer thus has various characteristics, including high adsorption performance for solid surface, excellent micelle formation, and high surface activity. For example, when used as a dispersant for particles such as pigments, the first polymer contributes to improving the dispersibility and the dispersion stability of the particles. The first polymer is particularly effective for a silicone oil or paraffinic hydrocarbon dispersion medium.

The first polymer may be uniformly and evenly contained in the particles, or may be localized by being unevenly distributed in the particles, as long as the first polymer is contained in the colorant-containing particles. Preferably, the first polymer is adsorbed to the outermost surface of the colorant-containing particles from the standpoint of dispersibility and dispersion stability.

$$(A^1\text{-}R^2)_n\text{—}R^1\text{—}(R^3\text{—}P^1)_m \qquad (1)$$

In the formula, $R^1$ represents an (m+n)-valent organic linking group; $R^2$ each represents a single bond or a divalent organic linking group; $A^1$ each represents a monovalent organic group containing at least one group selected from an organic dye residue, a heterocyclic residue, an acidic group, a group having a basic nitrogen atom, a urea group, a urethane group, a group having a coordinating oxygen atom, a hydrocarbon group of 4 or more carbon atoms, an alkoxysilyl group, an epoxy group, an isocyanate group, and a hydroxyl group; $A^1$ and $R^2$ with the subscript n each independently may be the same or different; m represents a number from 1 to 8, and n represents a number from 2 to 9, wherein m+n satisfies 3 to 10; $R^3$ each represents a single bond or a divalent linking group; and $P^1$ represents a polymer backbone containing a Si atom, and may include a plurality of constituting units, wherein $R^3$ and $P^1$ with the subscript m each independently may be the same or different.

In the formula (1), $A^1$ each represents a monovalent organic group containing at least one group selected from an organic dye residue, a heterocyclic residue, an acidic group, a group having a basic nitrogen atom, a urea group, a urethane group, a group having a coordinating oxygen atom, a hydrocarbon group of 4 or more carbon atoms, an alkoxysilyl group, an epoxy group, an isocyanate group, and a hydroxyl group. $A^1$ with the subscript n may be the same or different.

The organic group represented by $A^1$ preferably has adsorbability for the colorant, or adsorbability for materials (for example, a second polymer, described later) surrounding the colorant, when such materials exist. Note that the term "adsorption moiety" will be used as appropriate to refer to a moiety ($A^1$ itself, or a functional group contained in $A^1$) having adsorbability for the colorant and other materials.

$A^1$ may have a single adsorption moiety, or a plurality of adsorption moieties. When a plurality of adsorption moieties exists, these may be the same or different.

$A^1$ is, for example, a monovalent organic group that results from the bonding of the adsorption moiety and an organic linking group configured from 1 to 200 carbon atoms, 0 to 20 nitrogen atoms, 0 to 20 nitrogen atoms, 0 to 100 oxygen atoms, 1 to 400 hydrogen atoms, and 0 to 40 sulfur atoms. When the adsorption moiety can configure the monovalent organic group by itself, the adsorption moiety itself may be the monovalent organic group represented by $A^1$.

Examples of the organic dye residue represented by $A^1$ include phthalocyanine, insoluble azo, azolake, anthraquinone, quinacridone, dioxazine, diketopyrrolopyrrole, anthrapyridine, anthanthrone, indanthrone, flavanthrone, perinone, perylene, and thioindigo dye residues, of which phthalocyanine, azolake, anthraquinone, dioxazine, and diketopyrrolopyrrole dye residues are more preferred, and phthalocyanine, anthraquinone, and diketopyrrolopyrrole dye residues are particularly preferred.

Examples of the heterocyclic residue represented by $A^1$ include thiophene, furan, xanthene, pyrrole, pyrroline, pyrrolidine, dioxolan, pyrazole, pyrazoline, pyrazolidine, imidazole, oxazole, triazole, oxadiazole, triazole, thiadiazole, pyran, pyridine, piperidine, dioxane, morpholine, pyridazine, pyrimidine, piperazine, triazine, trithiane, isoindoline, isoindolinone, benzimidazolone, benzothiazole, succinimide, phthalimide, naphthalimide, hydantoin, indole, quinoline, carbazole, acridine, acridone, and anthraquinone residues, of which pyrroline, pyrrolidine, pyrazole, pyrazoline, pyrazolidine, imidazole, triazole, pyridine, piperidine, morpholine, pyridazine, pyrimidine, piperazine, triazine, isoindoline, isoindolinone, benzimidazolone, benzothiazole, succinimide, phthalimide, naphthalimide, hydantoin, carbazole, acridine, acridone, and anthraquinone residues are more preferred.

The organic dye residue and the heterocyclic residue each may include one or more substituents. Examples of such substituents include alkyl of 1 to 20 carbon atoms such as methyl, and ethyl; aryl of 6 to 16 carbon atoms such as phenyl, and naphthyl; hydroxyl, amino, carboxyl, sulfoneamide, N-sulfonylamide, acyloxy of 1 to 6 carbon atoms such as alkoxy of 1 to 20 carbon atoms such as methoxy, and ethoxy; halogen atoms such as chlorine, and bromine; alkoxycarbonyl of 2 to 7 carbon atoms such as methoxycarbonyl, ethoxycarbonyl, and cyclohexyloxycarbonyl; cyano, and carbonate esters such as t-butyl carbonate. These substituents may be attached to the organic dye residue or the heterocyclic residue via a linking group configured from the structural unit below, or a combination of the structural units.

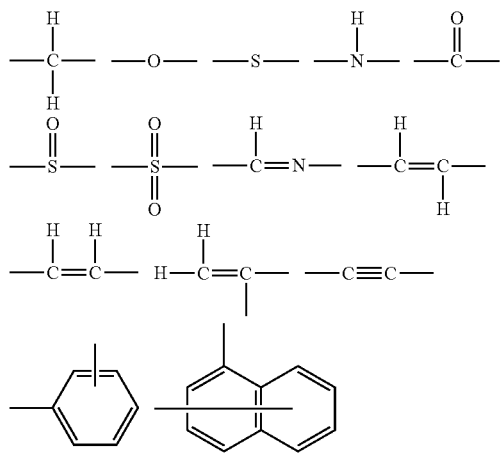

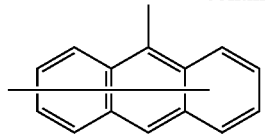

Examples of the acidic group represented by $A^1$ include a carboxylic acid group, a sulfonic acid group, a monosulfuric acid ester group, a phosphoric acid group, a monophosphoric acid ester group, and a boric acid group. A carboxylic acid group, a sulfonic acid group, a monosulfuric acid ester group, a phosphoric acid group, and a monophosphoric acid ester group are more preferred, and a carboxylic acid group, a sulfonic acid group, and a phosphoric acid group are particularly preferred.

Examples of the group having a basic nitrogen atom represented by $A^1$ include amino (—$NH_2$), substituted imino (—$NHR^8$, —$NR^9R^{10}$, wherein $R^8$, $R^9$, and $R^{10}$ each independently represent alkyl of 1 to 20 carbon atoms, aryl of 6 or more carbon atoms, or aralkyl of 7 or more carbon atoms), guanidyl represented by the following formula (a1), and amidinyl represented by the following formula (a2).

In the formula (a1), $R^{11}$ and $R^{12}$ each independently represent alkyl of 1 to 20 carbon atoms, aryl of 6 or more carbon atoms, or aralkyl of 7 or more carbon atoms.

In the formula (a2), $R^{13}$ and $R^{14}$ each independently represent alkyl of 1 to 20 carbon atoms, aryl of 6 or more carbon atoms, or aralkyl of 7 or more carbon atoms.

More preferred examples include amino (—$NH_2$), substituted imino (—$NHR^8$, —$NR^9R^{10}$, wherein $R^8$, $R^9$, and $R^{10}$ each independently represent alkyl of 1 to 10 carbon atoms, phenyl, or benzyl), guanidyl represented by the formula (a1) (in the formula (a1), $R^{11}$ and $R^{12}$ each independently represent alkyl of 1 to 10 carbon atoms, phenyl, or benzyl), and amidinyl represented by the formula (a2) (in the formula (a2), $R^{13}$ and $R^{14}$ each independently represent alkyl of 1 to 10 carbon atoms, phenyl, or benzyl).

Particularly preferred examples include amino (—$NH_2$), substituted imino (—$NHR^8$, —$NR^9R^{10}$, wherein $R^8$, $R^9$, and $R^{10}$ each independently represent alkyl of 1 to 5 carbon atoms, phenyl, or benzyl), guanidyl represented by the formula (a1) (in the formula (a1), $R^{11}$ and $R^{12}$ each independently represent alkyl of 1 to 5 carbon atoms, phenyl, or benzyl), and amidinyl represented by the formula (a2) (in the formula (a2), $R^{13}$ and $R^{14}$ each independently represent alkyl of 1 to 5 carbon atoms, phenyl, or benzyl).

Examples of the urea group represented by $A^1$ include —$NR^{15}CONR^{16}R^{17}$ (wherein $R^5$, $R^{16}$, and $R^{17}$ each independently represent a hydrogen atom, alkyl of 1 to 20 carbon atoms, aryl of 6 or more carbon atoms, or aralkyl of 7 or more carbon atoms), more preferably —$NR^{15}CONHR^{17}$ (wherein $R^{15}$ and $R^{17}$ each independently represent a hydrogen atom, alkyl of 1 to 10 carbon atoms, aryl of 6 or more carbon atoms, or aralkyl of 7 or more carbon atoms), particularly preferably —NHCONHR$^{17}$ (wherein R$^{17}$ represents a hydrogen atom, alkyl of 1 to 10 carbon atoms, aryl of 6 or more carbon atoms, or aralkyl of 7 or more carbon atoms).

Examples of the urethane group represented by A$^1$ include —NHCOOR$^{18}$, —NR$^{15}$COOR$^{20}$, —OCONHR$^{21}$, —OCONR$^{22}$R$^{23}$ (wherein R$^{18}$, R$^{19}$, R$^{20}$, R$^{21}$, R$^{22}$, and R$^{23}$ each independently represent alkyl of 1 to 20 carbon atoms, aryl of 6 or more carbon atoms, or aralkyl of 7 or more carbon atoms), more preferably —NHCOOR$^{18}$, —OCONHR$^{21}$ (wherein R$^{18}$ and R$^{21}$ each independently represent alkyl of 1 to 20 carbon atoms, aryl of 6 or more carbon atoms, or aralkyl of 7 or more carbon atoms), particularly preferably —NHCOOR$^{18}$, —OCONHR$^{21}$ (wherein R$^{18}$ and R$^{21}$ each independently represent alkyl of 1 to 10 carbon atoms, aryl of 6 or more carbon atoms, or aralkyl of 7 or more carbon atoms).

Examples of the group having a coordinating oxygen atom represented by A$^1$ include acetylacetonate, and crown ether.

Examples of the hydrocarbon group of 4 or more carbon atoms represented by A$^1$ include alkyl of 4 or more carbon atoms, aryl of 6 or more carbon atoms, and aralkyl of 7 or more carbon atoms, more preferably alkyl of 4 to 20 carbon atoms, aryl of 6 to 20 carbon atoms, and aralkyl of 7 to 20 carbon atoms, particularly preferably alkyl of 4 to 15 carbon atoms (for example, octyl, and dodecyl), aryl of 6 to 15 carbon atoms (for example, phenyl, and naphthyl), and aralkyl of 7 to 15 carbon atoms (for example, benzyl).

Examples of the alkoxysilyl group represented by A$^1$ include trimethoxysilyl, and triethoxysilyl.

Preferred examples of the organic linking group bound to the adsorption moiety include a single bond, and an organic linking group formed by 1 to 100 carbon atoms, 0 to 10 nitrogen atoms, 0 to 50 oxygen atoms, 1 to 200 hydrogen atoms, and 0 to 20 sulfur atoms. The organic linking group may be unsubstituted, or may have a substituent.

Specific examples of the organic linking group include the structural units below, and groups configured from a combination of the structural units.

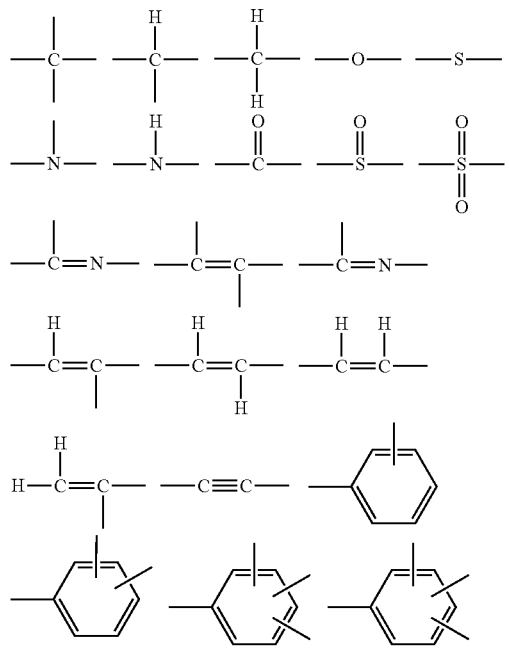

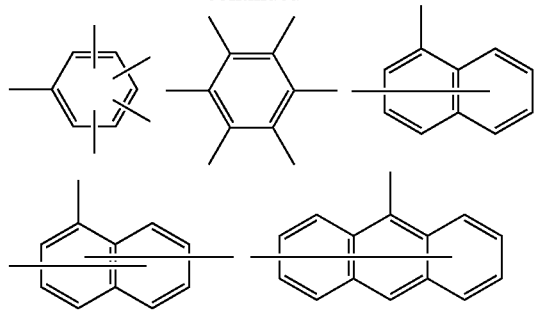

When the organic linking group has a substituent, examples of the substituent include alkyl of 1 to 20 carbon atoms such as methyl, and ethyl; aryl of 6 to 16 carbon atoms such as phenyl, and naphthyl; hydroxyl, amino, carboxyl, sulfoneamide, N-sulfonylamide, acyloxy of 1 to 6 carbon atoms such as acetoxy; alkoxy of 1 to 6 carbon atoms such as methoxy, and ethoxy; halogen atoms such as chlorine, and bromine; alkoxycarbonyl of 2 to 7 carbon atoms such as methoxycarbonyl, ethoxycarbonyl, and cyclohexyloxycarbonyl; cyano, and carbonate esters such as t-butyl carbonate.

Preferably, A$^1$ is a monovalent organic group containing at least one moiety selected from an organic dye residue, a heterocyclic residue, an acidic group, a group having a basic nitrogen atom, a urea group, and a hydrocarbon group of 4 or more carbon atoms.

More preferably, A$^1$ is a monovalent organic group represented by the following formula (3).

$$(B^1)_{\overline{a}}-R^{24}- \qquad (3)$$

In the formula (3), B represents an adsorption moiety (specifically, a moiety selected from an organic dye residue, a heterocyclic residue, an acidic group, a group having a basic nitrogen atom, a urea group, a urethane group, a group having a coordinating oxygen atom, a hydrocarbon group of 4 or more carbon atoms, an alkoxysilyl group, an epoxy group, an isocyanate group, and a hydroxyl group), and R$^{24}$ represents a single bond, or an (a+1)-valent organic linking group. a represents an integer of 1 to 10, and B$^1$ with the subscript a may be the same or different.

Examples and preferred examples of the adsorption moiety represented by B$^1$ include the same functional groups exemplified for the adsorption moiety forming A$^1$ of the formula (1).

Preferred are moieties selected from an organic dye residue, a heterocyclic residue, an acidic group, a group having a basic nitrogen atom, a urea group, and a hydrocarbon group of 4 or more carbon atoms.

R$^{24}$ represents a single bond, or an (a+1)-valent organic linking group, wherein a represents a number from 1 to 10. Preferably, a is 1 to 7, more preferably 1 to 5, particularly preferably 1 to 3.

Examples of the (a+1)-valent organic linking group include groups formed by 1 to 100 carbon atoms, 0 to 10 nitrogen atoms, 0 to 50 oxygen atoms, 1 to 200 hydrogen atoms, and 0 to 20 sulfur atoms. The (a+1)-valent organic linking group may be unsubstituted, or may have a substituent.

Specific examples of the (a+1)-valent organic linking group include the structural units below, and groups configured from a combination of the structural units (a ring structure may be formed).

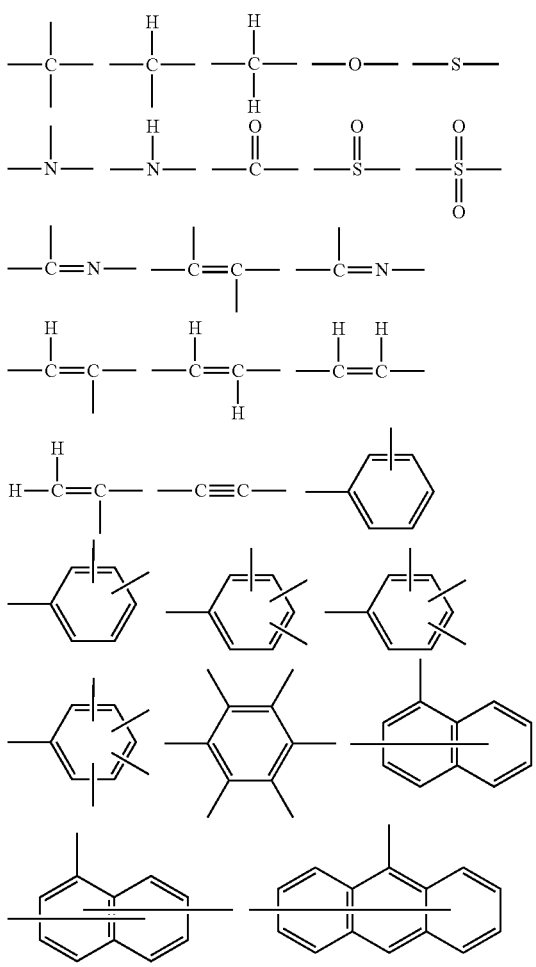

$R^{24}$ is preferably a single bond, or an (a+1)-valent organic linking group formed by 1 to 50 carbon atoms, 0 to 8 nitrogen atoms, 0 to 25 oxygen atoms, 1 to 100 hydrogen atoms, and 0 to 10 sulfur atoms, more preferably a single bond, or an (a+1)-valent organic linking group formed by 1 to 30 carbon atoms, 0 to 6 nitrogen atoms, 0 to 15 oxygen atoms, 1 to 50 hydrogen atoms, and 0 to 7 sulfur atoms, particularly preferably a single bond, or an (a+1)-valent organic linking group formed by 1 to 10 carbon atoms, 0 to 5 nitrogen atoms, 0 to 10 oxygen atoms, 1 to 30 hydrogen atoms, and 0 to 5 sulfur atoms.

When the (a+1)-valent organic linking group has a substituent, examples of the substituent include alkyl of 1 to 20 carbon atoms such as methyl, and ethyl; aryl of 6 to 16 carbon atoms such as phenyl, and naphthyl; hydroxyl, amino, carboxyl, sulfoneamide, N-sulfonylamide, acyloxy of 1 to 6 carbon atoms such as acetoxy; alkoxy of 1 to 6 carbon atoms such as methoxy, and ethoxy; halogen atoms such as chlorine, and bromine; alkoxycarbonyl of 2 to 7 carbon atoms such as methoxycarbonyl, ethoxycarbonyl, and cyclohexyloxycarbonyl; cyano, and carbonate esters such as t-butyl carbonate.

It is particularly preferable that $A^1$ in the first polymer represented by the formula (1) be an acidic group, and the charged group of the second polymer (described later) be a basic group, or that $A^1$ in the first polymer represented by the formula (1) be a basic group, and the charged group of the second polymer (described later) be an acidic group.

In the formula (1), $R^2$ each represents a single bond, or a divalent organic linking group. $R^2$ with the subscript n may be the same or different.

Examples of the divalent organic linking group include groups formed by 1 to 100 carbon atoms, 0 to 10 nitrogen atoms, 0 to 50 oxygen atoms, 1 to 200 hydrogen atoms, and 0 to 20 sulfur atoms. The divalent organic linking group may be unsubstituted, or may have a substituent.

Specific examples of the divalent organic linking group include a structural unit selected from the structural unit group G below, and groups configured from a combination of the structural units.

Structural Unit Group G

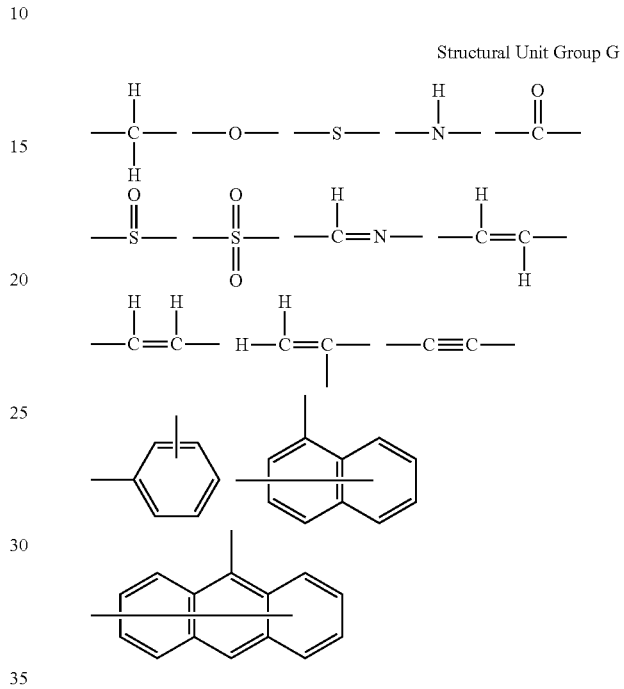

Preferably, $R^2$ is a single bond, or a divalent organic linking group formed by 1 to 50 carbon atoms, 0 to 8 nitrogen atoms, 0 to 25 oxygen atoms, 1 to 100 hydrogen atoms, and 0 to 10 sulfur atoms, more preferably a single bond, or a divalent organic linking group formed by 1 to 30 carbon atoms, 0 to 6 nitrogen atoms, 0 to 15 oxygen atoms, 1 to 50 hydrogen atoms, and 0 to 7 sulfur atoms, particularly preferably a single bond, or a divalent organic linking group formed by 1 to 10 carbon atoms, 0 to 5 nitrogen atoms, 0 to 10 oxygen atoms, 1 to 30 hydrogen atoms, and 0 to 5 sulfur atoms.

Specifically, the polymer compound represented by the following formula (1') represents a preferred example of the first polymer represented by the formula (1).

$$(A^1\text{-}R^4\text{—}S)_n\text{—}R^1\text{—}(R^3\text{—}P^1)_m \quad (1')$$

In the formula, $A^1$, $R^1$, $R^3$, $P^1$, and n and m each have the same definition and preferred ranges as described in formula (1). S represents a sulfur atom, and $R^4$ represents a single bond or a divalent organic linking group. $R^4$ with the subscript n may be the same or different. Examples and preferred forms of the divalent organic linking group represented by $R^4$ include the same divalent organic linking groups and forms exemplified for $R^2$ of the formula (1).

Preferably, $R^4$ is a single bond, or a divalent organic linking group configured from a structural unit selected from the structural unit group G above, or a combination of the structural units, and that is formed by "1 to 10 carbon atoms, 0 to 5 nitrogen atoms, 0 to 10 oxygen atoms, 1 to 30 hydrogen atoms, and 0 to 5 sulfur atoms", wherein the divalent organic linking group may have a substituent, and examples of the substituent include alkyl of 1 to 20 carbon atoms such as methyl, and ethyl; aryl of 6 to 16 carbon atoms such as phenyl, and naphthyl; hydroxyl, amino, carboxyl, sulfoneamide, N-sulfonylamide, acyloxy of 1 to 6 carbon atoms such as acetoxy; alkoxy of 1 to 6 carbon atoms such as methoxy, and ethoxy; halogen atoms such as chlorine, and bromine; alkoxycarbonyl of 2 to 7 carbon atoms such as methoxycarbonyl, ethoxycarbonyl, and cyclohexyloxycarbonyl; cyano, and carbonate esters such as t-butyl carbonate.

In the formulae (1) and (1'), $R^1$ represents an (m+n)-valent organic linking group. m+n satisfies 3 to 10.

Examples of the (m+n)-valent organic linking group represented by $R^1$ include groups formed by 1 to 100 carbon atoms, 0 to 10 nitrogen atoms, 0 to 50 oxygen atoms, 1 to 200 hydrogen atoms, and 0 to 20 sulfur atoms. The (m+n)-valent organic linking group may be unsubstituted, or may have a substituent.

Specific examples of the (m+n)-valent organic linking group include the structural units below, and groups configured from a combination of the structural units (a ring structure may be formed).

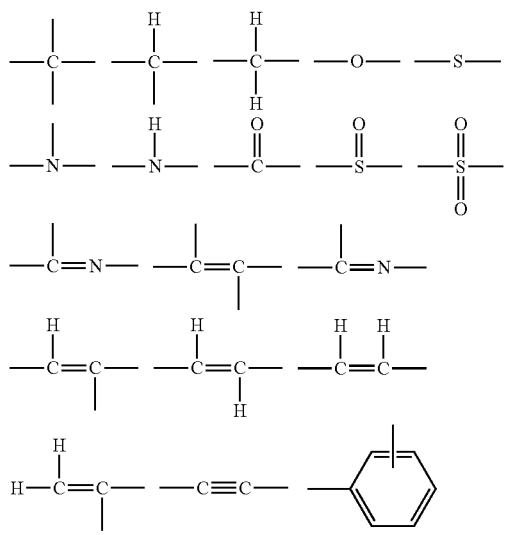

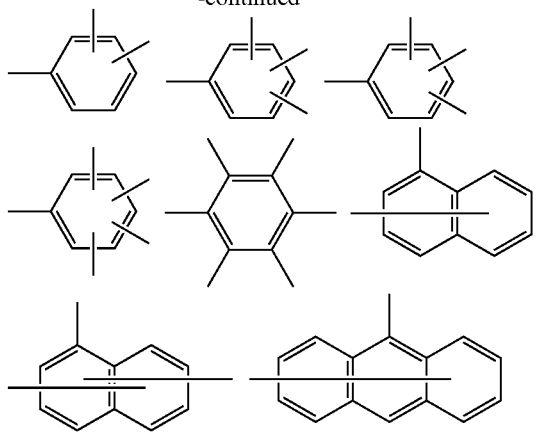

Preferably, the (m+n)-valent organic linking group is a group formed by 1 to 60 carbon atoms, 0 to 10 nitrogen atoms, 0 to 40 oxygen atoms, 1 to 120 hydrogen atoms, and 0 to 10 sulfur atoms, more preferably a group formed by 1 to 50 carbon atoms, 0 to 10 nitrogen atoms, 0 to 30 oxygen atoms, 1 to 100 hydrogen atoms, and 0 to 7 sulfur atoms, particularly preferably a group formed by 1 to 40 carbon atoms, 0 to 8 nitrogen atoms, 0 to 20 oxygen atoms, 1 to 80 hydrogen atoms, and 0 to 5 sulfur atoms.

When the (m+n)-valent organic linking group has a substituent, examples of the substituent include alkyl of 1 to 20 carbon atoms such as methyl, and ethyl; aryl of 6 to 16 carbon atoms such as phenyl, and naphthyl; hydroxyl, amino, carboxyl, sulfoneamide, N-sulfonylamide, acyloxy of 1 to 6 carbon atoms such as acetoxy; alkoxy of 1 to 6 carbon atoms such as methoxy, and ethoxy; halogen atoms such as chlorine, and bromine; alkoxycarbonyl of 2 to 7 carbon atoms such as methoxycarbonyl, ethoxycarbonyl, and cyclohexyloxycarbonyl; cyano, and carbonate esters such as t-butyl carbonate.

Specific examples of the (m+n)-valent organic linking group represented by $R^1$ are presented below as specific examples (1) to (17). It should be noted that the following examples do not limit the present invention.

(1)
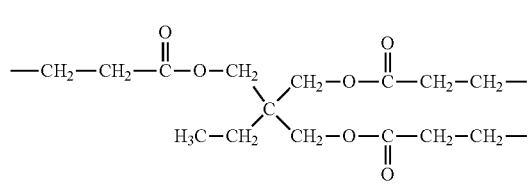

(2)
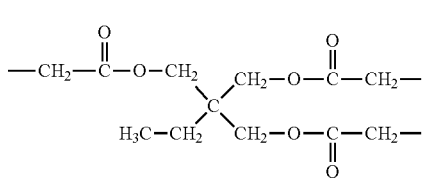

(3)
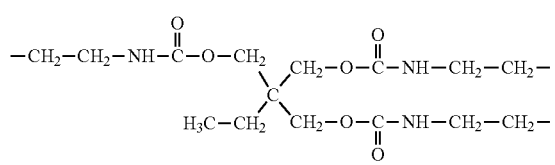

(4)
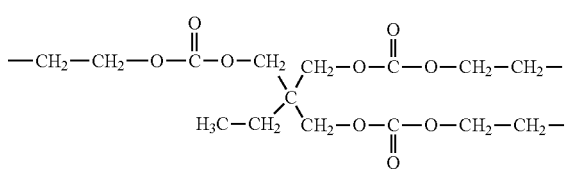

(5)
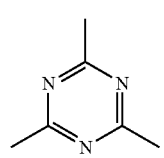

(6)
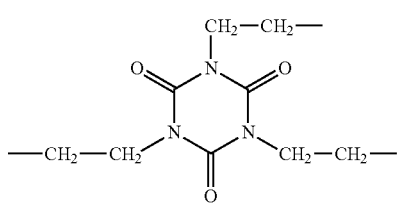

-continued
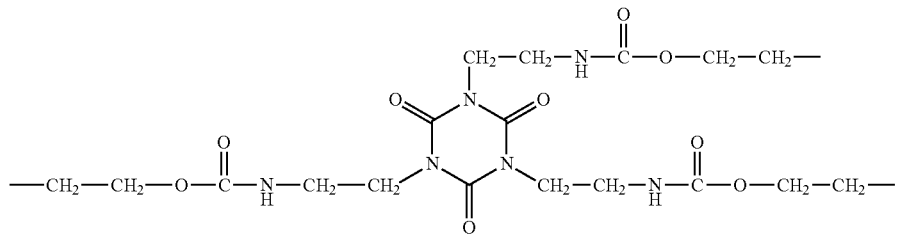
(7)
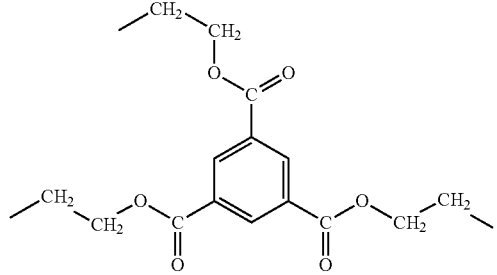
(8)
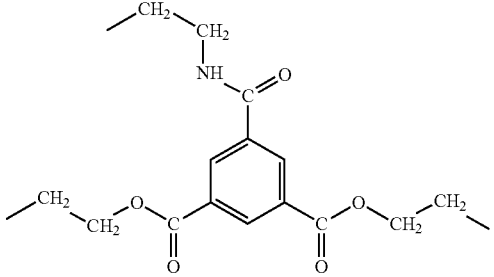
(9)
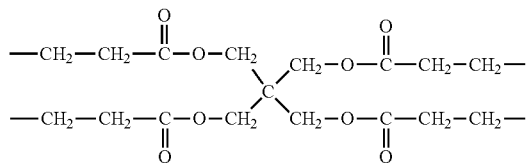
(10)
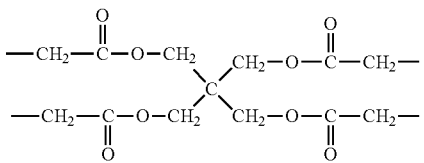
(11)
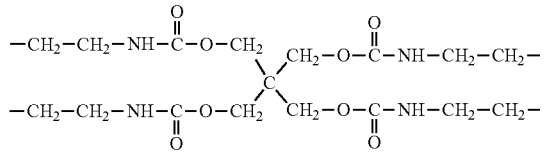
(12)
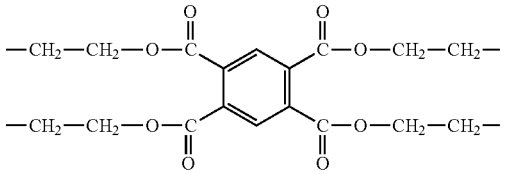
(13)
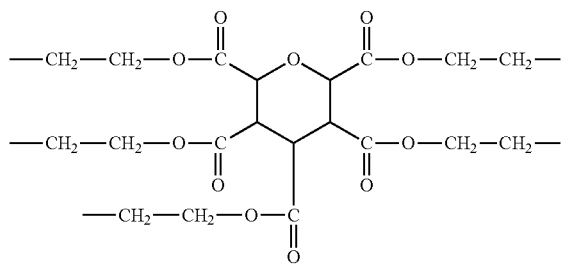
(14)
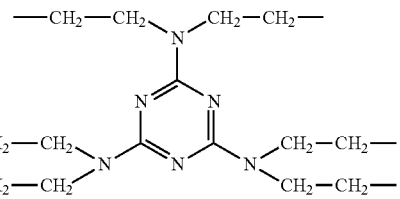
(15)
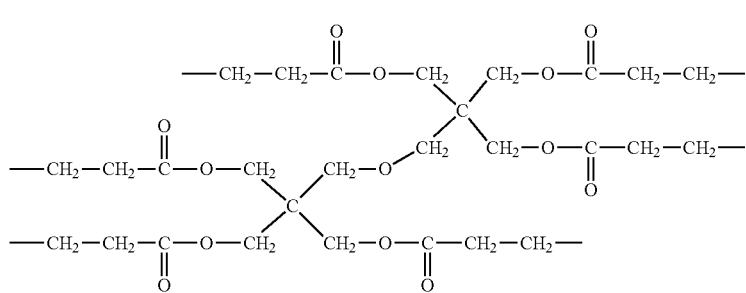
(16)

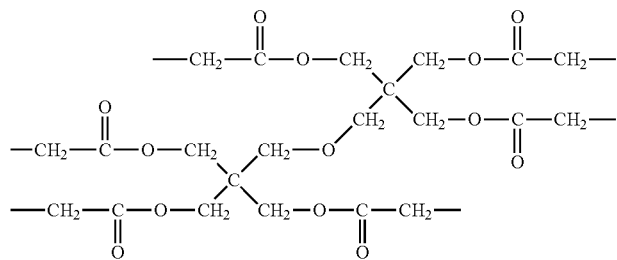
(17)

Of these specific examples, the (m+n)-valent organic linking groups below are most preferred from the availability of the raw materials, ease of synthesis, and solubility in various solvents.

may be the same or different. Examples of the divalent linking group represented by $R^3$ include the same divalent linking groups exemplified for $R^2$. $R^3$ is preferably a single bond or —S—.

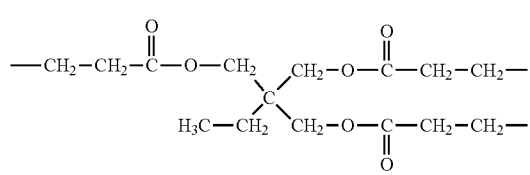
(1)

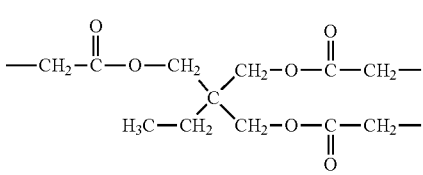
(2)

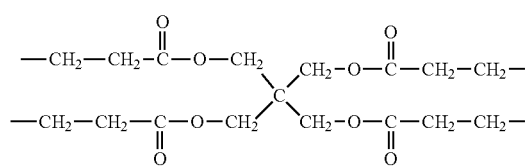
(10)

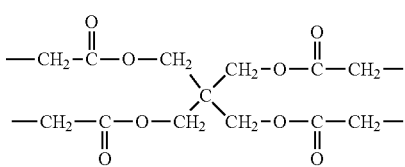
(11)

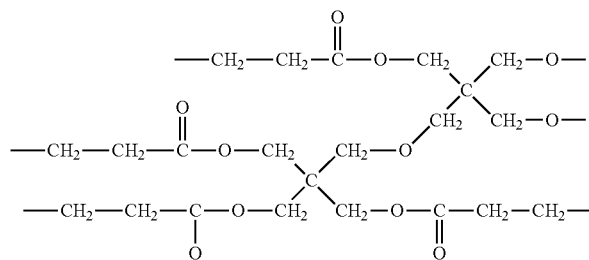
(16)

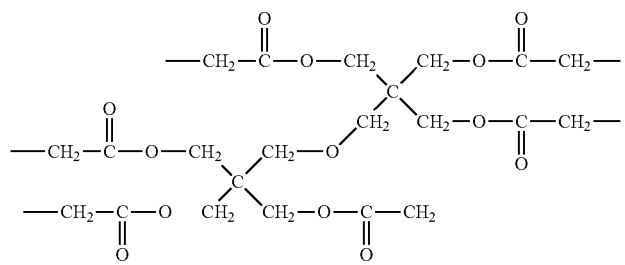
(17)

In the formulae (1) and (1'), m represents 1 to 8. m is preferably 1 to 5, more preferably 1 to 4, particularly preferably 1 to 3.

In the formulae (1) and (1'), n represents 2 to 9. n is preferably 2 to 8, more preferably 2 to 7, particularly preferably 3 to 6.

In the formulae (1) and (1'), $R^3$ each represents a single bond or a divalent linking group, and $R^3$ with the subscript m In the formulae (1) and (1'), $P^1$ represents a polymer backbone containing a Si atom, and may be selected from various polymer backbones as may be decided according to the intended use. $P^1$ with the subscript m may be the same or different. $P^1$ contains at least one constituting unit, and may contain two or more constituting units. When $P^1$ contains two or more constituting units, at least one of the constituting units is a constituting unit that contains a Si atom.

$P^1$ contains at least one constituting unit containing a Si atom. The constituting unit is preferably one derived from a silicone monomer, and the silicone monomer may be a silicone macromer. As used herein, "macromer (also referred to as macromonomer)" is a collective term used to refer to oligomers having a polymerizable functional group (degree of polymerization of about 2 to 300), or polymers having a polymerizable functional group, and the macromer has both polymer and monomer properties. Preferably, the constituting unit is one derived from a silicone macromer having a weight-average molecular weight of 1,000 to 50,000 (more preferably 1,000 to 10,000, further preferably 1,000 to 5,000).

Preferably, $P^1$ has at least one polymer backbone selected from the group consisting of a polymer or a copolymer of a vinyl monomer, an ester polymer, an ether polymer, a urethane polymer, an amide polymer, an epoxy-based polymer, a silicone polymer, and a modified product or a copolymer thereof (for example, a polyether/polyurethane copolymer, and a copolymer of a polyether/vinyl monomer polymer, which may be any of a random copolymer, a block copolymer, and a graft copolymer). More preferably, $P^1$ has at least one polymer backbone selected from the group consisting of a polymer or a copolymer of a vinyl monomer, an ester polymer, an ether polymer, a urethane polymer, and a modified product or a copolymer thereof. Particularly preferably, $P^1$ is a polymer backbone selected from a polymer or a copolymer of a vinyl monomer.

Preferably, the polymer is soluble to organic solvent. For example, when the polymer is used as a dispersant, and has low compatibility to an organic solvent, the compatibility to the dispersion medium may weaken, and an adsorption layer sufficient for dispersion stability may not be obtained.

$P^1$ is preferably a polymer backbone represented by the following formula (2).

(2)

In the formula, $P^2$ represents a constituting unit derived from a silicone macromer; $P^3$ represents a constituting unit that does not contain silicone, and that does not have an ionically dissociable group; $P^4$ represents a constituting unit that does not contain silicone, and that has an ionically dissociable group; x, y, and z each represent the molar fraction of the component, and $x+y+z=100$, wherein y and z may be 0, but are not simultaneously 0.

Examples of the silicone macromer that derives $P^2$ include silicone compounds having an epoxy group at one of the terminals, specifically silicone compounds represented by the structural formula 1 below. A silicone compound having an epoxy group at one of the terminals represents one of such silicone compounds. More specifically, for example, the silicone macromer may be a commercially available product such as X-22-173DX available from Shin-Etsu Silicone.

Structural Formula 1

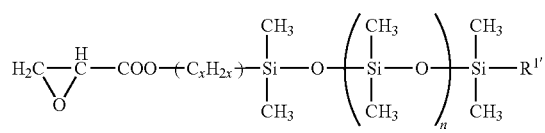

In the structural formula 1, $R^{1'}$ represents a hydrogen atom or alkyl of 1 to 4 carbon atoms, n represents a natural number (for example, 1 to 1,000, desirably 3 to 100), and x represents an integer of 1 to 3.

Examples of the silicone macromer that derives $P^2$ include dimethyl silicone monomers having a (meth)acrylate group at one of the terminals. A specific examples is the silicone compound represented by the structural formula 2 below. More specifically, for example, the silicone macromer may be a commercially available product such as Silaplane FM-0711, FM-0721, and FM-0725 (Chisso), and X-22-174DX, X-22-2426, and X-22-2475 (Shin-Etsu Silicone).

Structural Formula 2

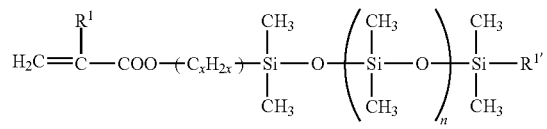

In the structural formula 2, $R^1$ represents a hydrogen atom or methyl; $R^{1'}$ represents a hydrogen atom or alkyl of 1 to 4 carbon atoms; n represents a natural number (for example, 1 to 1,000, desirably 3 to 100); and x represents an integer of 1 to 3.

Examples of the silicone macromer that derives $P^2$ include monomers represented by the following formulae (I) and (II).

Formula (I)

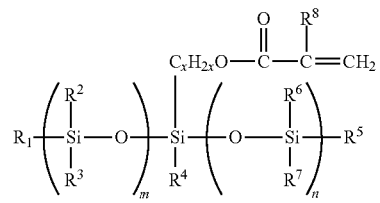

Formula (II)

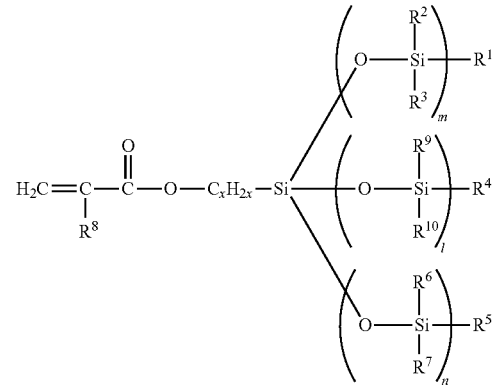

In the formulae (I) and (II), $R^1$, $R^2$, $R^3$, $R^4$, $R^5$, $R^6$, $R^7$, $R^9$, and $R^{10}$ each independently represent a hydrogen atom, alkyl of 1 to 4 carbon atoms, or fluoroalkyl of 1 to 4 carbon atoms.

$R^8$ represents a hydrogen atom or methyl.

n, l, and m each independently represent an integer of 1 to 1,000.

x represents an integer of 1 to 3.

In the formula (I), it is desirable that $R^1$ and $R^5$ represent butyl, $R^2$, $R^3$, $R^4$, $R^6$, and $R^7$ represent methyl, $R^8$ represents methyl, n and m each independently represent an integer of 1 to 5, and x represents an integer of 1 to 3.

In the formula (II), it is desirable that $R^1$, $R^2$, $R^3$, $R^4$, $R^5$, $R^6$, $R^7$, $R^9$, and $R^{10}$ represent methyl, $R^8$ represents methyl, n, l, and m each independently represents an integer of 1 to 3, and x represents an integer of 1 to 3.

Specific non-limiting examples of the monomers represented by formulae (I) and (II) are presented below.

Exemplary Compound 1

AZmax; MCS-M11

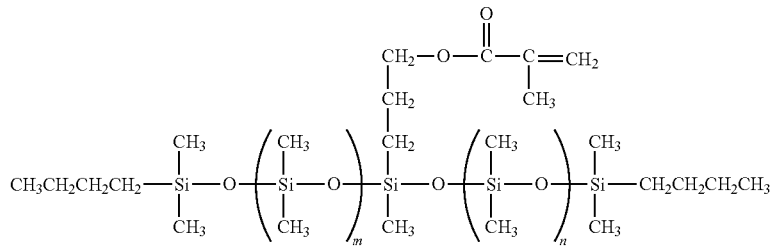

m, n=2 to 4
Molecular weight=800 to 1,000

Exemplary Compound 2

AZmax; RTT-1011

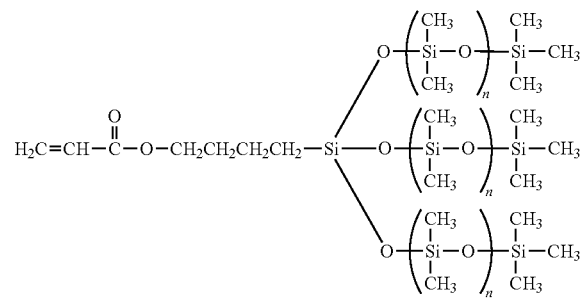

n=1
Molecular weight=570 to 620

The proportion of the silicone chain component in the silicone polymer forming the polymer backbone represented by $P^1$ is desirably 3% to 60%, more desirably 5% to 40% in terms of a mass ratio with respect to the total polymer.

The silicone polymer forming the polymer backbone represented by $P^1$ has a weight-average molecular weight of desirably 500 to 1,000,000, more desirably 500 to 100,000, particularly preferably 500 to 10,000.

In the formula (2), $P^3$ represents a constituting unit that does not contain silicone, and that does not have an ionically dissociable group. As used herein, the term "ionically dissociable group" is used to refer to an acidic group and a basic group, and to salts thereof.

Examples of the monomer that derives $P^3$ include vinyl monomers. The vinyl monomers are not particularly limited. Preferred examples include (meth)acrylic acid esters, crotonic acid esters, vinyl esters, maleic acid diesters, fumaric acid diesters, itaconic acid diesters, (meth)acrylamides, styrenes, vinylethers, vinyl ketones, olefins, maleimides, and (meth)acrylonitriles. These preferred examples of vinyl monomers are described below.

Examples of the (meth)acrylic acid esters include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, amyl (meth)acrylate, n-hexyl (meth)acrylate, cyclohexyl (meth)acrylate, t-butylcyclohexyl (meth)acrylate, 2-ethylhexyl (meth)acrylate, t-octyl (meth)acrylate, dodecyl (meth)acrylate, octadecyl (meth)acrylate, acetoxyethyl (meth)acrylate, phenyl (meth)acrylate, 2-hydroxyethyl (meth)acrylate, 2-hydroxypropyl (meth)acrylate, 3-hydroxypropyl (meth)acrylate, 4-hydroxybutyl (meth)acrylate, 2-methoxyethyl (meth)acrylate, 2-ethoxyethyl (meth)acrylate, 2-(2-methoxyethoxy) ethyl (meth)acrylate, 3-phenoxy-2-hydroxypropyl (meth) acrylate, 2-chloroethyl (meth)acrylate, glycidyl (meth) acrylate, 3,4-epoxycyclohexylmethyl (meth)acrylate, vinyl (meth)acrylate, 2-phenylvinyl (meth)acrylate, 1-propenyl (meth)acrylate, allyl (meth)acrylate, 2-allyloxyethyl (meth) acrylate, propargyl (meth)acrylate, benzyl (meth)acrylate, diethylene glycol monomethyl ether (meth)acrylate, diethylene glycol monoethyl ether (meth)acrylate, triethylene glycol monomethyl ether (meth)acrylate, triethylene glycol monoethyl ether (meth)acrylate, polyethylene glycol monomethyl ether (meth)acrylate, polyethylene glycol monoethyl ether (meth)acrylate, β-phenoxyethoxyethyl (meth)acrylate, nonylphenoxypolyethylene glycol (meth)acrylate, dicyclopentenyl (meth)acrylate, dicyclopentenyloxyethyl (meth)acrylate, trifluoroethyl (meth)acrylate, octafluoropentyl (meth)acrylate, perfluorooctylethyl (meth)acrylate, dicyclopentanyl (meth)acrylate, tribromophenyl (meth)acrylate, tribromophenyloxyethyl (meth)acrylate, and γ-butyrolactone (meth)acrylate.

Particularly preferred are monomers represented by the following formula (III).

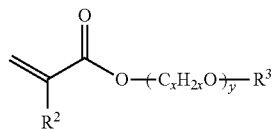

[In the formula, $R^2$ represents a hydrogen atom or methyl, $R^3$ represents a hydrogen atom or alkyl of 1 to 4 carbon atoms, preferably methyl. Preferably, $R^2$ and $R^3$ are methyl at the same time. x represents an integer of 1 to 3, preferably 2, and y represents a natural number of 25 or less, preferably 1 to 20, more preferably 2 to 10.] These monomers are preferred because they have a (poly)alkylene glycol chain with 25 or fewer oxyalkylene repeating units, and these monomers as constituting elements of a copolymer are adsorbed to particles insoluble in a solvent, and stabilize the particle dispersion with the steric effect developed by the (poly)alkylene glycol chain.

Examples of the crotonic acid esters include butyl crotonate, and hexyl crotonate.

Examples of the vinyl esters include vinyl acetate, vinyl chloroacetate, vinyl propionate, vinyl butyrate, vinyl methoxyacetate, and vinyl benzoate.

Examples of the maleic acid diesters include dimethyl maleate, diethyl maleate, and dibutyl maleate.

Examples of the fumaric acid diesters include dimethyl fumarate, diethyl fumarate, and dibutyl fumarate.

Examples of the itaconic acid diesters include dimethyl itaconate, diethyl itaconate, and dibutyl itaconate.

Examples of the (meth)acrylamides include (meth)acrylamide, N-methyl (meth)acrylamide, N-ethyl (meth)acrylamide, N-propyl (meth)acrylamide, N-isopropyl (meth)acrylamide, N-n-butylacryl(meth)amide, N-t-butyl (meth)acrylamide, N-cyclohexyl (meth)acrylamide, N-(2-methoxyethyl) (meth)acrylamide, N,N-dimethyl (meth)acrylamide, N,N-diethyl (meth)acrylamide, N-phenyl (meth)acrylamide, N-nitrophenyl acrylamide, N-ethyl-N-phenyl acrylamide, N-benzyl (meth)acrylamide, (meth)acryloylmorpholine, diacetoneacrylamide, N-methylolacrylamide, N-hydroxyethylacrylamide, vinyl (meth)acrylamide, N,N-diallyl (meth)acrylamide, and N-allyl (meth)acrylamide.

Examples of the styrenes include styrene, methylstyrene, dimethylstyrene, trimethylstyrene, ethylstyrene, isopropylstyrene, butylstyrene, hydroxystyrene, methoxystyrene, butoxystyrene, acetoxystyrene, chlorostyrene, dichlorostyrene, bromostyrene, chloromethylstyrene, hydroxystyrene protected by a group (for example, t-Boc) that can be deprotected by an acidic substance, vinyl methyl benzoate, and α-methylstyrene.

Examples of the vinyl ethers include methyl vinyl ether, ethyl vinyl ether, 2-chloroethyl vinyl ether, hydroxyethyl vinyl ether, propyl vinyl ether, butyl vinyl ether, hexyl vinyl ether, octyl vinyl ether, methoxyethyl vinyl ether, and phenyl vinyl ether.

Examples of the vinyl ketones include methyl vinyl ketone, ethyl vinyl ketone, propyl vinyl ketone, and phenyl vinyl ketone.

Examples of the olefins include ethylene, propylene, isobutylene, butadiene, and isoprene.

Examples of the maleimides include maleimide, butyl maleimide, cyclohexyl maleimide, and phenyl maleimide.

It is also possible to use (meth)acrylonitrile, vinyl-substituted heterocyclic groups (for example, vinylpyridine, N-vinylpyrrolidone, and vinylcarbazole), N-vinylformamide, N-vinylacetamide, N-vinylimidazole, and vinylcaprolactone.

Aside from these compounds, it is also possible to use, for example, vinyl monomers having a functional group such as a urethane group, a urea group, a sulfoneamide group, a phenol group, and an imide group. Such monomers having a urethane group or a urea group may be appropriately synthesized by using, for example, an addition reaction of an isocyanate group with hydroxyl or amino, specifically, for example, an addition reaction of an isocyanate group-containing monomer with a compound having a single hydroxyl, or with a compound containing a single primary or secondary amino, or an addition reaction of a hydroxyl-containing monomer or a primary or secondary amino-containing monomer with monoisocyanate.

In the formula (2), $P^4$ represents a constituting unit that does not contain silicone, and that has an ionically dissociable group.

Examples of the monomers that derives $P^4$ include vinyl monomers. The vinyl monomers are preferably vinyl monomers having an acidic group or a salt thereof as the ionically dissociable group. Preferred examples of such vinyl monomers are described below.

Examples of the vinyl monomers having an acidic group include vinyl monomers having carboxyl, and vinyl monomers having a sulfonic acid group.

Examples of the vinyl monomers having carboxyl include (meth)acrylic acid, vinyl benzoic acid, maleic acid, maleic acid monoalkyl ester, fumaric acid, itaconic acid, crotonic acid, cinnamic acid, and acrylic acid dimer. As another example, a product of an addition reaction of a hydroxyl-containing monomer such as 2-hydroxyethyl(meth)acrylate with maleic acid anhydride, phthalic anhydride, and a cyclic anhydride such as cyclohexane dicarboxylic acid anhydride also may be used. It is also possible to use, for example, ω-carboxy-polycaprolactone mono(meth)acrylate. An anhydride-containing monomer such as maleic acid anhydride, itaconic acid anhydride, and citraconic acid anhydride may be used as a precursor of the carboxyl. Of these examples, (meth)acrylic acid is particularly preferable from the standpoint of factors such as ease of copolymerization, cost, and solubility.

Examples of the vinyl monomers containing a sulfonic acid group include 2-acrylamide-2-methylpropanesulfonic acid. Examples of the vinyl monomers having a phosphoric acid group include phosphoric acid mono(2-acryloyloxyethylester), and phosphoric acid mono(1-methyl-2-acryloyloxyethylester).

Vinyl monomers containing phenolic hydroxyl, and vinyl monomers containing sulfoneamide also may be used as the vinyl monomers having an acidic group, for example.

In the formula (2), x, y, and z each represents the molar fraction of the component, and $x+y+z=100$, wherein y and z may be 0, but are not simultaneously 0. x is preferably more than 0 and 30 or less, y is preferably 0 to 30, and z is preferably 0 to 80. Particularly preferably, x is 10 to 30, y is 10 to 30, and z is 40 to 80.

The weight-average molecular weight of the first polymer is, for example, desirably 10,000 to 1,000,000, more desirably 50,000 to 300,000.

Preferred examples of the first polymer include the polymer compounds represented by the following formula (4).

$$(A^1\text{-}R^4\text{---}S)_n\text{---}R^1\text{---}(S\text{---}P^1)_m \qquad (4)$$

In the formula (4), $A^1$, $R^1$, $P^1$, and m and n have the same definitions and preferred ranges as in formula (1). $R^4$ represents a single bond or a divalent organic linking group. $R^4$ with the subscript n may be the same or different. Examples and preferred forms of the divalent organic linking group represented by $R^4$ include the same divalent organic linking groups and forms exemplified for $R^2$ of the formula (1). The compounds of the formula (4) can easily be produced through copolymerization of two or more monomers forming $P^1$, using $(A^1\text{-}R^4\text{---}S)_n\text{---}R^1\text{---}(SH)_m$ as a chain transfer agent. The synthesis methods will be described later in detail.

The polymer compounds represented by formula (4) are preferably compounds with $R^1$, $R^4$, $P^1$, m, and n satisfying the following conditions.

$R^1$: specific example (1), (2), (10), (11), (16), or (17)

$R^4$: a single bond, or a divalent organic linking group configured from a structural unit selected from the foregoing structural unit group G, or a combination of the structural units, and that is formed by "1 to 10 carbon atoms, 0 to 5 nitrogen atoms, 0 to 10 oxygen atoms, 1 to 30 hydrogen atoms, and 0 to 5 sulfur atoms" (The divalent organic linking group may have a substituent, and examples of the substituent include alkyl of 1 to 20 carbon atoms such as methyl, and ethyl; aryl of 6 to 16 carbon atoms such as phenyl, and naphthyl; hydroxyl, amino, carboxyl, sulfoneamide, N-sulfonylamide, acyloxy of 1 to 6 carbon atoms such as acetoxy; alkoxy of 1 to 6 carbon atoms such as methoxy, and ethoxy;

halogen atoms such as chlorine, and bromine; alkoxycarbonyl of 2 to 7 carbon atoms such as methoxycarbonyl, ethoxycarbonyl, and cyclohexyloxycarbonyl; cyano, and carbonate esters such as t-butyl carbonate.).

$$P^1\!:\!-\!(P^2)_x\!-\!(P^3)_y\!-\!P^4)_z \tag{2}$$

In the formula (2), $P^2$ represents a constituting unit derived from a silicone macromer; $P^3$ represents a constituting unit that does not contain silicone, and that does not have an ionically dissociable group, and that is derived from (meth) acrylic acid esters, crotonic acid esters, vinyl esters, maleic acid diesters, fumaric acid diesters, itaconic acid diesters, (meth)acrylamides, styrenes, vinylethers, vinyl ketones, olefins, maleimides, and (meth)acrylonitrile; $P^4$ represents a constituting unit that does not contain silicone, and that has an ionically dissociable group, and that is derived from a carboxyl-containing vinyl monomer or a sulfonic acid group-containing vinyl monomer; x, y, and z each represents the molar ratio of the component, and x+y+z=100, wherein x is more than 0 and 30 or less, y is 0 to 30, and z is 0 to 80.

m: 1 to 3
n: 3 to 6

The acid value of the first polymer is not particularly limited. When acting as a dispersant, the first polymer has an acid value of preferably 300 (mgKOH/g) or less, more preferably 250 (mgKOH/g) or less, particularly preferably 200 (mgKOH/g) or less. An acid value above 200 (mgKOH/g) may cause impairment of the dispersibility and the dispersion stability of the colorant-containing particles.

The molecular weight of the first polymer is preferably 3,000 to 80,000, more preferably 5,000 to 50,000, particularly preferably 7,000 to 30,000 in terms of a weight-average molecular weight. With the weight-average molecular weight confined in these ranges, the adsorption moieties introduced to the polymer terminal can sufficiently exhibit effect, and the polymer can exhibit excellent performance, including adsorption to solid surface, micelle formation, and surface activity. Particularly, when the first polymer is acting as a dispersant, desirable dispersibility and dispersion stability can be realized.

(Synthesis Methods)

The synthesis method of the first polymer compound represented by the formula (1) is not particularly limited, and the first polymer compound may be synthesized by using the following methods.

First Method:
Polymerization reaction whereby a polymer with an introduced terminal functional group selected from, for example, carboxyl, hydroxyl, and amino is reacted with an acid halide having more than one of the adsorption moieties, an alkyl halide having more than one of the adsorption moieties, or an isocyanate having more than one of the adsorption moieties.

Second Method:
Michael addition reaction whereby a polymer with an introduced terminal carbon-carbon double bond is reacted with a mercaptan having more than one of the adsorption moieties.

Third Method:
A polymer with an introduced terminal carbon-carbon double bond is reacted with a mercaptan having the adsorption moieties in the presence of a radical generating agent.

Fourth Method:
A polymer with introduced terminal mercaptans is reacted with a compound having a carbon-carbon double bond and the adsorption moiety in the presence of a radical generating agent.

Fifth Method:
Radical polymerization whereby a vinyl monomer is reacted in the presence of a mercaptan compound having more than one of the adsorption moieties.

For ease of synthesis, the polymer compound of the present invention is preferably synthesized by using the second, third, fourth, and fifth synthesis methods, more preferably the third, fourth, and fifth synthesis methods. When the polymer compound of the present invention has the structure represented by the formula (4), it is most preferable to use the fifth synthesis method for ease of synthesis.

More specifically, the fifth synthesis method is performed by radical polymerization of a vinyl monomer in the presence of the compound represented by the following formula (5).

$$(A^1\text{-}R^4\!-\!S)_n\!-\!R^1\!-\!(SH)_m \tag{5}$$

The symbols in the formula (5) have the same definitions and preferred ranges as in the formula (1). SH means a thiol group.

The compound represented by the formula (5) may be synthesized by using, for example, the following sixth and seventh methods. For ease of synthesis, the seventh method is more preferred.

Sixth Method:
A halide compound having more than one of the adsorption moieties is converted into a mercaptan compound (for example, by hydrolysis through reaction with thiourea; direct reaction with NaSH; and hydrolysis through reaction with $CH_3COSNa$).

Seventh Method:
Addition reaction whereby a compound having 3 to 10 mercapto groups per molecule is reacted with a compound having the adsorption moiety and a functional group that can react with the mercapto groups.

Preferred examples of the functional group that can react with the mercapto groups used in the seventh method include acid halides, alkyl halides, isocyanates, and carbon-carbon double bonds. Particularly preferably, the functional group that can react with the mercapto groups is a carbon-carbon double bond, and the addition reaction is a radical addition reaction. For reactivity to the mercapto groups, the carbon-carbon double bond is preferably a monosubstituted or disubstituted vinyl group.

Specific non-limiting examples of the compound having 3 to 10 mercapto groups per molecule are presented below [specific examples (18) to (34)].

(18)

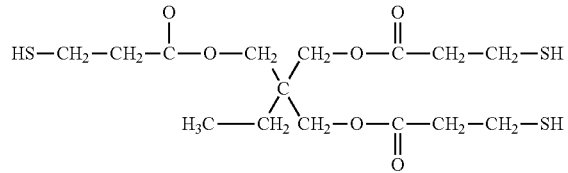

(19)

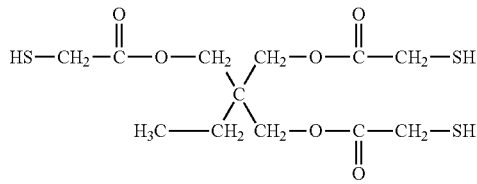

-continued
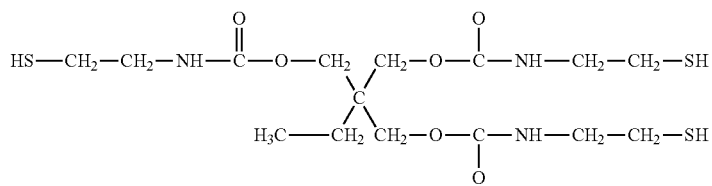
(20)
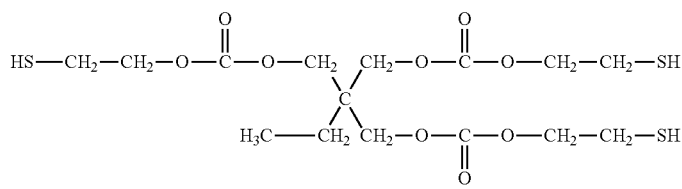
(21)
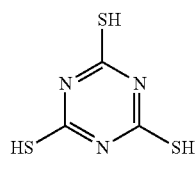
(22)
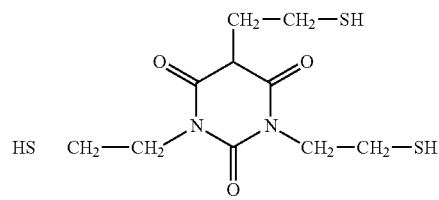
(23)
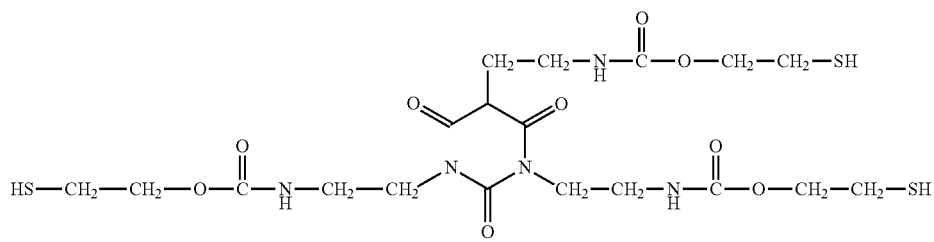
(24)
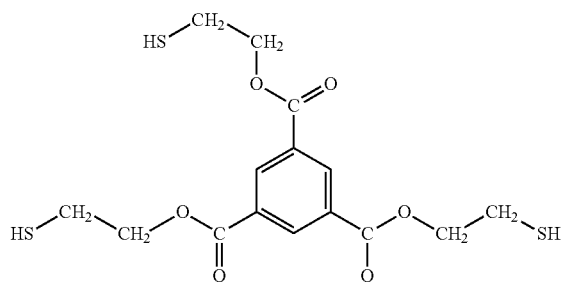
(25) (26)
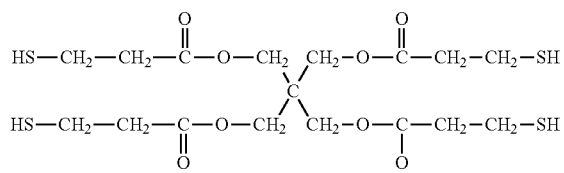
(27) (28)
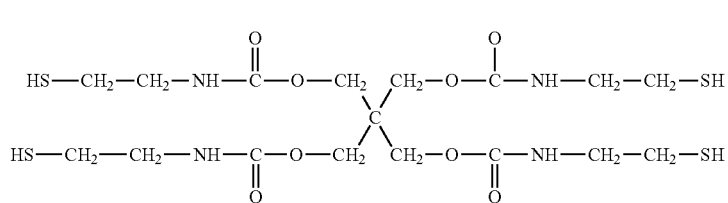
(29)

-continued
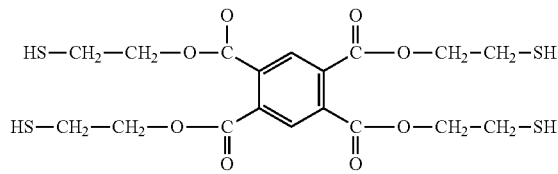 (30)
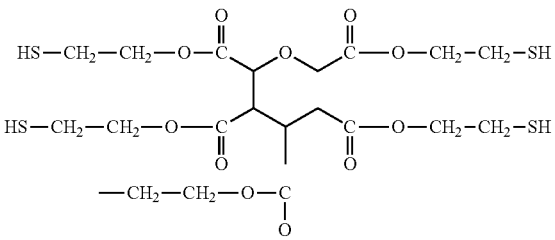 (31)
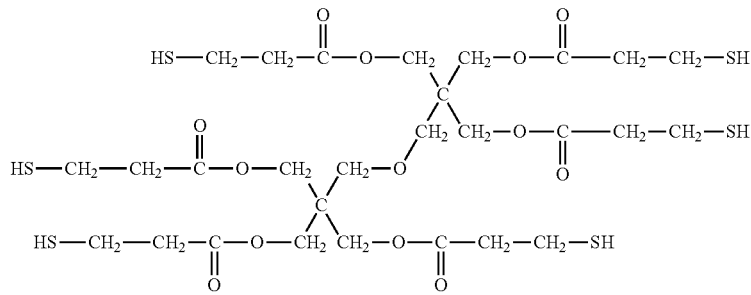 (33)
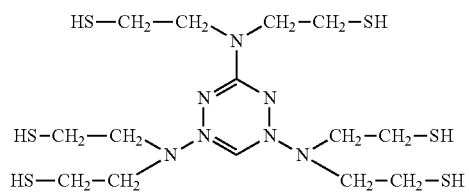 (32)
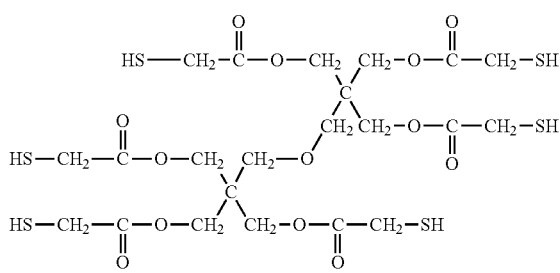 (34)
The following compounds are particularly preferred from the standpoint of availability of the raw materials, ease of synthesis, and solubility in various solvents.
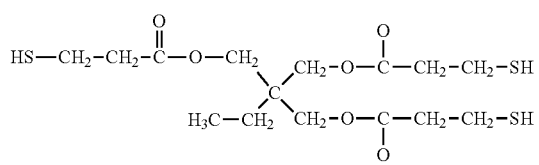 (18)
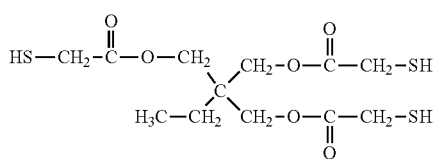 (19)
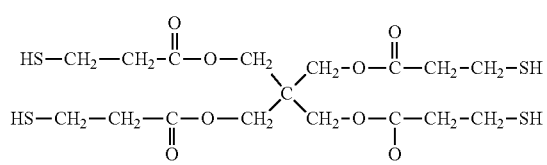 (27)
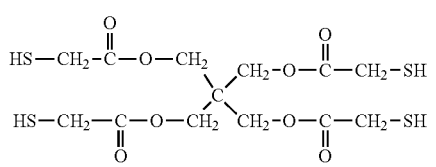 (28)
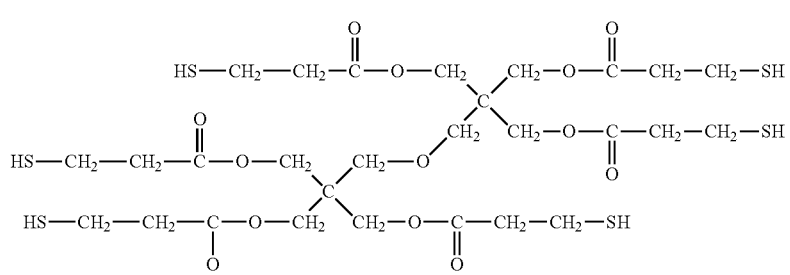 (33)

-continued

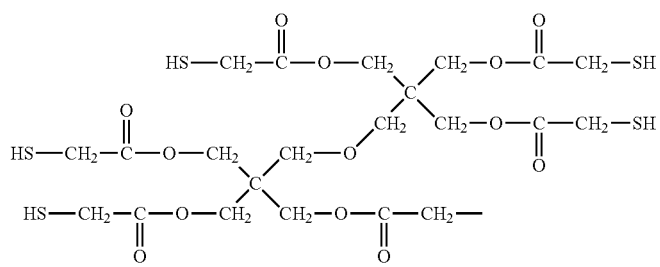

(34)

The compound having the adsorption moiety and a carbon-carbon double bond (specifically, a compound having a carbon-carbon double bond, and at least one moiety selected from an organic dye residue, a heterocyclic residue, an acidic group, a group having a basic nitrogen atom, a urea group, a urethane group, a group having a coordinating oxygen atom, a hydrocarbon group of 4 or more carbon atoms, an alkoxysilyl group, an epoxy group, an isocyanate group, and a hydroxyl group) is not particularly limited. Examples include the following.

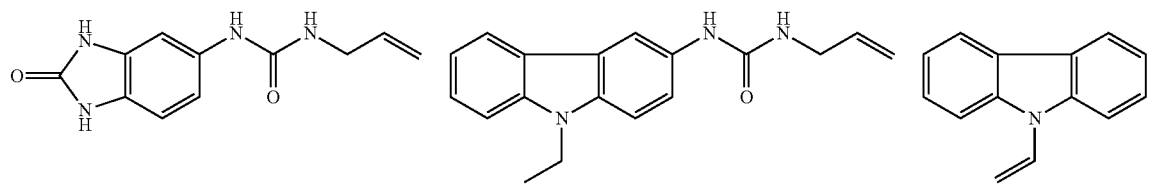

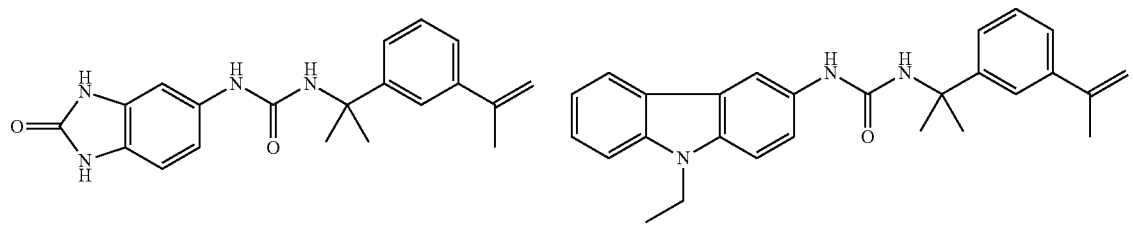

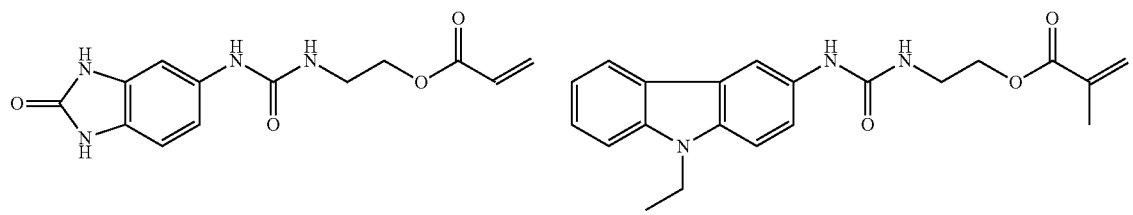

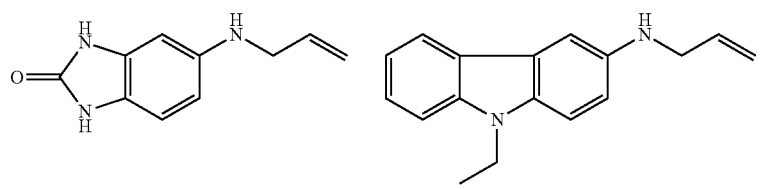

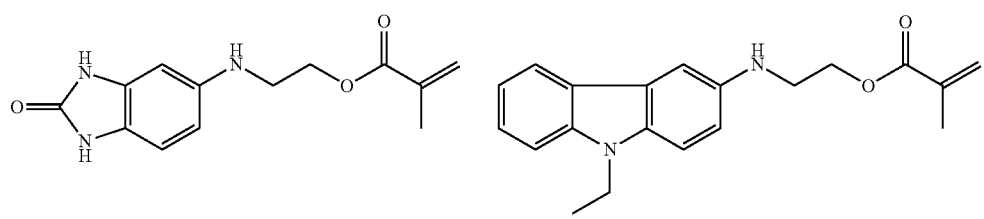

31
-continued
32
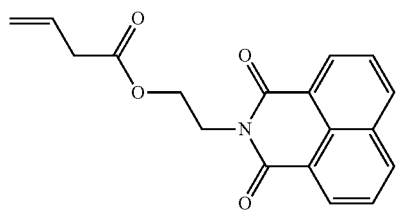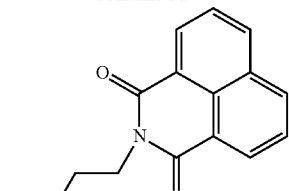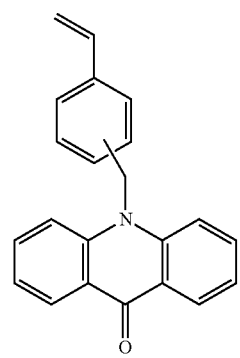
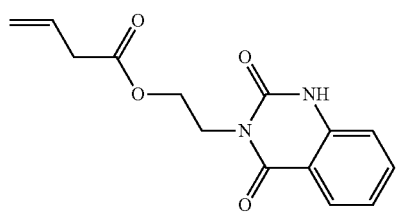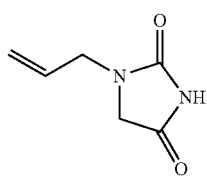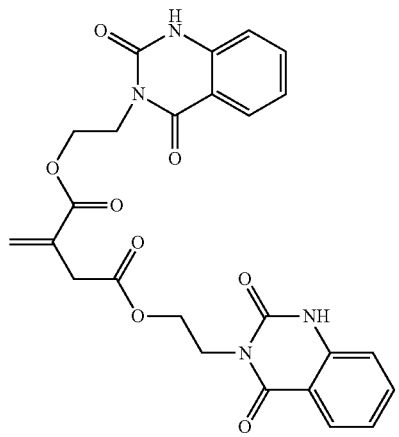
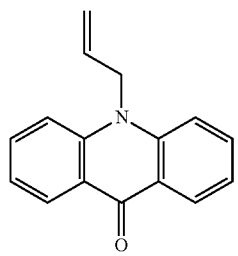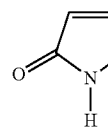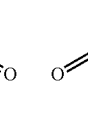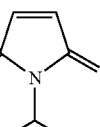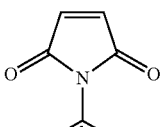
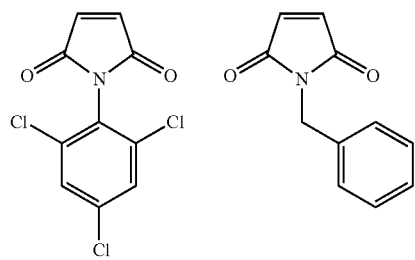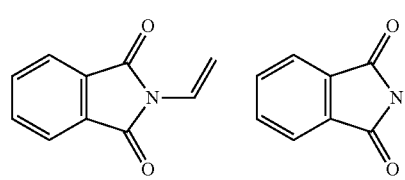
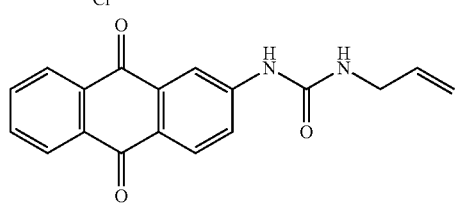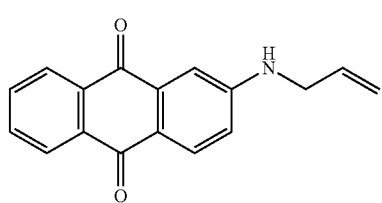

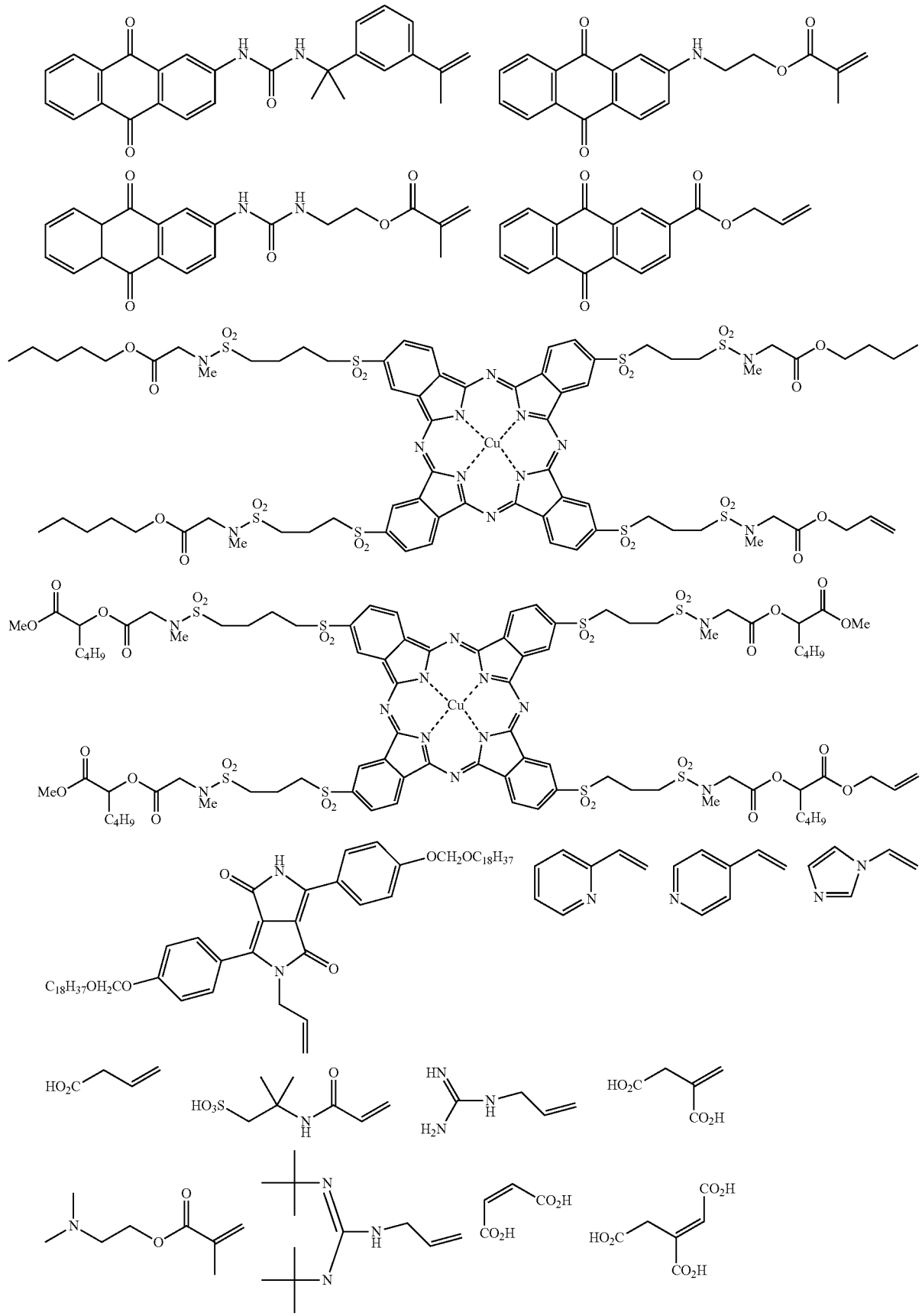

-continued

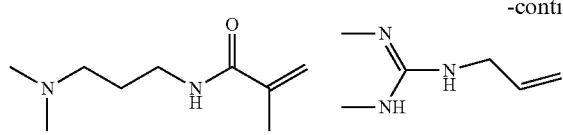
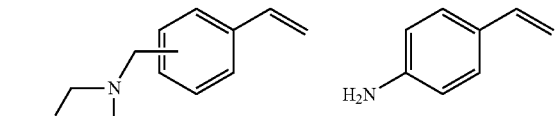
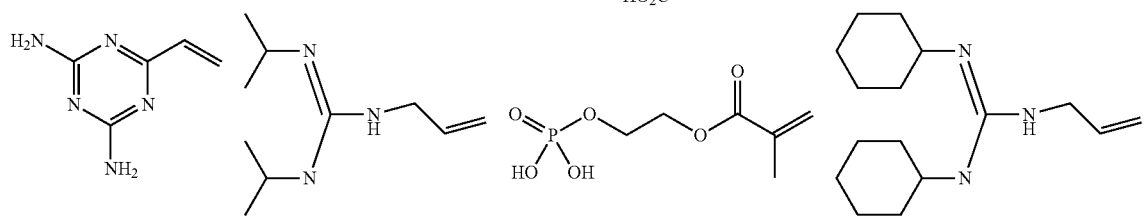
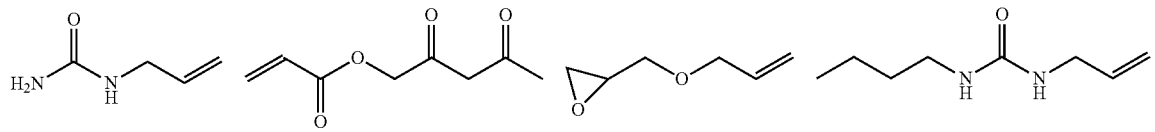
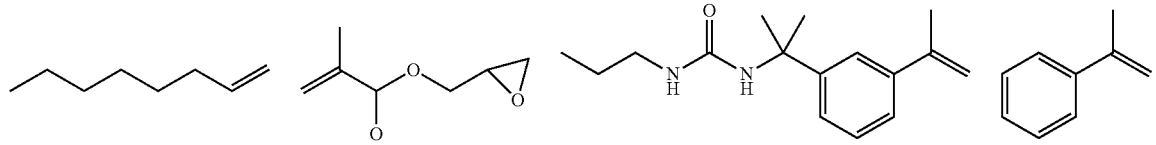
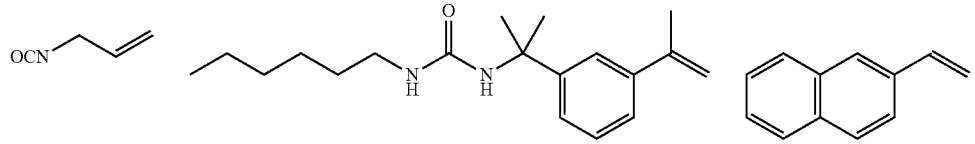
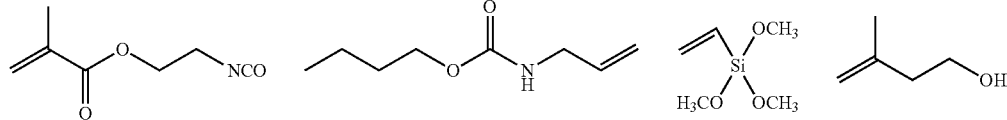
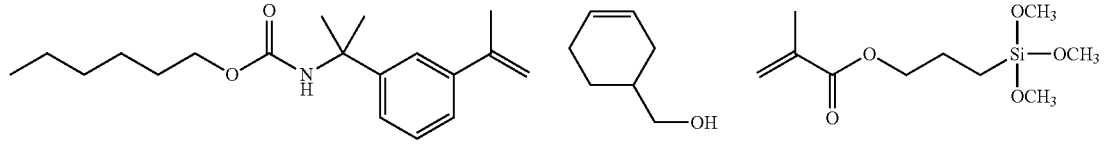
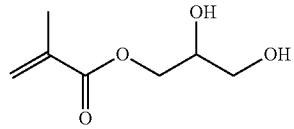

A radical addition reaction product of the compound having 3 to 10 mercapto groups per molecule, and the compound having the adsorption moiety and a carbon-carbon double bond may be obtained by using, for example, a method (thiol-ene reaction method) in which the compound having 3 to 10 mercapto groups per molecule, and the compound having the adsorption moiety and a carbon-carbon double bond are dissolved in a suitable solvent, and reacted at about 50° C. to 100° C. with addition of a radical generating agent.

The solvent used for the thiol-ene reaction method may be any suitable solvent selected according to the solubility of the compound having 3 to 10 mercapto groups per molecule, the compound having the adsorption moiety and a carbon-carbon double bond, and the radical addition reaction product.

Examples of the solvent include methanol, ethanol, propanol, isopropanol, 1-methoxy-2-propanol, 1-methoxy-2-propylacetate, acetone, methyl ethyl ketone, methyl isobutyl ketone, methoxypropylacetate, ethyl lactate, ethyl acetate, acetonitrile, tetrahydrofuran, dimethylformamide, chloroform, and toluene. These solvents may be used as a mixture of two or more.

Examples of the radical generating agent include azo compounds such as 2,2'-azobis(isobutyronitrile) (AIBN), 2,2'-azobis-(2,4'-dimethylvaleronitrile), and dimethyl 2,2'-azobisisobutyrate; peroxides such as benzoyl peroxide; and persulfates such as potassium persulfate, and ammonium persulfate.

The monomer used in the fifth synthesis method forms the polymer backbone represented by $P^1$ of the formula (1) after polymerization reaction. Accordingly, the monomer may be at least one selected from, for example, the silicone macromers, and vinyl monomers having (meth)acrylic acid esters and carboxyl. The vinyl monomer may be used alone for polymerization, or two or more vinyl monomers may be copolymerized.

The first polymer is preferably one obtained by polymerization of the vinyl monomer and the compound of the formula (5) using a known ordinary method. The compound of the formula (5) of the present invention serves as a chain transfer agent, and also may be referred to simply as "chain transfer agent".

For example, the vinyl monomer and the chain transfer agent are dissolved in a suitable solvent, and are polymerized at about 50° C. to 220° C. by addition of a radical polymerization initiator (solution polymerization method).

The solvent used in the solution polymerization method may be any suitable solvent selected according to the solubility of the monomer used, and the product copolymer. Examples include methanol, ethanol, propanol, isopropanol, 1-methoxy-2-propanol, 1-methoxy-2-propylacetate, acetone, methyl ethyl ketone, methyl isobutyl ketone, methoxypropylacetate, ethyl lactate, ethyl acetate, acetonitrile, tetrahydrofuran, dimethylformamide, chloroform, and toluene. These solvents may be used as a mixture of two or more.

Examples of the radical polymerization initiator include azo compounds such as 2,2'-azobis(isobutyronitrile) (AIBN), 2,2'-azobis-(2,4'-dimethylvaleronitrile), and dimethyl 2,2'-azobisisobutyrate; peroxides such as benzoyl peroxide; and persulfates such as potassium persulfate, and ammonium persulfate.

The proportion of the first polymer with respect to the colorant is not particularly limited. From the standpoint of improving dispersibility and dispersion stability, the first polymer content is preferably 1 to 60 mass %, more preferably 3 to 50 mass %, further preferably 5 to 40 mass %.

When the first polymer is used in the form of a dispersant added to a dispersion medium, the first polymer is, for example, desirably 0.0001 mass % to 5 mass %, more desirably 0.01 mass % to 3 mass % with respect to the dispersion medium.

(2) Colorant

The colorant contained in the colorant-containing particle of the present invention is not particularly limited, and may be, for example, an organic or inorganic pigment, or an oil-soluble dye. The colorant may be any known colorant, for example, such as a magnetic powder (such as magnetite, and ferrite), carbon black, titanium oxide, magnesium oxide, zinc oxide, a phthalocyanine copper cyan color, an azo yellow color, an azo magenta color, a quinacridone magenta color, a red color, a green color, and a blue color. Specific representative examples of the colorant include aniline blue, carcoyl blue, chromium yellow, ultramarine blue, Du Pont oil red, quinoline yellow, methylene blue chloride, phthalocyanine blue, malachite green oxalate, lamp black, rose bengal, C.I. pigment red 48:1, C.I. pigment red 122, C.I. pigment red 57:1, C.I. pigment yellow 97, C.I. pigment blue 15:1, and C.I. pigment blue 15:3.

The colorant content in the colorant-containing particle of the present invention is not particularly limited, and a preferred range may be decided according to the intended use. For example, when the second polymer having a charged group (described below) is further contained, the colorant content is desirably 10 mass % to 99 mass %, more desirably 30 mass % to 99 mass % with respect to the second polymer.

(3) Second Polymer Having Charged Group

The colorant-containing particle of the present invention may further contain a second polymer having a charged group. Colorant-containing particles containing a second polymer having a charged group become electrophoretic, and can be used as electrophoretic particles for, for example, display applications such as electronic paper. Preferably, the second polymer having a charged group exists by surrounding the colorant, though the form of the second polymer is not limited to this.

The second polymer preferably has a basic or acidic group as a functional group. The functional group may be a group that serves as a charged group, or may be a separate group from the group serving as a charged group. Preferably, the functional group is a group that serves as a charged group. As used herein, "charged group" is inclusive of anionic and cationic ionic groups, and high polarity groups. Examples of the latter include a fluorine group.

The polymerization may be followed by a charging process. For example, a positively charged group (described later) may be one obtained after polymerizing a tertiary amine-containing monomer alone, or copolymerizing the monomer with other monomers, and transforming the tertiary amine into a quaternary amine. A negatively charged group may be one obtained after polymerizing a carboxyl-containing monomer alone, or copolymerizing the monomer with other monomers, and forming a salt with the carboxyl by addition of a base such as amine. The charging process may be performed, for example, after mixing the colorant.

The charged group of the second polymer is preferably a base (hereinafter, "cationic group") or an acid (hereinafter, "anionic group"). Examples of the cationic group include an amino group, and a quaternary ammonium group (including salts thereof). For example, the cationic group imparts positive polarity to the colorant-containing particles. Examples of the anionic group include a phenol group, a carboxyl group, a carboxylate group, a sulfonic acid group, a sulfonate group, a phosphoric acid group, a phosphate group, and a tetraphenylboron group (including salts thereof). For example, the anionic group imparts negative polarity to the colorant-containing particles.

Examples of the second polymer include a homopolymer of a monomer having a charged group, and a copolymer of a monomer having a charged group, and other monomers (monomers without charged groups). Here and below, "(meth)acrylate" is inclusive of both "acrylate" and "methacrylate".

Examples of the monomer having a charged group include monomers having a cationic group (hereinafter, "cationic monomers"), and monomers having an anionic group (hereinafter, "anionic monomers").

Examples of the cationic monomers include (meth)acrylates having an aliphatic amino group, such as N,N-dimethylaminoethyl (meth)acrylate, N,N-diethylaminoethyl (meth) acrylate, N,N-dibutylaminoethyl (meth)acrylate, N,N-hydroxyethylaminoethyl (meth)acrylate, N-ethylaminoethyl (meth)acrylate, N-octyl-N-ethylaminoethyl (meth)acrylate, and N,N-dihexylaminoethyl (meth)acrylate; aromatic substituted ethylene monomers having a nitrogen-containing group such as dimethylaminostyrene, diethylaminostyrene, dimethylaminomethylstyrene, and dioctylaminostyrene; nitrogen-containing vinyl ether monomers such as vinyl-N-ethyl-N-phenylamino ethyl ether, vinyl-N-butyl-N-phenylamino ethyl ether, triethanolamine divinyl ether, vinyldiphenylamino ethyl ether, N-vinylhydroxyethylbenzamide, and m-aminophenyl vinyl ether; pyrroles such as vinylamine, and N-vinylpyrrole; pyrrolines such as N-vinyl-2-pyrroline, and N-vinyl-3-pyrroline; pyrrolidines such as N-vinylpyrrolidine, vinylpyrrolidine amino ether, and N-vinyl-2-pyrrolidone; imidazoles such as N-vinyl-2-methylimidazole; imidazolines such as N-vinylimidazoline; indoles such as N-vinylindole; indolines such as N-vinylindoline; carbazoles such as N-vinylcarbazole, 3,6-dibromo-N-vinylcarbazole; pyridines such as 2-vinyl pyridine, 4-vinyl pyridine, and 2-methyl-5-vinyl pyridine; piperidines such as (meth)acrylpiperidine, N-vinylpiperidone, and N-vinylpiperazine; quinolines such as 2-vinylquinoline, and 4-vinylquinoline;

pyrazoles such as N-vinylpyrazole, and N-vinylpyrazoline; oxazoles such as 2-vinyloxazole; and oxazines such as 4-vinyloxazine, and morpholinoethyl (meth)acrylate. Particularly preferred as the cationic monomer from the standpoint of versatility are (meth)acrylates having an aliphatic amino group, such as N,N-dimethylaminoethyl (meth)acrylate, and N,N-diethylaminoethyl (meth)acrylate. Preferably, such (meth)acrylates are used in the form of a quaternary ammonium salt produced before or after the polymerization. The quaternary ammonium salt may be obtained, for example, by reacting the compound with alkyl halides or tosylate esters.

Examples of the anionic monomer are as follows. Specific examples of the carboxylic acid monomer include (meth) acrylic acid, crotonic acid, itaconic acid, maleic acid, fumaric acid, citraconic acid, and anhydrides and monoalkyl esters thereof, and vinyl ethers having carboxyl, such as carboxyethyl vinyl ether, and carboxypropyl vinyl ether. Examples of the sulfonic acid monomer include styrenesulfonic acid, 2-acrylamide-2-methylpropane sulfonic acid, 3-sulfopropyl (meth)acrylic acid ester, bis-(3-sulfopropyl)-itaconic acid ester, and salts thereof. Other examples include sulfuric acid monoesters of 2-hydroxyethyl (meth)acrylic acid, and salts thereof. Examples of the phosphoric acid monomer include vinyl phosphonic acid, vinyl phosphate, acid phosphoxy ethyl (meth)acrylate, acid phosphoxy propyl (meth)acrylate, bis(methacryloxyethyl)phosphate, diphenyl-2-methacryloyloxy ethyl phosphate, diphenyl-2-acryloyloxy ethyl phosphate, dibutyl-2-methacryloyloxy ethyl phosphate, dibutyl-2-acryloyloxy ethyl phosphate, and dioctyl-2-(meth) acryloyloxy ethyl phosphate. The anionic monomer is desirably one having (meth)acrylic acid or sulfonic acid, more desirably one in the form of an ammonium salt produced before or after the polymerization. The ammonium salt is formed, for example, by reaction with tertiary amines or quaternary ammonium hydroxides.

The monomer having a fluorine group that serves as a charged group is, for example, a (meth)acrylate monomer having a fluorine group. Specific examples include trifluoroethyl (meth)acrylate, pentafluoropropyl (meth)acrylate, perfluoroethyl (meth)acrylate, perfluorobutylethyl (meth)acrylate, perfluorooctylethyl (meth)acrylate, perfluorodecylethyl (meth)acrylate, trifluoromethyltrifluoroethyl (meth)acrylate, and hexafluorobutyl (meth)acrylate.

The other monomers may be non-ionic monomers, for example, such as (meth)acrylonitrile, (meth)acrylic acid alkyl ester, (meth)acrylamide, ethylene, propylene, butadiene, isoprene, isobutylene, N-dialkyl substituted (meth)acrylamide, styrene, vinylcarbazole, styrene, styrene derivatives, polyethylene glycol mono(meth)acrylate, vinyl chloride, vinylidene chloride, isoprene, butadiene, vinylpyrrolidone, hydroxyethyl(meth)acrylate, and hydroxybutyl(meth)acrylate.

The copolymerization ratio of the monomer having a charged group, and the other monomers is varied according to the desired amount of charge on the particles. The copolymerization ratio of the monomer having a charged group, and the other monomers is typically selected from a molar ratio range of 1:100 to 100:0.

The weight-average molecular weight of the second polymer is desirably 1,000 to 1,000,000, more desirably 10,000 to 200,000.

When the first polymer has an acidic group as $A^1$, the charged group of the second polymer is preferably a basic group. When the first polymer has a basic group as $A^1$, the charged group of the second polymer is preferably an acidic group.

Negatively charged particles with a base are described below in detail as an embodiment of the colorant-containing particle of the present invention. Such negatively charged particles may be produced by using a polymer (second polymer) having a base. However, because the base does not serve as a charged group that can be negatively charged, the second polymer preferably has a separate group that serves as a charged group. Examples of the charged group include a fluorine group, carboxyl, carboxylate, a sulfonic acid group, sulfonate, a phosphoric acid group, and phosphate. The charged group is desirably a fluorine group.

That is, the negatively charged particles with a base preferably use a second polymer that has a base, and a fluorine group as the charged group. Examples of such polymers having a base and a fluorine group include copolymers of a base-containing monomer, a monomer having a fluorine group, and, as required, other monomers (nonionic monomers). The monomers may be the same monomers used to form the polymer above.

In addition to the constituting unit derived from the monomer, the second polymer may have a constituting unit configured from a silicone monomer. The silicone monomer may be a silicone macromer.

Examples of the silicone monomer or macromer include dimethyl silicone monomers having a (meth)acrylate group at one of the terminals (for example, Silaplane FM-0711, FM-0721, and FM-0725 available from Chisso; and X-22-174DX, X-22-2426, and X-22-2475 available from Shin-Etsu Silicone). Silicone macromers that derives the constituting unit $P^1$ of the first polymer represent another example.

In addition to the first and second polymers, the colorant-containing particle may contain a silicone polymer adhered (for example, by bonding or coating) to the particle surface. The silicone polymer is, for example, a polymer compound with a silicone chain, more specifically and preferably, a compound having a silicone chain (silicone graft chain) as the side chain of the main chain of the main polymer compound. The weight-average molecular weight of the silicone polymer is desirably 500 to 1,000,000, more desirably 1,000 to 1,000,000. In addition to the constituting unit derived from the silicone monomer or macromer, the silicone polymer may have a constituting unit derived from a non-silicone monomer.

(4) Other Components

The colorant-containing particle of the present invention may additionally include materials other than the first polymer, the colorant, and the optionally added second polymer. Examples of such additional materials include charge control materials, and magnetic materials. The charge control materials may be known charge control materials used for electrophotographic toner materials, including, for example, quaternary ammonium salts such as cetyl pyridyl chloride, BONTRON P-51, BONTRON P-53, BONTRON E-84, BONTRON E-81 (available from Orient Chemical Industries., Co., Ltd.), salicylic acid metal complexes, phenol condensation products, tetraphenyl compounds, metal oxide particles, and metal oxide particles surface-treated with various coupling agents.

The magnetic material may be an optionally color-coated, inorganic or organic magnetic material. Transparent magnetic materials, particularly transparent organic magnetic materials are more desirable, because these materials do not easily inhibit the color development of the color pigment, and have smaller specific gravity than inorganic magnetic materials. Examples of the color magnetic material (color coated material) include the small-diameter color magnetic powder described in JP-A-2003-131420. The color magnetic material may include a nucleus magnetic particle, and a color layer laminated on the surface of the magnetic particle. For example, the color layer may be one that makes the magnetic particle opaque colored with a pigment or the like. However, for example, an optical interference thin film is preferably used. The optical interference thin film is a thin film of achromatic color material, such as $SiO_2$ and $TiO_2$, having the same thickness as a wavelength of light, and selectively reflects light of a wavelength by using optical interference within the thin film.

(5) Colorant-Containing Particle Producing Process

The process for producing the colorant-containing particle of the present invention is not particularly limited. One exemplary process is described below. This exemplary process is an embodiment in which both the first polymer and the second polymer are contained. With this process, a colorant-containing particle can be produced that contains the colorant at the central portion, the second polymer surrounding the colorant, and the first polymer adsorbed on the outer side.

The process includes the steps of: stirring and emulsifying a mixed solution containing the second polymer, the colorant, a first solvent (a poor solvent that can form a continuous phase), and a second solvent (a good solvent that can form a disperse phase) for dissolving the second polymer, incompatible to the first solvent and having a lower boiling point than the first solvent; removing the second solvent from the emulsified mixed solution to form a colored particle (particle) containing the second polymer and the colorant; and mixing the first polymer. This process represents a technique called a drying-in-liquid method. The process may further include subsequent steps, such as washing of the particles (removal of ionic impurities), replacement of the dispersion medium, concentration of the dispersion medium, and dilution of the dispersion medium.

With this technique, a dispersion of the colorant-containing particle of the present invention in the first solvent used as a dispersion medium can be obtained. The first solvent may be a dispersion medium (for example, a silicone oil, and a paraffinic hydrocarbon solvent) used for the dispersion of the present invention, as will be described later. The dispersion may directly be used for various applications such as a display medium.

The colorant-containing particle producing process of the present invention is not limited to the foregoing producing process, and other methods, for example, such as pulverization, coacervation, disperse polymerization, and suspension polymerization also may be used. The particles or the particle dispersion produced by these methods may directly be used for various applications such as a display medium, or may be used after further processes such as washing of the particles (removal of ionic impurities), replacement of the dispersion medium, evaporation of the dispersion medium, and dilution of the dispersion medium.

(6) Properties of Colorant-Containing Particles

The size of the colorant-containing particle of the present invention is not particularly limited, and a preferred range may be set according to the intended use. When used as particles for a display medium, the average particle diameter is preferably 0.05 to 10 µm, more preferably 0.1 to 1 µm. The average particle diameter may be measured by using known methods, such as a method involving measurement with a transmission electron microscope, and a method that measures a pigment dispersion of an appropriate concentration with a commercially available ultracentrifugal automatic particle size distribution measurement device, and a light-scattering particle size distribution measurement device.

In an embodiment of the colorant-containing particle of the present invention, the colorant-containing particle is an electrophoretic particle with an electrophoretic property. The particle of this embodiment preferably contains the second polymer. The particle of this embodiment may be used in a variety of technical fields employing the principle of electrophoresis. One example is a display particle for electrophoretic electronic paper.

2. Colorant-Containing Particle Dispersion

The present invention is concerned with a colorant-containing particle dispersion containing the colorant-containing particle of the present invention, and a dispersion medium.

The preferred concentration range of the colorant-containing particles in the dispersion varies according to use, and is preferably 30 mass % or less, more preferably 0.1 to 30 mass % from the standpoint of dispersibility and dispersion stability. In these concentration ranges, desirable display characteristics and response characteristics can be obtained in display medium applications. In an embodiment containing a plurality of colorant-containing particles, the total amount of the colorant-containing particles preferably falls within the foregoing ranges.

The particle concentration in the particle dispersion according to the present embodiment is selected according to display characteristics, response characteristics, and use, and is desirably selected from a 0.1 mass % to 30 mass % range. When particles of different colors are mixed, the total amount of the particles desirably falls within this range.

The dispersion of the present invention may contain more than one kind of colorant-containing particle. For example, particles that differ, for example, in hue, charge polarity, and the electric field strength at which the particles start moving by the electric field may be contained. A dispersion of such an embodiment is suited as a medium for color displays. A combination of two or more particles may be a combination of particles having different hues and different charge polarity, or a combination of particles that differ in hue, and the electric field strength at which the particles start moving by the electric field.

Dispersion Medium

The dispersion medium is not particularly limited, and one or more solvents may be appropriately selected and used according to intended use. Examples of the dispersion medium include a silicone oil, a paraffinic hydrocarbon solvent, a fluorine liquid, and a petroleum-derived high-boiling-point solvent. Particularly preferred are silicone oil and paraffinic hydrocarbon solvent. Silicone oil is further preferred. The dispersion medium is also preferably a mixed solvent of a silicone oil and a solvent other than a silicone oil.

Specific examples of the silicone oil include a silicone oil with a hydrocarbon group attached to the siloxane bond (for example, dimethyl silicone oil, diethyl silicone oil, methylethyl silicone oil, methylphenyl silicone oil, and diphenyl silicone oil). Dimethyl silicone is particularly desirable.

Other Additives

The dispersion of the present invention may contain additives such as an acid, an alkali, a salt, a dispersant, a dispersion stabilizer, a stabilizer for preventing oxidation or absorbing ultraviolet rays, an anti-microbial agent, and a preservative, as required. Further, a charge control agent may be added to the particle dispersion of the present invention.

In the dispersion of the present invention, the first polymer contained in the colorant-containing particles may partially dissociate from the particles, and may be present in the dispersion medium.

The particle dispersion of the present invention has a wide range of applications, and is suited for technical fields employing the principle of electrophoresis, including an electrophoretic display medium, an electrophoretic photochromic medium (photochromic element), and a liquid toner for liquid-development electrophotographic systems. The electrophoretic display medium, and the electrophoretic photochromic medium (photochromic element) may be of a known system where a group of particles are moved in the opposing direction of the electrodes (substrate), or in directions along the electrode (substrate) plane (inplane elements as they are called), or may be a hybrid element of these systems.

In an embodiment of the colorant-containing particle dispersion of the present invention, the colorant-containing particle dispersion contains one or more colorant-containing particles of the present invention as electrophoretic particles that move depending on electric field, and a dispersion medium configured with a silicone oil. In the present embodiment, the first polymer is preferably adsorbed to the surface of the colorant-containing particle.

Typically, the particles may aggregate over time in the presence of a cohesive force applied between the particles via a polymer dispersant, and the reversible aggregation and redispersion characteristics of the particles may greatly fluctuate as the aggregation proceeds. This may cause changes in the electric field response (threshold characteristic), and result in nonuniform display. In the particle dispersion according to the present embodiment, this is counteracted with the use of the specific first polymer of the formula (1) as a polymer dispersant that controls the cohesive force between the particles. Because the first polymer is believed to suppress the progression of the time-dependent particle aggregation even after repeated reversible particle aggregation and redispersion, the fluctuations of the reversible particle aggregation and redispersion characteristics can be suppressed. Because the particle dispersion of the present embodiment can possibly suppress the progression of the time-dependent particle aggregation in display medium or display device applications, a stable recurrent display can be realized.

The particle dispersion according to the present embodiment is preferably configured so that the functional group of the colorant, or the functional group of the second polymer, if any, surrounding the colorant interacts with the functional group of the first polymer through acid-base interaction.

Specifically, the particle dispersion is preferably configured so that:

1) the colorant with a base, or the second polymer with a base surrounding the colorant is used in combination with the first polymer having an acid, or 2) the colorant with an acid, or the second polymer with an acid surrounding the colorant is used in combination with the first polymer having a base.

With these configurations, the particle dispersion according to the present embodiment suppresses fluctuations of the charge polarity of the particles that move depending on electric field in, for example, electrophoretic display medium applications. Particularly, the particles can be stabilized with the negative charge when the colorant with a base, or the second polymer with a base surrounding the colorant is used in combination with the first polymer having an acid.

In display medium or display device applications, the particle dispersion according to the present embodiment suppresses fluctuations of the charge polarity of the display particles. Specifically, mixing of colors can be suppressed in the display because fewer particles of the opposite polarity are present in the particles (a group of particles) of the same polarity.

3. Polymer Compound

The present invention is also concerned with the polymer compounds represented by the following formula (1').

$$(A^1\text{-}R^4\text{—}S)_n\text{—}R^1\text{—}(R^3\text{—}P^1)_m \qquad (1')$$

In the formula, $R^1$ represents an (m+n)-valent organic linking group; $R^4$ each represents a single bond or a divalent linking group; S represents a sulfur atom; $A^1$ each represents a monovalent organic group containing at least one group selected from an organic dye residue, a heterocyclic residue, acidic group, a group having a basic nitrogen atom, a urea group, a urethane group, a group having a coordinating oxygen atom, a hydrocarbon group of 4 or more carbon atoms, an alkoxysilyl group, an epoxy group, an isocyanate group, and a hydroxyl group; $A^1$ and $R^2$ with the subscript n each independently may be the same or different; m represents a number from 1 to 8, and n represents a number from 2 to 9, wherein m+n satisfies 3 to 10; $R^3$ each represents a single bond or a divalent linking group; $P^1$ represents a polymer backbone containing a Si atom, and may include a plurality of constituting units, $R^3$ and $P^1$ with the subscript m each independently may be the same or different, $P^1$ being represented by the following formula (2)

$$-(P^2)_x\text{—}(P^3)_y\text{—}P^4)_z \qquad (2)$$

wherein $P^2$ represents a constituting unit derived from a silicone macromer; $P^3$ represents a constituting unit that does not contain silicone, and that does not have an ionically dissociable group; $P^4$ represents a constituting unit that does not contain silicone, and that has an ionically dissociable group; x, y, and z each represent a molar fraction of the constituting unit, and x+y+z=100, wherein y and z may be 0, but are not simultaneously 0.

The groups in the formula have the same definitions and preferred ranges described above.

The weight-average molecular weight of the polymer compound of the present invention is, for example, desirably 10,000 to 1,000,000, more desirably 50,000 to 300,000. The weight-average molecular weight may be measured by GPC (Gel Permeation Chromatography).

The polymer compound of the present invention may be synthesized by using the foregoing first to fifth methods, and is preferably synthesized by using the fifth method.

The polymer compound of the present invention is useful in a variety of applications, including dispersants, and charge adjusters.

EXAMPLES

The present invention is described below in greater detail using Examples. The materials, reagents, amounts, proportions, procedures, and other conditions used in the following Examples may be appropriately varied, provided that such changes do not depart from the gist of the present invention. Accordingly, the scope of the present invention should not be narrowly interpreted within the limits of the concrete examples described below.

In the following, "parts" and "%" are "parts by mass" and "mass %", respectively, unless otherwise stated.

1. Synthesis Example (1) Synthesis Examples C-1 to C-31

Polymer compounds C-1 to C-31 (first polymers) represented by formula (1) were synthesized by using the methods below.

Synthesis of Mercaptan Compound Represented by Formula (5)

First, chain transfer agents B-1 to B-7 (mercaptan compounds represented by the formula (5)) were synthesized by using the following methods.

Synthesis Example B-1

Dipentaerythritol hexakis(3-mercaptopropionate) [DPMP; Sakai Chemical Industry Co., Ltd.] (7.83 parts), and compound (A-1) having the adsorption moiety below and carbon-carbon double bonds (15.57 parts) were dissolved in dimethylformamide (93.60 parts), and the mixture was heated to 70° C. under a stream of nitrogen. The mixture was heated for 3 hours after adding 2,2'-azobis(2,4-dimethylvaleronitrile) [V-65, Wako Pure Chemical Industries, Ltd.] (0.06 parts). After adding additional V-65 (0.06 parts), a reaction was allowed at 70° C. for 3 hours under a stream of nitrogen. A 20% solution of the mercaptan compound (chain transfer agent B-1) below was obtained upon cooling the mixture to room temperature.

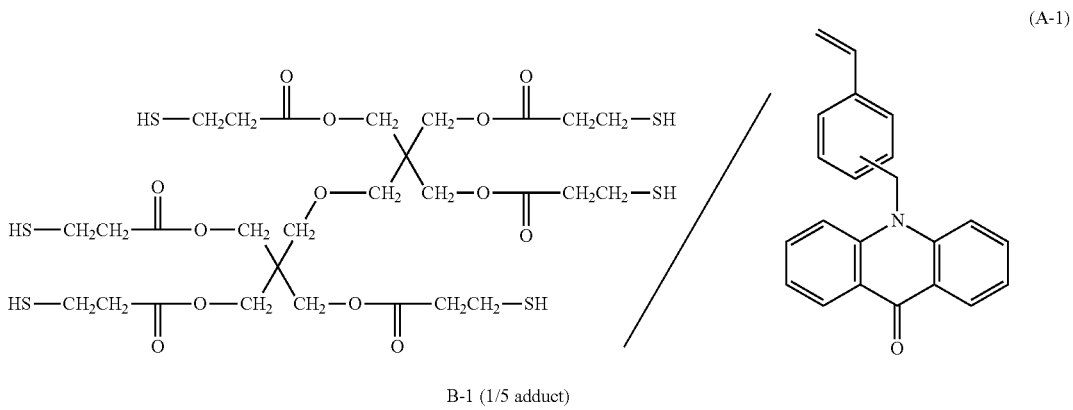

B-1 (1/5 adduct)

Synthesis Example B-2

A 20% solution of the mercaptan compound (chain transfer agent B-2) below was obtained in the same manner as in Synthesis Example B-1, except that the compound (A-1) having the adsorption moiety and carbon-carbon double bonds (15.57 parts), and dimethylformamide (93.60 parts) used in Synthesis Example B-1 were changed to compound (A-2) having an adsorption moiety and carbon-carbon double bonds (4.47 parts), and dimethylformamide (78.38 parts), respectively.

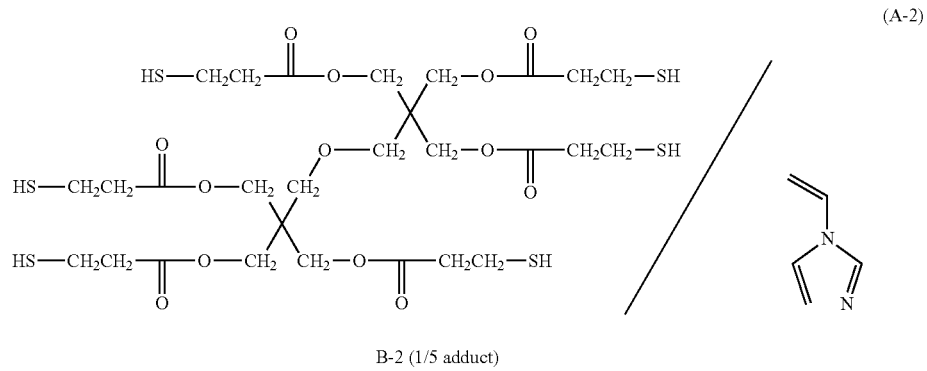

B-2 (1/5 adduct)

Synthesis Example B-3

A 20% solution of the mercaptan compound (chain transfer agent B-3) below was obtained in the same manner as in Synthesis Example B-1, except that the compound (A-1) having the adsorption moiety and carbon-carbon double bonds (15.57 parts), and dimethylformamide (93.60 parts) used in Synthesis Example B-1 were changed to compound (A-3) having an adsorption moiety and carbon-carbon double bonds (6.18 parts), and dimethylformamide (89.78 parts), respectively.

Synthesis Example B-5

A 20% solution of the mercaptan compound (chain transfer agent B-5) below was obtained in the same manner as in Synthesis Example B-1, except that the compound (A-1) having the adsorption moiety and carbon-carbon double bonds (15.57 parts), and dimethylformamide (93.60 parts) used in Synthesis Example B-1 were changed to compound (A-5) having an adsorption moiety and carbon-carbon double bonds (6.8 parts), and dimethylformamide (89.99 parts), respectively.

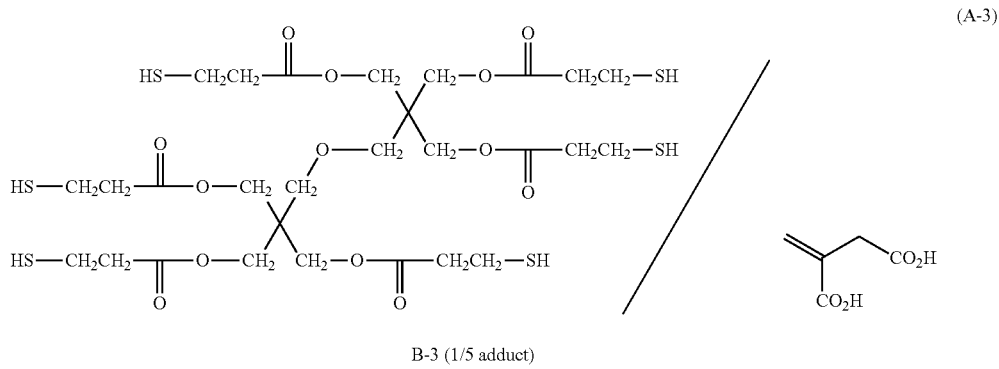

B-3 (1/5 adduct)

(A-3)

Synthesis Example B-4

A 20% solution of the mercaptan compound (chain transfer agent B-4) below was obtained in the same manner as in Synthesis Example B-1, except that the compound (A-1) having the adsorption moiety and carbon-carbon double bonds (15.57 parts), and dimethylformamide (93.60 parts) used in Synthesis Example B-1 were changed to compound (A-4) having an adsorption moiety and carbon-carbon double bonds (9.99 parts), and dimethylformamide (101.4 parts), respectively.

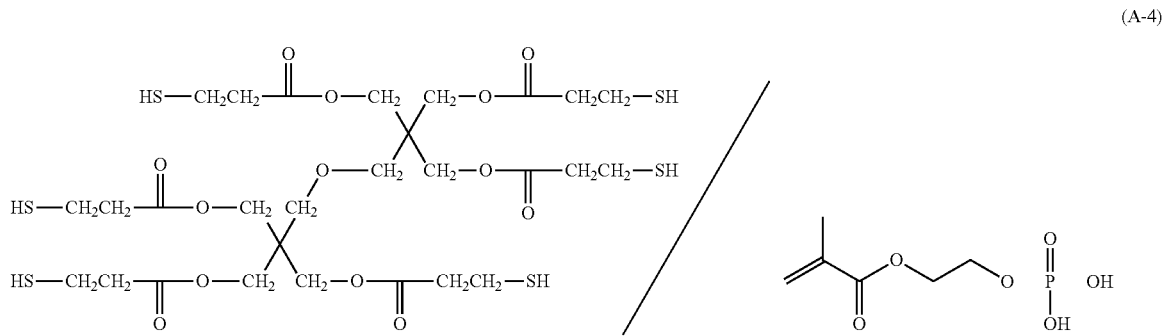

B-4 (1/5 adduct)

(A-4)

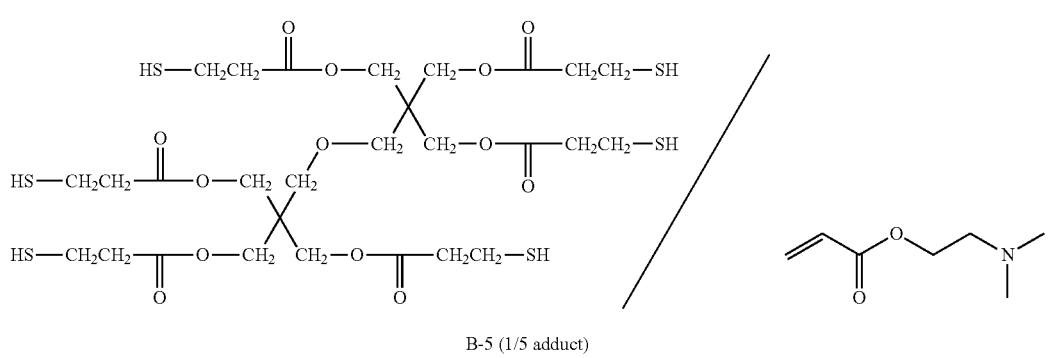

B-5 (1/5 adduct)

Synthesis Example B-6

A 30% solution of the mercaptan compound (chain transfer agent B-6) below was obtained in the same manner as in Synthesis Example B-1, except that the compound (A-1) having the adsorption moiety and carbon-carbon double bonds (15.57 parts), and dimethylformamide (93.60 parts) used in Synthesis Example B-1 were changed to compound (A-6) having an adsorption moiety and carbon-carbon double bonds (12.61 parts), and dimethylformamide (40.82 parts), respectively.

Synthesis Example B-1, except that the compound (A-1) having the adsorption moiety and carbon-carbon double bonds (15.57 parts), and dimethylformamide (93.60 parts) used in Synthesis Example B-1 were changed to compound (A-7) having an adsorption moiety and carbon-carbon double bonds (14.7 parts), and dimethylformamide (41.75 parts), respectively.

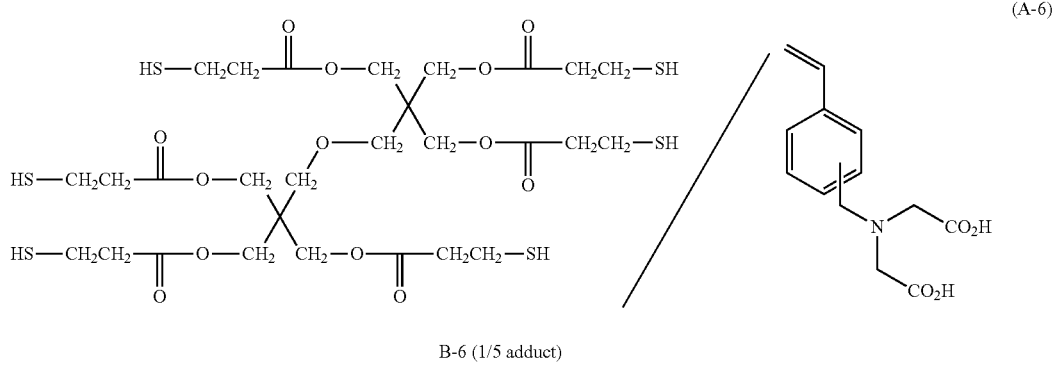

B-6 (1/5 adduct)

Synthesis Example B-7

A 30% solution of the mercaptan compound (chain transfer agent B-7) below was obtained in the same manner as in

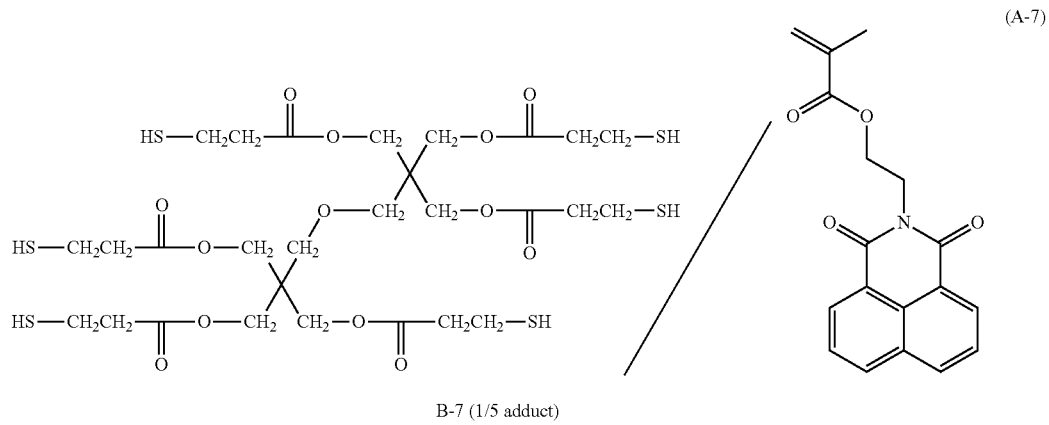

B-7 (1/5 adduct)

Synthesis of Polymer Compounds C-1 to C-31 (First Polymers) Represented by Formula (1)

Polymer compounds C-1 to C-31 (first polymers) were synthesized by using the methods below.

Synthesis Example C-1

A mixed solution of the 20% solution of the chain transfer agent B-1 obtained in Synthesis Example B-1 (46.80 parts), FM-0711 (Si-containing monomer; 14.65 parts), methyl methacrylate (MMA; monomer; 2.20 parts), and methacrylic acid (MAA; monomer; 3.15 parts) was heated to 80° C. under a stream of nitrogen. The mixture was heated for 3 hours after adding 2,2'-azobis(isobutyronitrile) [AIBN, Wako Pure Chemical Industries, Ltd.] (0.005 parts), and a reaction was allowed at 80° C. for 3 hours under a stream of nitrogen by re-addition of AIBN (0.005 parts). The mixture was cooled to room temperature, and diluted with acetone. After being reprecipitated with large amounts of methanol, the product was vacuum dried to obtain a solid of the polymer compound below (C-1: a weight-average molecular weight of 32,000 in terms of polystyrene; first polymer; 19 parts).

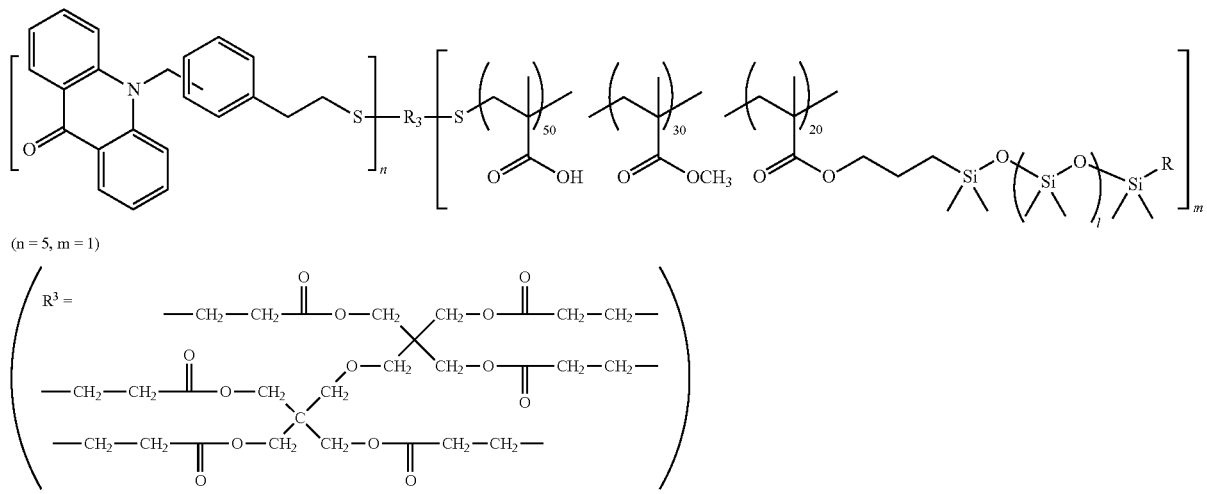

Synthesis Example C-2

A solid of the polymer compound below (C-2: a weight-average molecular weight of 15,000 in terms of polystyrene; first polymer; 19 parts) was obtained in the same manner as in Synthesis Example C-1, except that the AIBN used in 0.005 parts in Synthesis Example C-1 was used in 0.010 parts.

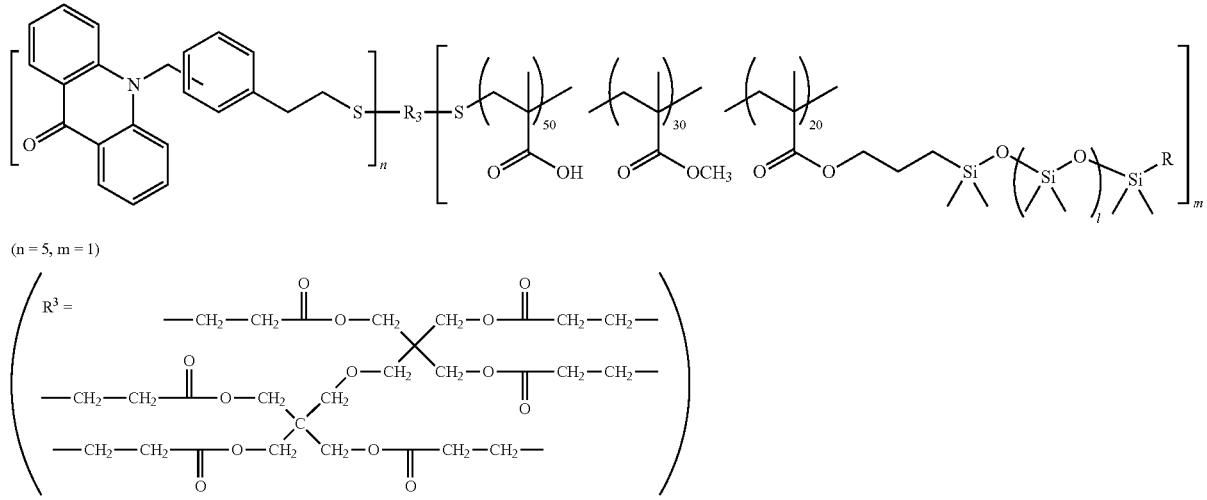

Synthesis Example C-3

A solid of the polymer compound below (C-3: a weight-average molecular weight of 6,000 in terms of polystyrene; first polymer; 19 parts) was obtained in the same manner as in Synthesis Example C-1, except that the AIBN used in 0.005 parts in Synthesis Example C-1 was used in 0.020 parts.

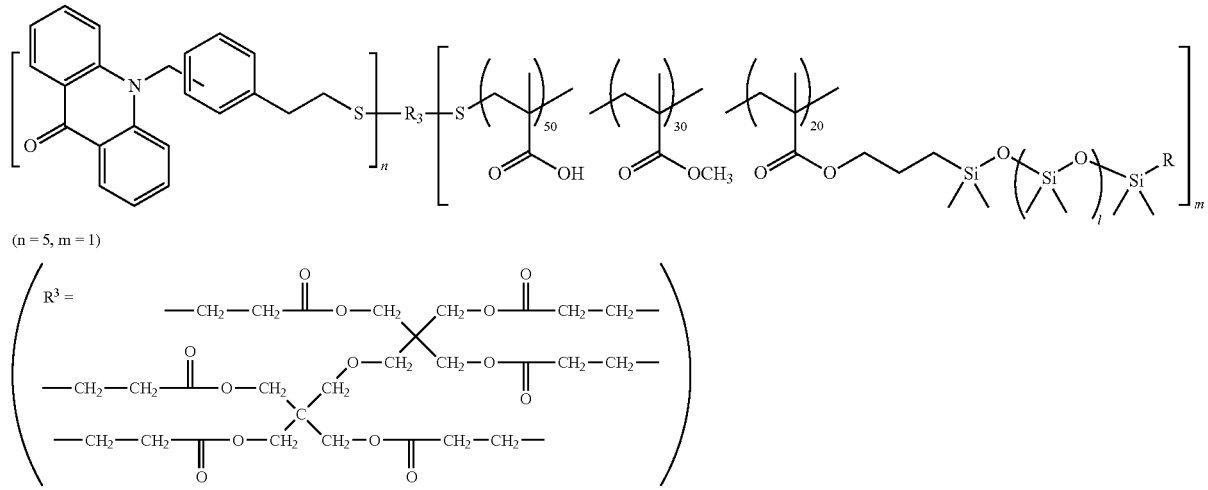

C-3

(n = 5, m = 1)

Synthesis Examples C-4 to C-31

Polymer compounds C-4 to C-31 (first polymers) were produced in the same manner as in Synthesis Example C-1, except that the chain transfer agent species, the type and amount of monomer, the AIBN amount, and the reprecipitation method were changed as shown in Tables 1 and 2.

TABLE 1

| Synthesis Example | Chain transfer agent | Si monomer | Undis-sociable monomer | Dissociable monomer | AIBN (parts) | Yield (%) | Weight-average molecular weight |
|---|---|---|---|---|---|---|---|
| C-1 | B-1 | FM-0711: 20 mol % | MMA: 30 mol % | MAA: 50 mol % | 0.005 | 19 | 32000 |
| C-2 | B-1 | FM-0711: 20 mol % | MMA: 30 mol % | MAA: 50 mol % | 0.01 | 19 | 15000 |
| C-3 | B-1 | FM-0711: 20 mol % | MMA: 30 mol % | MAA: 50 mol % | 0.02 | 19 | 6000 |
| C-4 | B-1 | FM-0711: 20 mol % | MMA: 50 mol % | MAA: 30 mol % | 0.01 | 19 | 18000 |
| C-5 | B-1 | FM-0711: 40 mol % | MMA: 10 mol % | MAA: 50 mol % | 0.01 | 19 | 21000 |
| C-6 | B-1 | FM-0711: 20 mol % | MMA: 80 mol % | — | 0.01 | 19 | 12000 |
| C-7 | B-1 | FM-0711: 20 mol % | — | MAA: 80 mol % | 0.01 | 19 | 12000 |
| C-8 | B-1 | FM-0711: 20 mol % | PEG: 30 mol % | MAA: 50 mol % | 0.01 | 19 | 15000 |
| C-9 | B-2 | FM-0711: 20 mol % | MMA: 30 mol % | MAA: 50 mol % | 0.01 | 19 | 15000 |
| C-10 | B-2 | FM-0711: 20 mol % | PEG: 30 mol % | MAA: 50 mol % | 0.01 | 16 | 23000 |
| C-11 | B-2 | FM-0711: 20 mol % | MMA: 80 mol % | — | 0.01 | 19 | 16000 |
| C-12 | B-3 | FM-0711: 20 mol % | MMA: 30 mol % | MAA: 50 mol % | 0.005 | 19 | 32000 |
| C-13 | B-3 | FM-0711: 20 mol % | MMA: 30 mol % | MAA: 50 mol % | 0.01 | 19 | 15000 |
| C-14 | B-3 | FM-0711: 20 mol % | MMA: 30 mol % | MAA: 50 mol % | 0.02 | 19 | 6000 |
| C-15 | B-3 | FM-0711: 20 mol % | MMA: 50 mol % | MAA: 30 mol % | 0.01 | 19 | 18000 |
| C-16 | B-3 | FM-0711: 40 mol % | MMA: 10 mol % | MAA: 50 mol % | 0.01 | 19 | 21000 |
| C-17 | B-3 | FM-0711: 20 mol % | MMA: 80 mol % | — | 0.01 | 19 | 12000 |
| C-18 | B-3 | FM-0711: 20 mol % | — | MAA: 80 mol % | 0.01 | 19 | 12000 |
| C-19 | B-3 | FM-0711: 20 mol % | PEG: 30 mol % | MAA: 50 mol % | 0.01 | 16 | 15000 |
| C-20 | B-4 | FM-0711: 20 mol % | MMA: 30 mol % | MAA: 50 mol % | 0.01 | 19 | 14000 |
| C-21 | B-4 | FM-0711: 20 mol % | PEG: 30 mol % | MAA: 50 mol % | 0.01 | 16 | 23000 |
| C-22 | B-4 | FM-0711: 20 mol % | MMA: 80 mol % | — | 0.01 | 19 | 16000 |
| C-23 | B-5 | FM-0711: 20 mol % | MMA: 30 mol % | MAA: 50 mol % | 0.01 | 19 | 17000 |
| C-24 | B-5 | FM-0711: 20 mol % | PEG: 30 mol % | MAA: 50 mol % | 0.01 | 16 | 24000 |
| C-25 | B-5 | FM-0711: 20 mol % | MMA: 80 mol % | — | 0.01 | 19 | 19000 |
| C-26 | B-6 | FM-0711: 20 mol % | MMA: 30 mol % | MAA: 50 mol % | 0.01 | 19 | 15000 |
| C-27 | B-6 | FM-0711: 20 mol % | PEG: 30 mol % | MAA: 50 mol % | 0.01 | 16 | 23000 |
| C-28 | B-6 | FM-0711: 20 mol % | MMA: 80 mol % | — | 0.01 | 19 | 16000 |
| C-29 | B-7 | FM-0711: 20 mol % | MMA: 30 mol % | MAA: 50 mol % | 0.01 | 19 | 16000 |
| C-30 | B-7 | FM-0711: 20 mol % | PEG: 30 mol % | MAA: 50 mol % | 0.01 | 16 | 21000 |
| C-31 | B-7 | FM-0711: 20 mol % | MMA: 80 mol % | — | 0.01 | 19 | 17000 |

The structures of the polymer compounds synthesized above are presented below. The symbols (for example, C-4) correspond to the Synthesis Example Numbers used in Table 1.
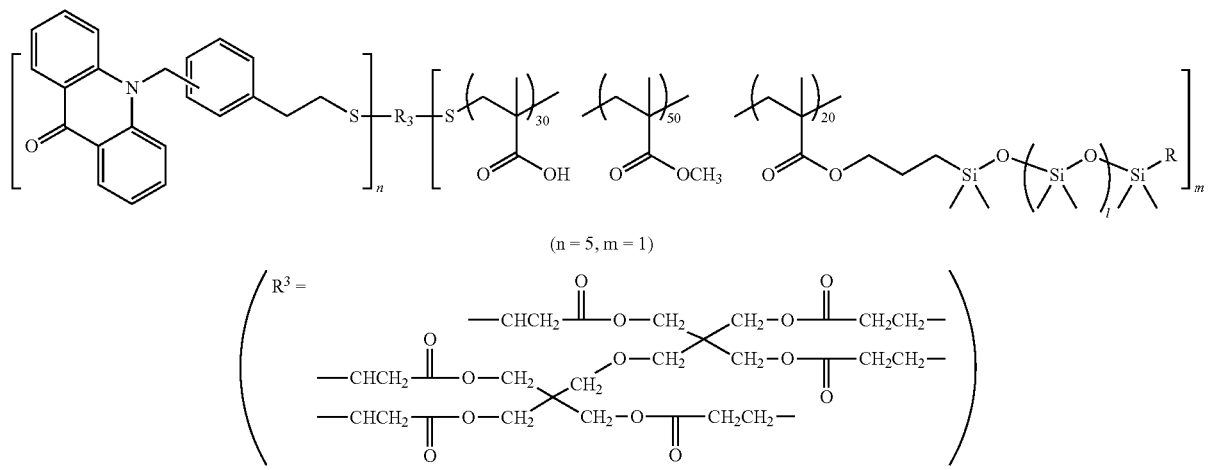
C-4
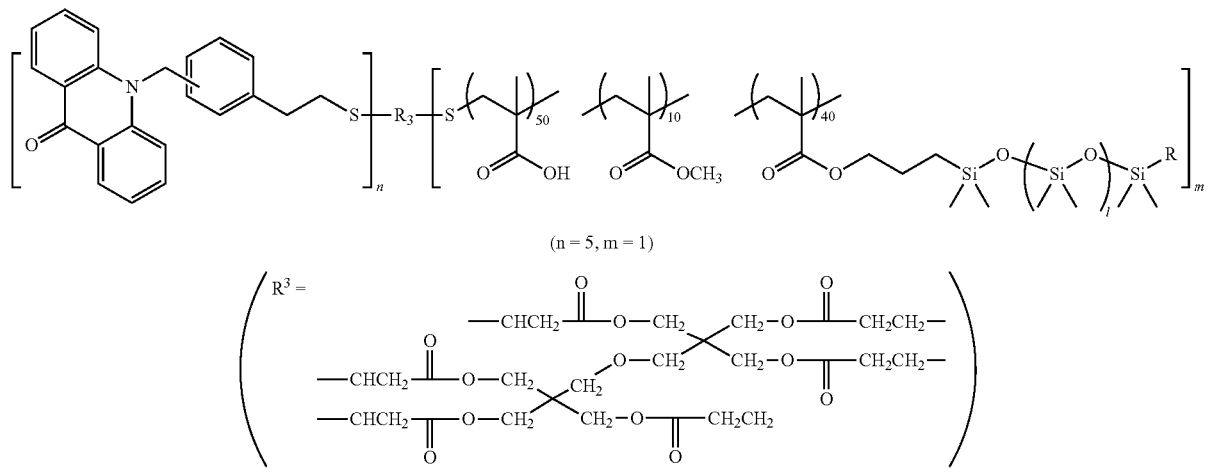
C-5
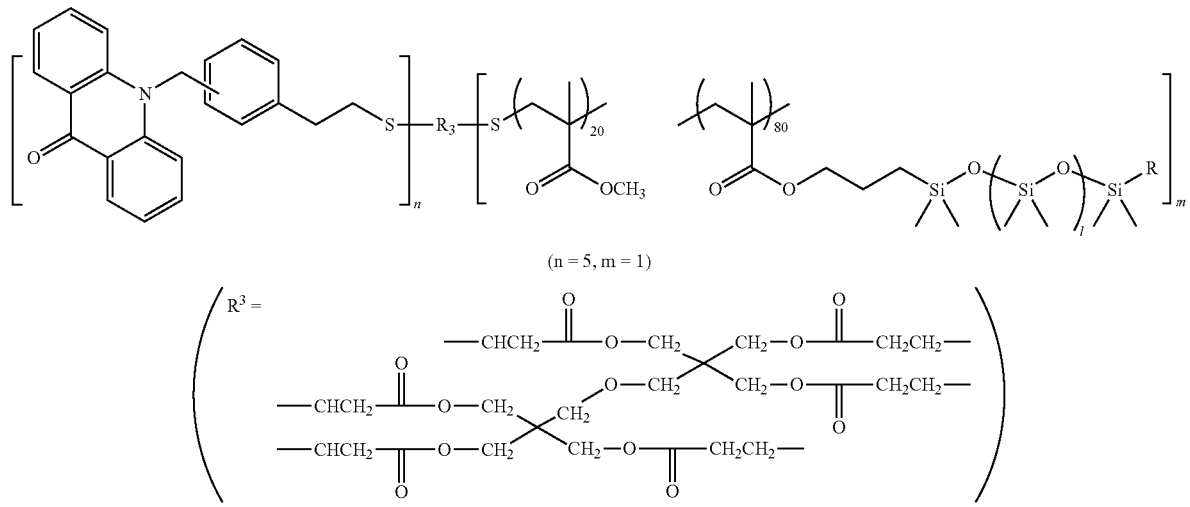
C-6

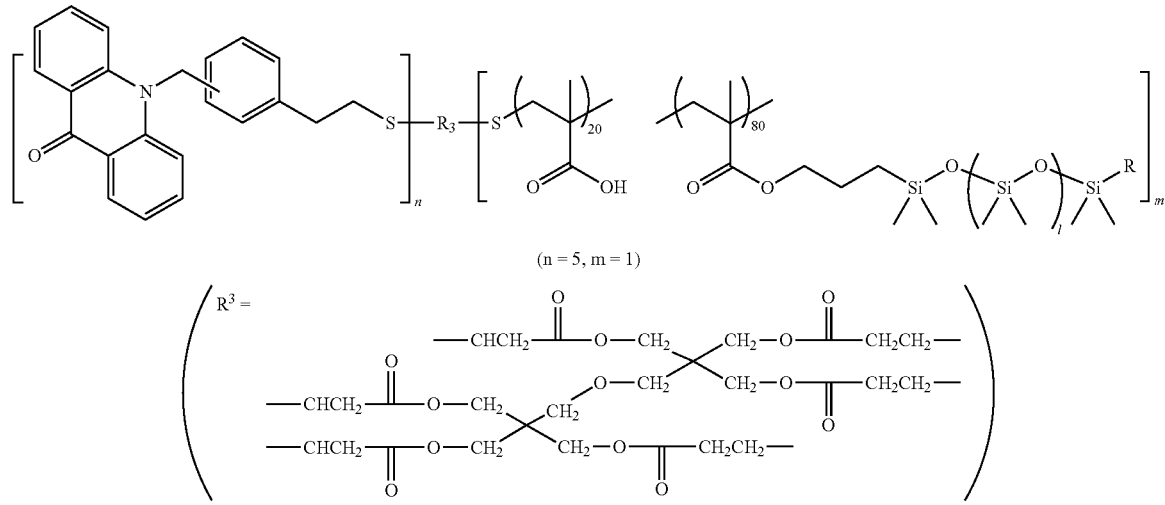
C-7
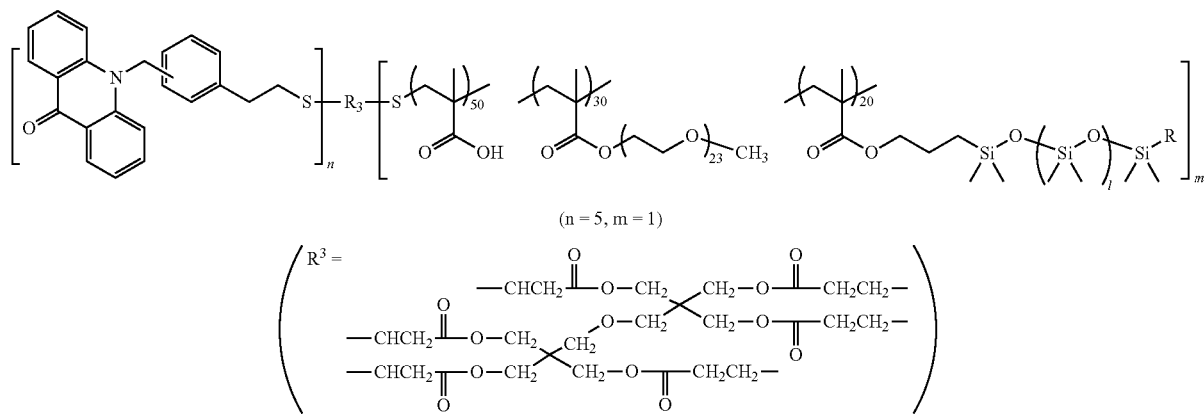
C-8
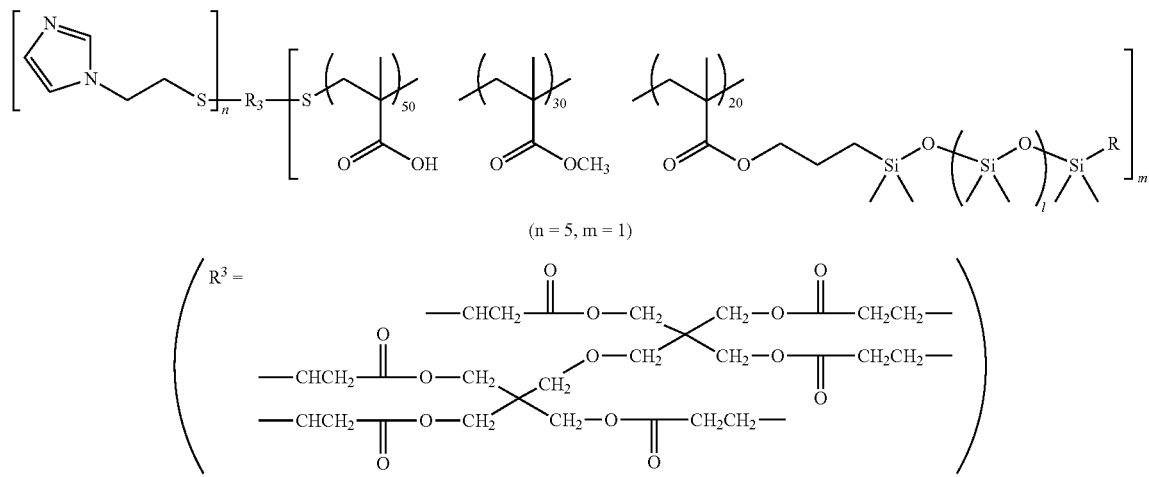
C-9

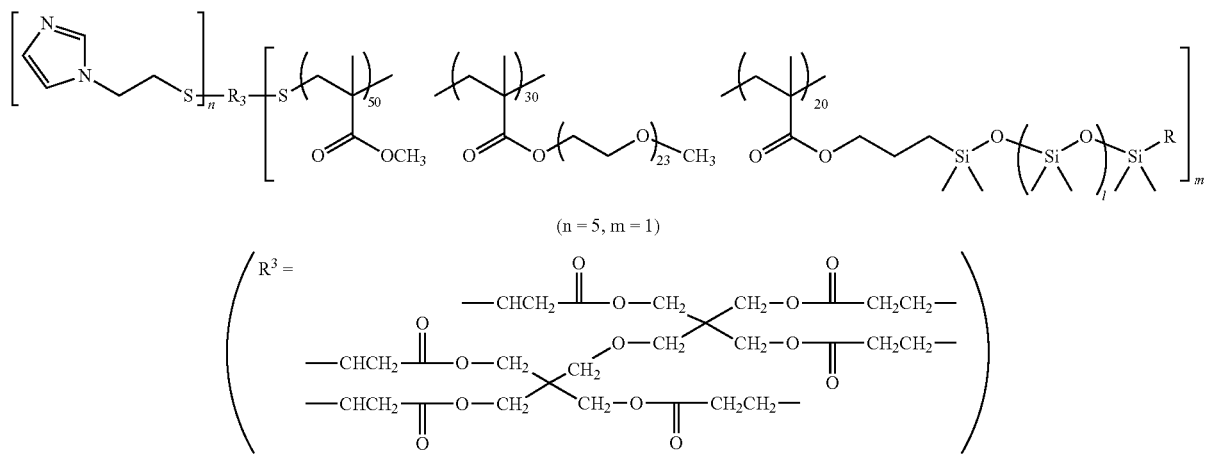
C-10
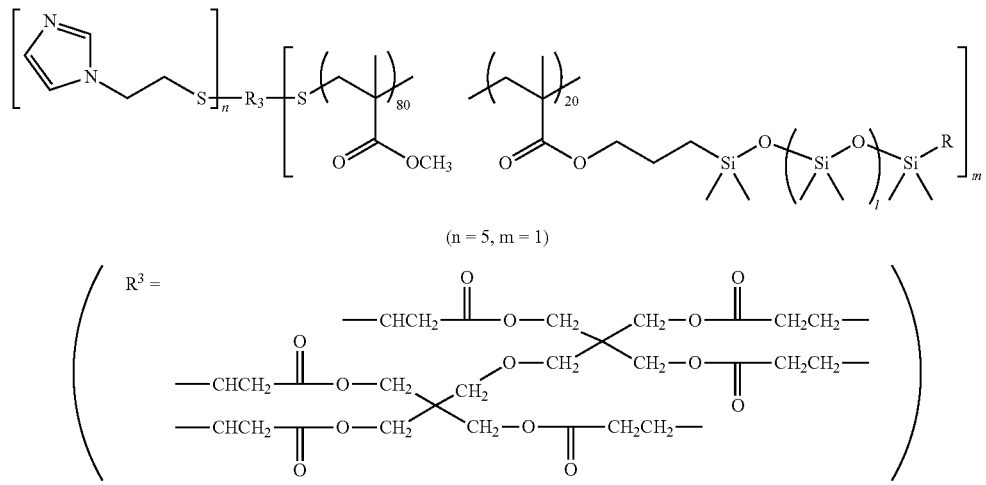
C-11
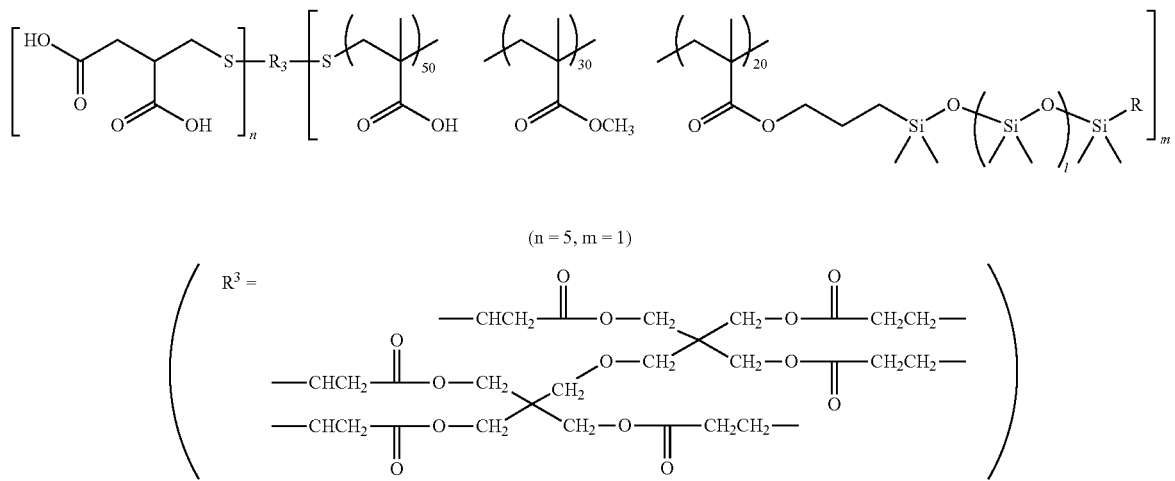
C-12

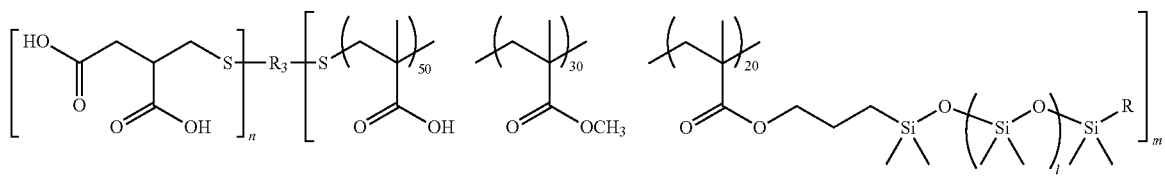
C-13
(n = 5, m = 1)
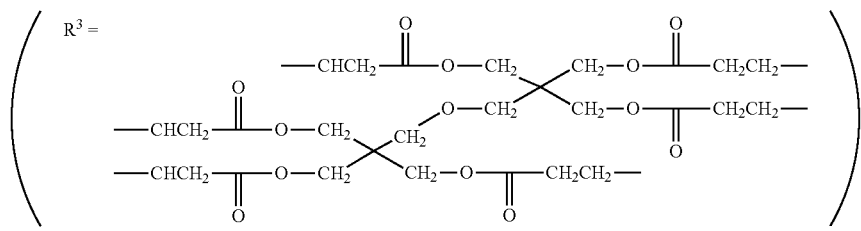
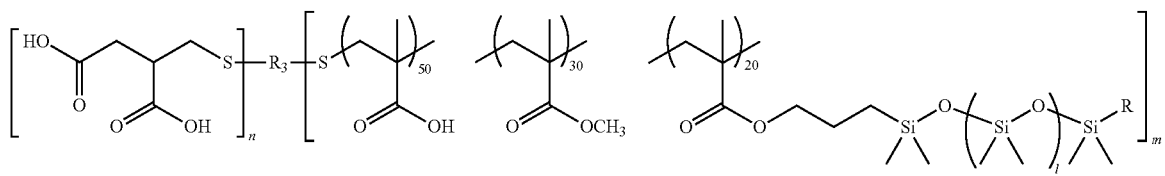
C-14
(n = 5, m = 1)
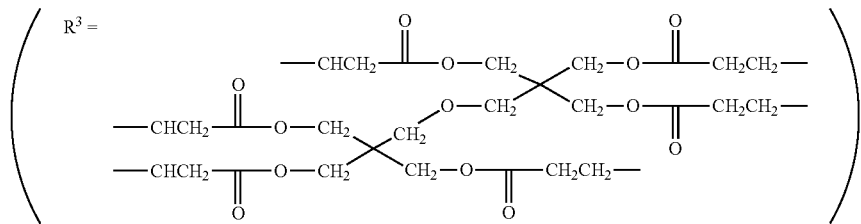
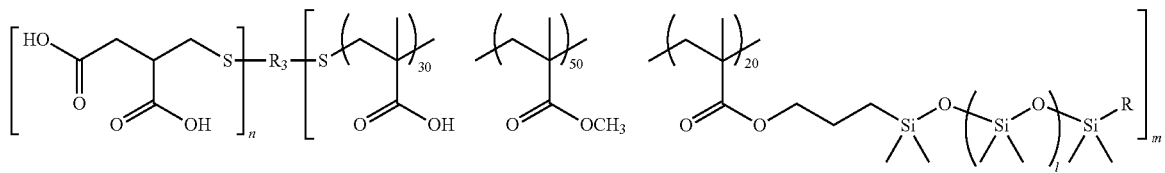
C-15
(n = 5, m = 1)
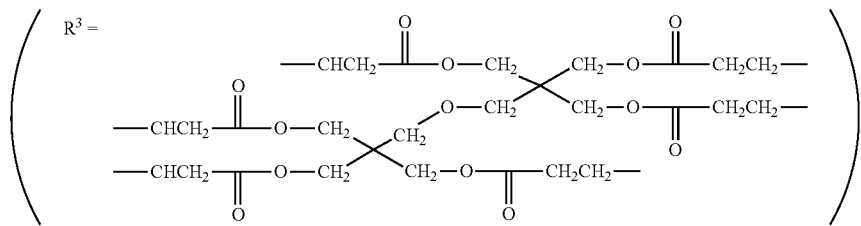

-continued
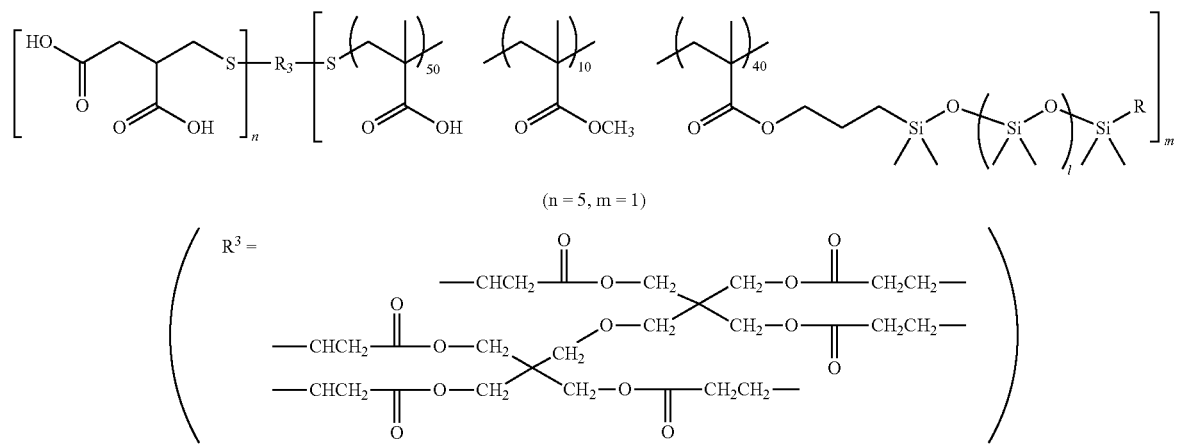
C-16
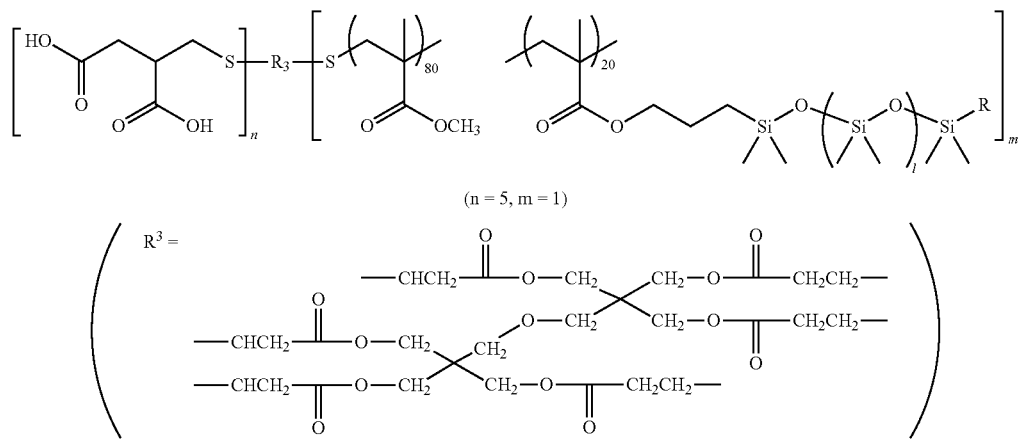
C-17
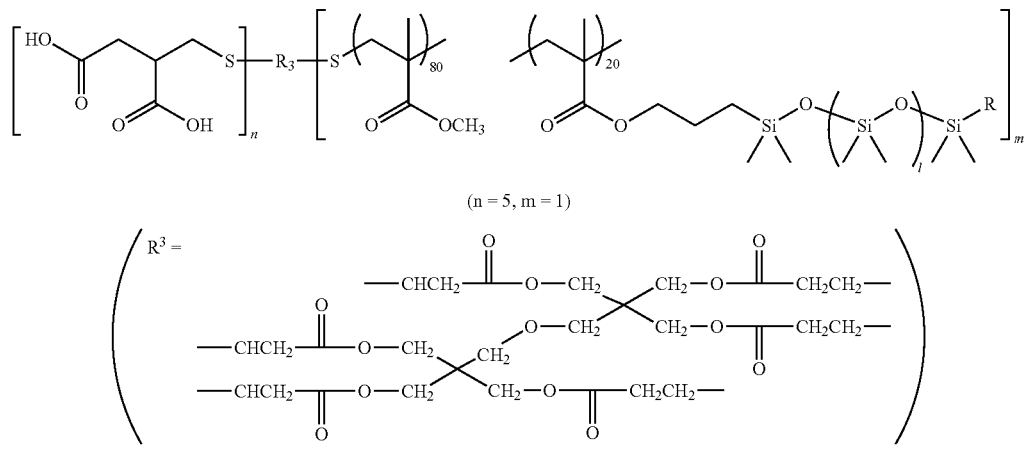
C-18

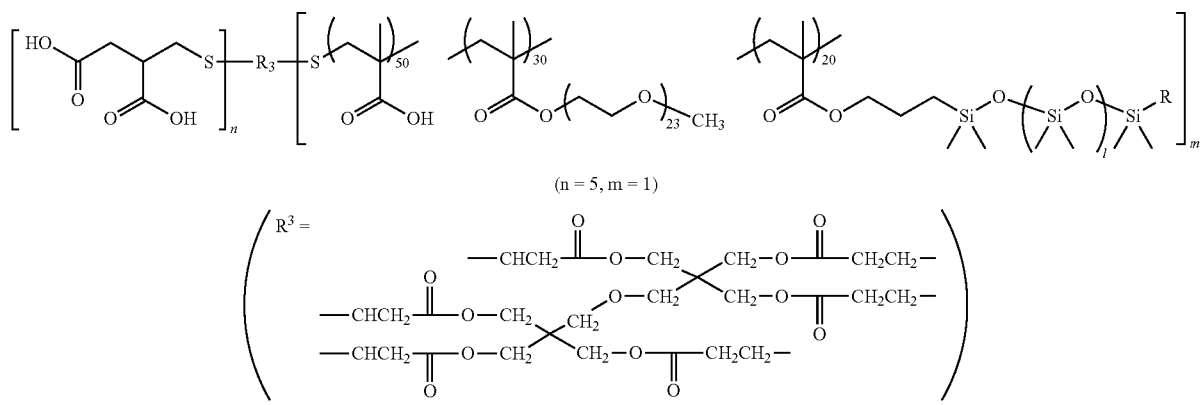
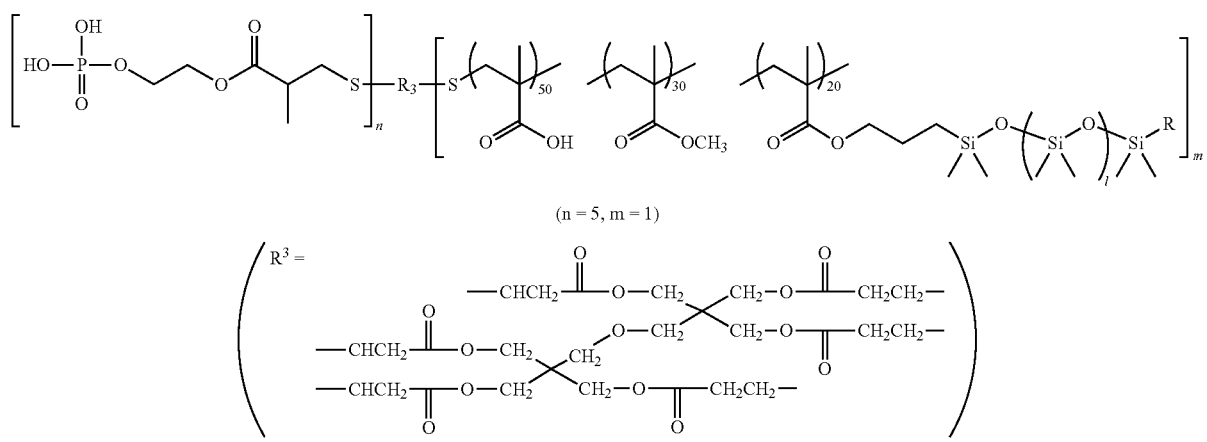
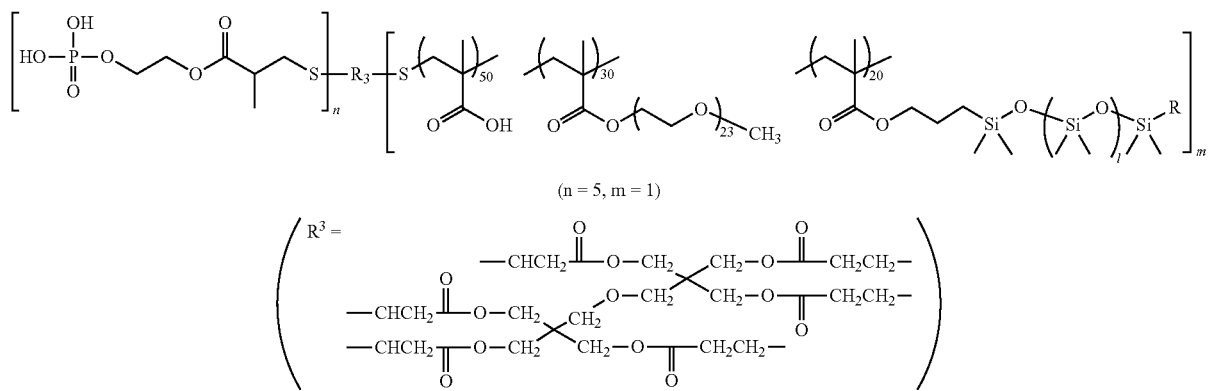

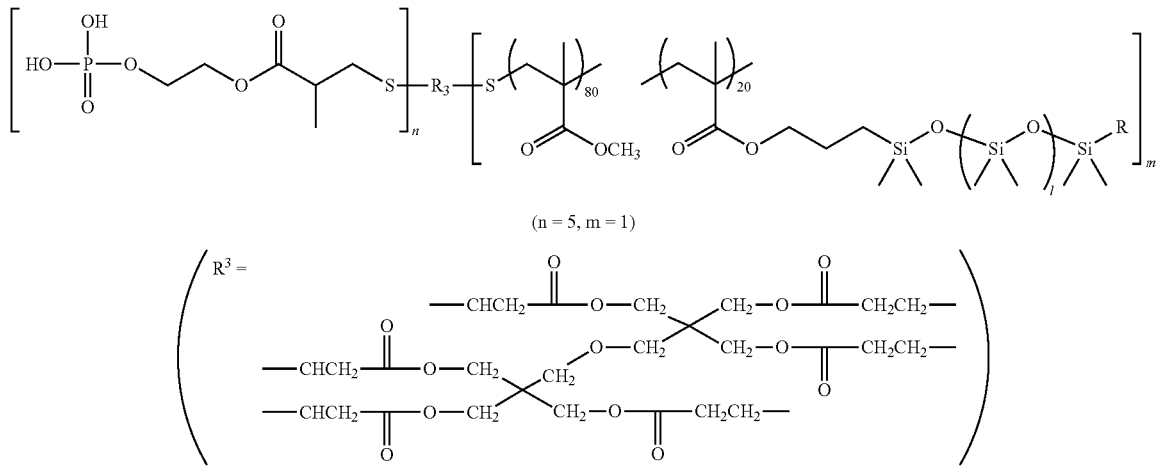
C-22
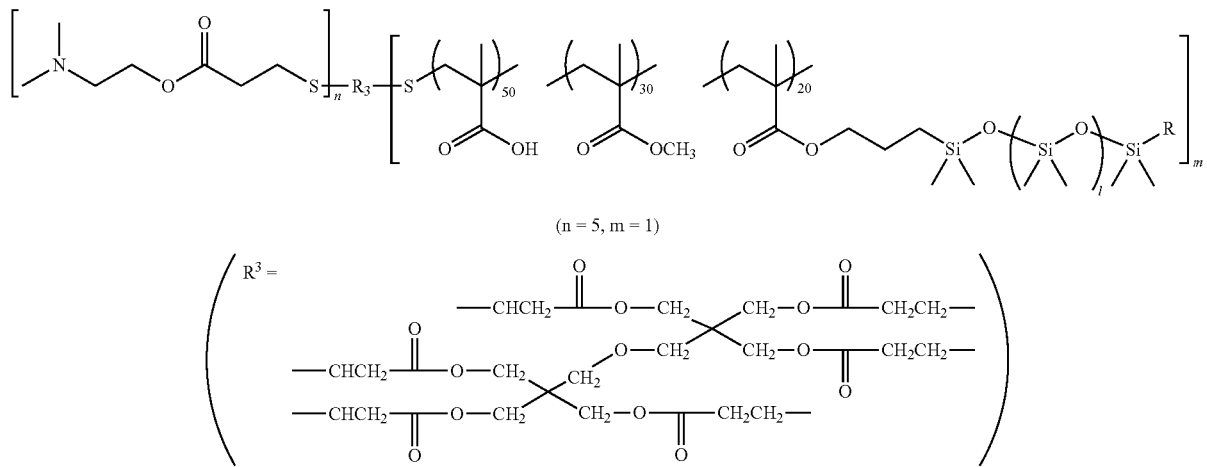
C-23
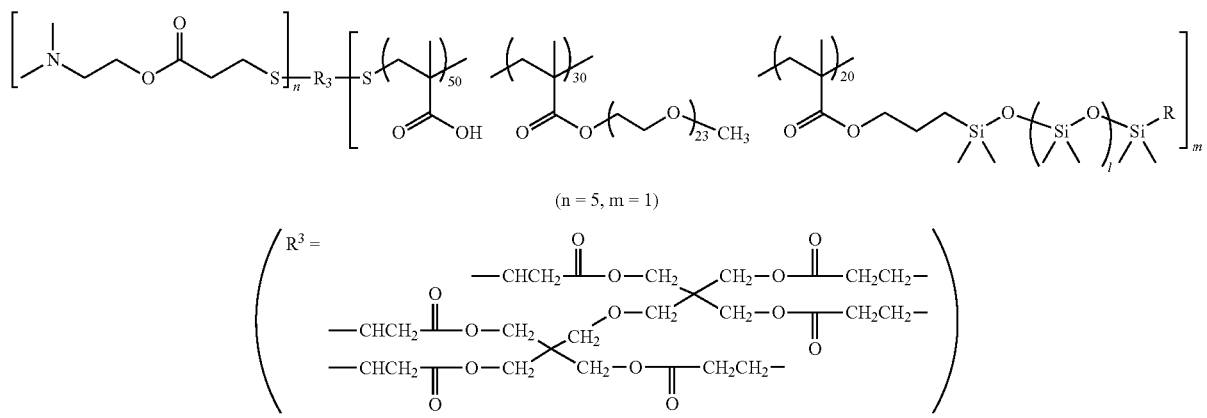
C-24

C-25
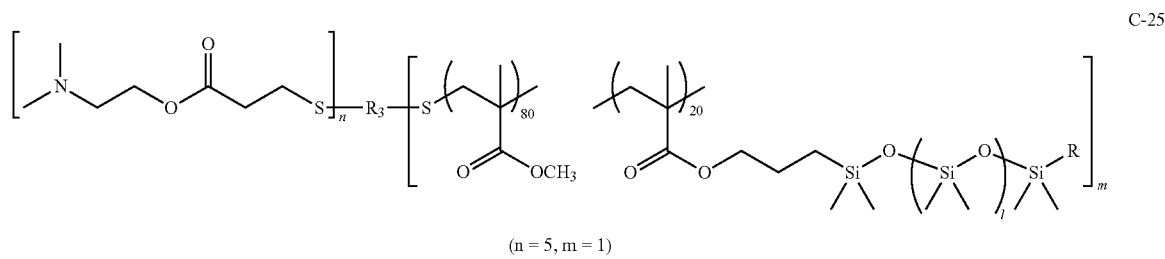
(n = 5, m = 1)
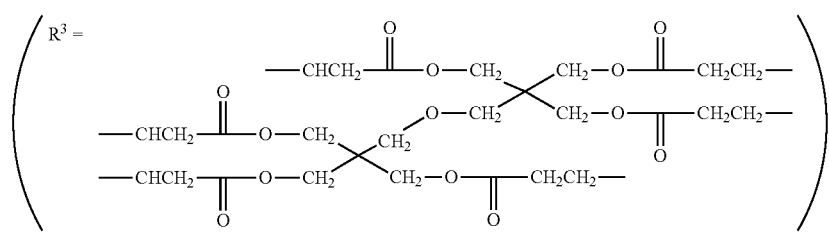
C-26
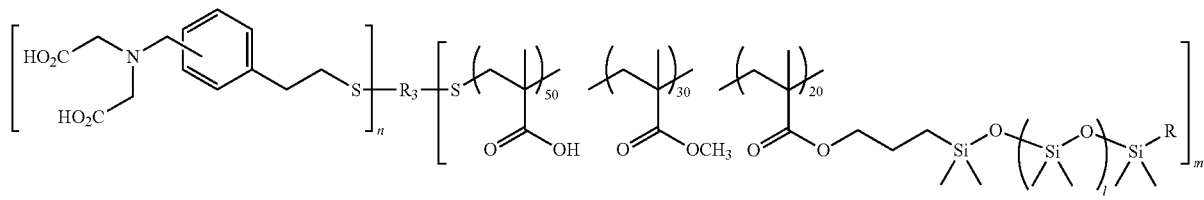
(n = 5, m = 1)
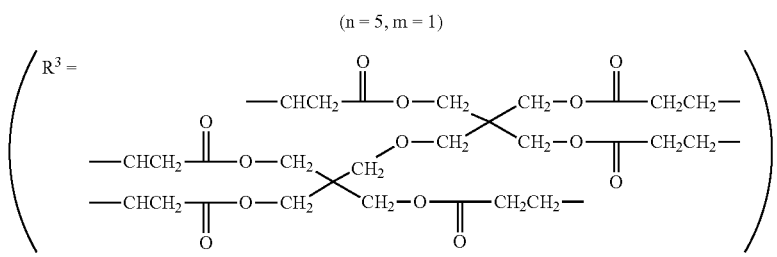
C-27
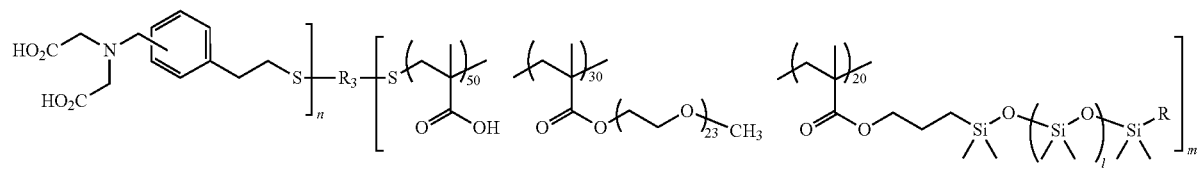
(n = 5, m = 1)
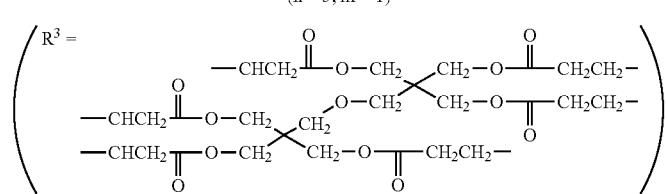

-continued
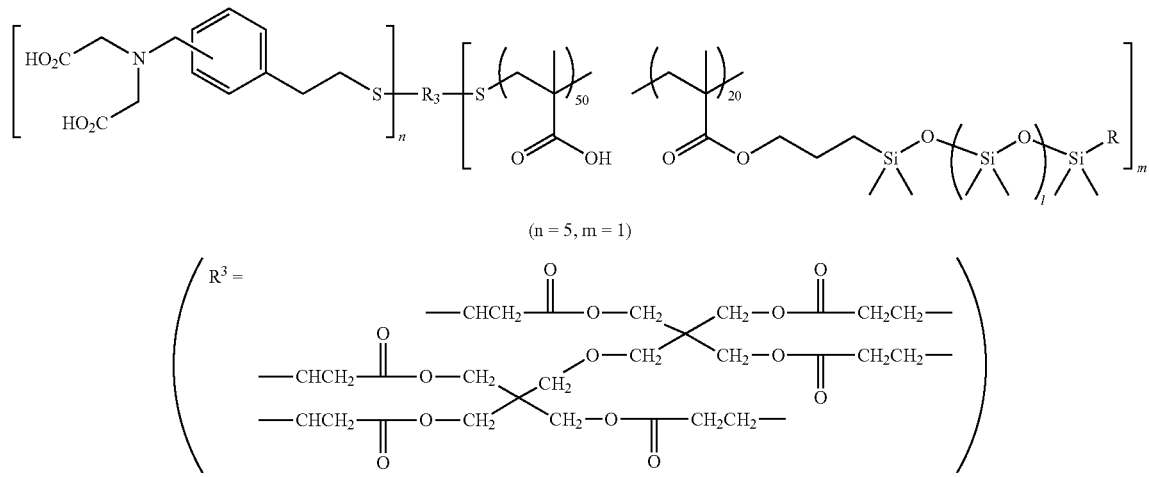
C-28
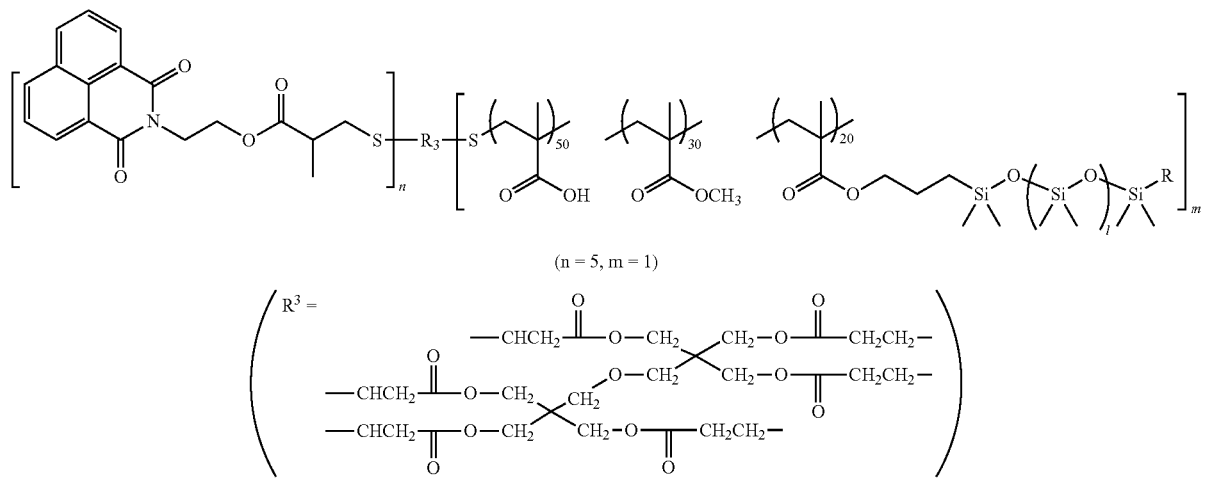
C-29
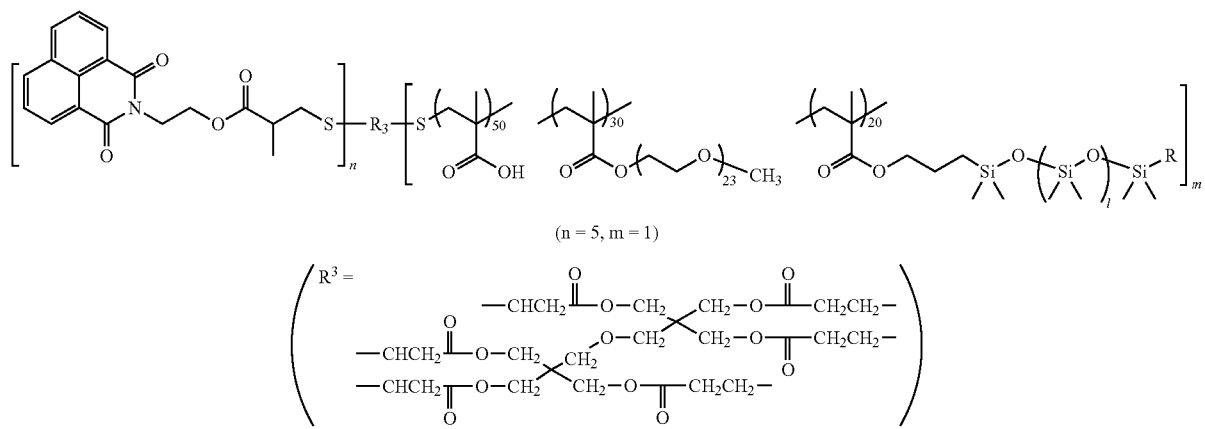
C-30

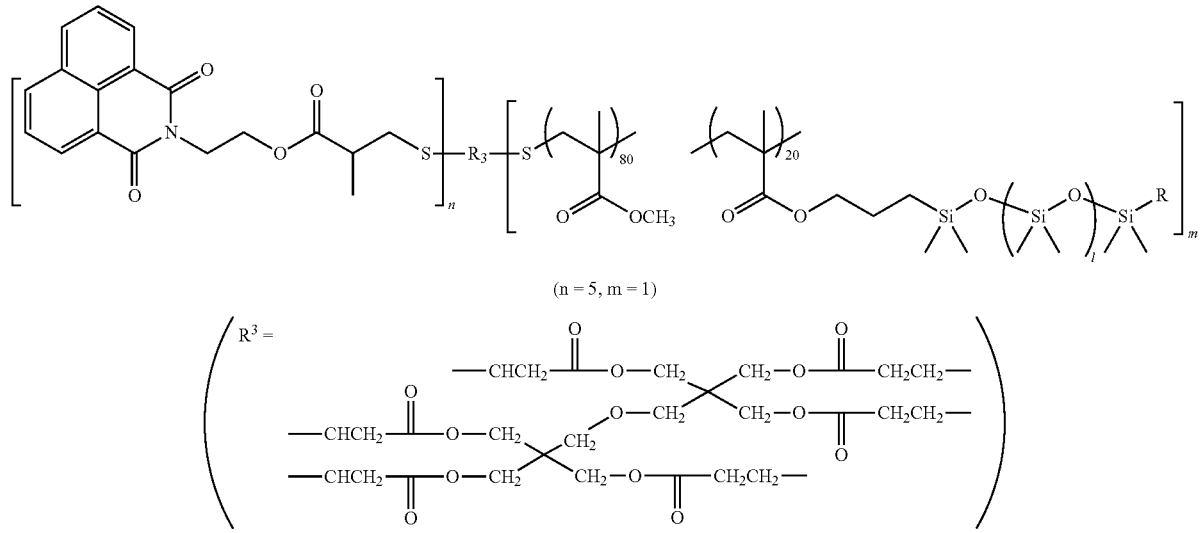

C-31

(n = 5, m = 1)

2. Preparation of Colorant-Containing Particles and Colorant-Containing Particle Dispersion 1) Example A Example A-1

Preparation of Cyan Particles (Positively Charged Particles) and Particle Dispersion (Production of Second Polymer Having Amino Group)

First, N-vinylpyrrolidone (85 parts by mass), Silaplane FM-0721 (silicone chain monomer; 10 parts by mass), and diethylaminoethylmethacrylate (monomer with a charged group; 5 parts by mass) were mixed with isopropyl alcohol (100 parts by mass). After dissolving AIBN (polymerization initiator; 0.2 parts by mass), polymerization was performed at 70° C. for 6 hours under nitrogen. The product was purified with cyclohexane used as a reprecipitation solvent, and dried to obtain a polymer.

The polymer was soluble in distilled water, and was soluble even at 30 mass % concentration, and did not form any precipitate. These results showed that the polymer was a water-soluble polymer.

(Preparation of Colorant-Containing Particles and Particle Dispersion)

A 10 mass % aqueous solution of the polymer (3 parts by mass) was mixed with 1 part by mass of a water-dispersed pigment solution (Unisperse; cyan color; Ciba; pigment concentration 26 mass %) to prepare an aqueous solution of the polymer and the pigment. Thereafter, silicone-modified acryl polymer KP545 (emulsifier; Shin-Etsu Chemical Co., Ltd.) was added to a dimethyl silicone oil (KF-96-2CS; Shin-Etsu Silicone) to prepare a 3 mass % silicone solution of KP545. After mixing the aqueous solution with the 3 mass % silicone solution of KP545 (10 parts by mass), the materials were dispersed with a ultrasonic homogenizer to prepare a suspension of the polymer- and pigment-containing aqueous solution dispersed in the silicone oil (viscosity 2 cs).

The suspension was heated (70° C.) under reduced pressure (2 KPa) to remove moisture, and a particle dispersion containing the polymer- and pigment-containing particles in the silicone oil was obtained. Ethyl bromide (0.1 parts by mass) was added to the particle dispersion, and the dispersion was heated at 80° C. for 2 hours to transform the amino of the monomer component diethylaminoethylmethacrylate of the polymer to quaternary amino. The unreacted ethyl bromide was then removed under reduced pressure. The solid content of the resulting particle dispersion was 8.2 mass % as calculated by mass measurements before and after drying the silicone oil. The volume average particle diameter of the particles in the dispersion was 260 nm as measured by using a laser light scattering and diffracting grain size measurement device (Horiba LA-300).

The polymer compound C-1 (0.5 parts by mass) obtained above was added to 100 parts by mass of the cyan particle dispersion A (solid content 1.5%) to obtain colorant-containing particles, and a particle dispersion.

The polarity of the cyan particle group in the dispersion was found to be positive after a charge polarity evaluation in which the dispersion was sealed between a pair of electrode substrates, and electrophoresed under applied DC voltage to check the direction of movement.

Examples A-2 to A-31, and Comparative Examples A-1 to A-4

Particle dispersions were prepared in the same manner as in Example A1, except that the polymer compound species (first polymer) and the polymer compound concentration were changed as shown in the table below.

Synthesis of Polymer Dispersant C-32 of Comparative Example

Silaplane FM0711 (Chisso; 4.5 parts by mass), methacrylic acid (Wako Pure Chemical Industries, Ltd.; 0.5 parts by mass), isopropyl alcohol (solvent; 10 parts by mass), V-65 (azobisdimethylvaleronitrile; Wako Pure Chemical Industries, Ltd.; polymerization initiator; 0.02 parts by mass) were mixed, and reacted at 55° C. for 24 hours after sufficient nitrogen displacement. After the polymerization, the product was dried under reduced pressure to remove the solvent and the unreacted monomer, and a comparative polymer dispersant C-32 was obtained after purification. The yield was 98%. A GPC molecular weight measurement revealed that the weight-average molecular weight was 120,000 in terms of a polystyrene standard.

Synthesis of Polymer Dispersant C-33 of Comparative Example

A 20% solution of the chain transfer agent B-1 obtained in Synthesis Example B-1 (46.80 parts), and methyl methacrylate (MMA; monomer; 20 parts) were heated to 80° C. under a stream of nitrogen. The mixture was heated for 3 hours after adding 2,2'-azobis(isobutyronitrile) [AIBN, Wako Pure Chemical Industries, Ltd.; 0.013 parts], and a reaction was allowed at 80° C. for another 3 hours under a stream of nitrogen by re-addition of AIBN (0.013 parts). The mixture was cooled to room temperature, diluted with acetone, and reprecipitated with large amounts of methanol. The product was then vacuum dried to obtain a solid of a polymer dispersant (C-33: a weight-average molecular weight of 14,000 in terms of polystyrene; 19 parts) of Comparative Example.

Synthesis of Polymer Dispersant C-34 of Comparative Example

A 20% solution of the chain transfer agent B-1 obtained in Synthesis Example B-3 (46.80 parts), and methyl methacrylate (MMA; monomer; 20 parts) were heated to 80° C. under a stream of nitrogen. The mixture was heated for 3 hours after adding 2,2'-azobis(isobutyronitrile) [AIBN, Wako Pure Chemical Industries, Ltd.; 0.013 parts], and a reaction was allowed at 80° C. for another 3 hours under a stream of nitrogen by re-addition of AIBN (0.013 parts). The mixture was cooled to room temperature, diluted with acetone, and reprecipitated with large amounts of methanol. The product was then vacuum dried to obtain a solid of a polymer dispersant (C-44: a weight-average molecular weight of 14,000 in terms of polystyrene; 19 parts) of Comparative Example.

[Evaluation]

Each particle dispersion was evaluated in the manner described below.

(Viscosity Measurement and Evaluation)

Each particle dispersion was measured for viscosity $\eta^1$ immediately after being dispersed, and viscosity $\eta^2$ one week (at room temperature) after being dispersed, using an E type viscometer. The extent of thickening was then evaluated. The evaluation results are presented in the table below. Lower viscosities mean more desirable dispersibility and dispersion stability.

TABLE 2

| Example | Synthesis example | Initial viscosity η1 (immediately after being dispersed) | Viscosity η2 (after 1 week) | Δη |
|---|---|---|---|---|
| A-1 | C-1 | 16 | 20 | 4 |
| A-2 | C-2 | 16 | 17 | 1 |
| A-3 | C-3 | 16 | 19 | 3 |
| A-4 | C-4 | 22 | 27 | 5 |
| A-5 | C-5 | 21 | 26 | 5 |
| A-6 | C-6 | 25 | 31 | 6 |
| A-7 | C-7 | 19 | 22 | 3 |
| A-8 | C-8 | 15 | 15 | 0 |
| A-9 | C-9 | 16 | 17 | 1 |
| A-10 | C-10 | 15 | 16 | 1 |
| A-11 | C-11 | 19 | 22 | 3 |
| A-12 | C-12 | 11 | 13 | 2 |
| A-13 | C-13 | 10 | 11 | 1 |
| A-14 | C-14 | 11 | 13 | 2 |

TABLE 2-continued

| Example | Synthesis example | Initial viscosity η1 (immediately after being dispersed) | Viscosity η2 (after 1 week) | Δη |
|---|---|---|---|---|
| A-15 | C-15 | 13 | 15 | 2 |
| A-16 | C-16 | 16 | 21 | 5 |
| A-17 | C-17 | 17 | 22 | 5 |
| A-18 | C-18 | 17 | 21 | 4 |
| A-19 | C-19 | 10 | 10 | 0 |
| A-20 | C-20 | 8 | 9 | 1 |
| A-21 | C-21 | 7 | 7 | 0 |
| A-22 | C-22 | 8 | 9 | 1 |
| A-23 | C-23 | 15 | 17 | 2 |
| A-24 | C-24 | 14 | 15 | 1 |
| A-25 | C-25 | 16 | 19 | 3 |
| A-26 | C-26 | 9 | 10 | 1 |
| A-27 | C-27 | 8 | 8 | 0 |
| A-28 | C-28 | 9 | 11 | 2 |
| A-29 | C-29 | 18 | 19 | 1 |
| A-30 | C-30 | 16 | 16 | 0 |
| A-31 | C-31 | 18 | 20 | 2 |
| A-32 | C-32 | 36 | 48 | 12 |
| A-33 | C-33 | 98 | 156 | 58 |
| A-34 | C-34 | 75 | 130 | 55 |

(2) Example B

Example B-1

Preparation of Magenta Particles B (Particles with Acid Group: Negatively Charged Particles) and Particle Dispersion (Production of Second Polymer having Carboxyl Group)

First, 2-hydroxyethylacrylate (85 parts by mass), Silaplane FM-0721 (silicone chain monomer; 10 parts by mass), and methacrylic acid (monomer with a charged group; 5 parts by mass) were mixed with isopropyl alcohol (100 parts by mass). After dissolving AIBN (2,2'-azobis(isobutyronitrile); polymerization initiator; 0.2 parts by mass), polymerization was performed at 70° C. for 6 hours under nitrogen. The product was purified with cyclohexane used as a reprecipitation solvent, and dried to obtain a polymer.

The polymer was soluble in distilled water, and was soluble even at 30 mass % concentration, and did not form any precipitate. These results showed that the polymer was a water-soluble polymer.

(Preparation of Colorant-Containing Particles and Particle Dispersion)

A 10 mass % aqueous solution of the polymer (3 parts by mass) was mixed with 1 part by mass of a water-dispersed pigment solution (Unisperse; magenta color; Ciba; pigment concentration 16 mass %) to prepare an aqueous solution of the polymer and the pigment. Thereafter, silicone-modified acryl polymer KP545 (emulsifier; Shin-Etsu Chemical Co., Ltd.) was added to a dimethyl silicone oil (KF-96-2CS; Shin-Etsu Silicone) to prepare a 3 mass % silicone solution of KP545. After mixing the aqueous solution with the 3 mass % silicone solution of KP545 (10 parts by mass), the materials were dispersed with a ultrasonic homogenizer to prepare a suspension of the polymer- and pigment-containing aqueous solution dispersed in the silicone oil (viscosity 2 cs).

The suspension was heated (70° C.) under reduced pressure (2 KPa) for 2 hours to remove moisture, and a particle dispersion containing the polymer- and pigment-containing particles in the silicone oil was obtained. A chemically equimolar amount of trihexylamine was then added to the particle dispersion to form methacrylic acid and a salt as the monomer components of the polymer.

The solid content of the resulting particle dispersion was 7.2 mass % as calculated by mass measurements before and after drying the silicone oil. The volume average particle diameter of the electrophoretic particles in the dispersion was 280 nm as measured by using a laser light scattering and diffracting grain size measurement device (Horiba LA-300).

The polymer dispersant C-1 (0.5 parts by mass) obtained above was added to 100 parts by mass of the magenta particle dispersion B (solid content 1.5%) to obtain a particle dispersion.

The polarity of the magenta particle group in the dispersion was found to be negative after a charge polarity evaluation in which the dispersion was sealed between a pair of electrode substrates, and electrophoresed under applied DC voltage to check the direction of movement.

Examples B-2 to B-31, and Comparative Examples B-1 to B-4

Particle dispersions were prepared in the same manner as in Example B1, except that the polymer compound species (first polymer), and the polymer compound concentration were changed as shown in the table below.

[Evaluation]

The particle dispersions were evaluated in the manner described below.

(Viscosity Measurement and Evaluation)

The particle dispersions were measured for viscosity $\eta^1$ immediately after being dispersed, and viscosity $\eta^2$ one week (at room temperature) after being dispersed, using an E type viscometer. The extent of thickening was then evaluated. The evaluation results are presented in the table below. Lower viscosities mean more desirable dispersibility and dispersion stability.

TABLE 3

| Example | Synthesis example | Initial viscosity η1 (immediately after being dispersed) | Viscosity η2 (after 1 week) | Δη |
|---|---|---|---|---|
| B-1 | C-1 | 11 | 13 | 2 |
| B-2 | C-2 | 10 | 11 | 1 |
| B-3 | C-3 | 11 | 13 | 2 |
| B-4 | C-4 | 13 | 15 | 2 |
| B-5 | C-5 | 16 | 21 | 5 |
| B-6 | C-6 | 17 | 22 | 5 |
| B-7 | C-7 | 17 | 21 | 4 |
| B-8 | C-8 | 10 | 10 | 0 |
| B-9 | C-9 | 8 | 9 | 1 |
| B-10 | C-10 | 7 | 7 | 0 |
| B-11 | C-11 | 8 | 9 | 1 |
| B-12 | C-12 | 16 | 20 | 4 |
| B-13 | C-13 | 16 | 17 | 1 |
| B-14 | C-14 | 16 | 19 | 3 |
| B-15 | C-15 | 22 | 27 | 5 |
| B-16 | C-16 | 21 | 26 | 5 |
| B-17 | C-17 | 25 | 31 | 6 |
| B-18 | C-18 | 19 | 22 | 3 |
| B-19 | C-19 | 15 | 15 | 0 |
| B-20 | C-20 | 16 | 17 | 1 |
| B-21 | C-21 | 15 | 16 | 1 |
| B-22 | C-22 | 19 | 22 | 3 |
| B-23 | C-23 | 9 | 10 | 1 |
| B-24 | C-24 | 8 | 8 | 0 |
| B-25 | C-25 | 9 | 11 | 2 |
| B-26 | C-26 | 15 | 17 | 2 |
| B-27 | C-27 | 14 | 15 | 1 |
| B-28 | C-28 | 16 | 19 | 3 |
| B-29 | C-29 | 18 | 19 | 1 |
| B-30 | C-30 | 16 | 16 | 0 |
| B-31 | C-31 | 18 | 20 | 2 |
| B-32 | C-32 | 36 | 48 | 12 |
| B-33 | C-33 | 78 | 132 | 54 |
| B-34 | C-34 | 98 | 156 | 58 |

While the present invention has been described in detail and with reference to specific embodiments thereof, it will be apparent to one skilled in the art that various changes and modifications can be made therein without departing from the spirit and scope thereof.

The present disclosure relates to the subject matter contained in International Application No. PCT/JP2012/070955, filed Aug. 20, 2012, and Japanese Application No. 2011-184367, filed Aug. 26, 2011, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A colorant-containing particle that comprises a colorant, a first polymer represented by the following formula (1), and a second polymer having a charged group:

$$(A^1-R^2)_n-R^1-(R^3-P^1)_m \qquad (1)$$

wherein $R^1$ represents an (m+n)-valent organic linking group; $R^2$ each represents a single bond or a divalent linking group; $A^1$ each represents a monovalent organic group containing at least one selected from the group consisting of an organic dye residue, a heterocyclic residue, an acidic group, a group having a basic nitrogen atom, a urea group, a urethane group, a group having a coordinating oxygen atom, a hydrocarbon group of 4 or more carbon atoms, an alkoxysilyl group, an epoxy group, an isocyanate group, and a hydroxyl group; n groups of $A^1$ may be the same or different; n groups of $R^2$ may be the same or different; m represents a number from 1 to 8, n represents a number from 2 to 9, wherein m+n satisfies 3 to 10; $R^3$ each represents a single bond or a divalent linking group; $P^1$ represents a polymer backbone containing a Si atom, and may include a plurality of constituting units; m groups of $R^3$ may be the same or different; and m groups of $P^1$ may be the same or different;

wherein one of the following conditions is met:

(i) $A^1$ is an acidic group, and the charged group of the second polymer is a basic group; or (ii) $A^1$ is a basic group, and the charged group of the second polymer is an acidic group.

2. The colorant-containing particle according to claim 1, wherein the first polymer has a constituting unit derived from a silicone macromer having a weight-average molecular weight of 1,000 to 10,000.

3. The colorant-containing particle according to claim 1, wherein $P^1$ in the formula (1) is a polymer backbone represented by the following formula (2):

$$-(P^2)_x-(P^3)_y-(P^4)_z \qquad (2)$$

wherein $P^2$ represents a constituting unit derived from a silicone macromer; $P^3$ represents a constituting unit that does not contain silicone, and that does not have an ionically dissociable group; $P^4$ represents a constituting unit that does not contain silicone, and that has an ionically dissociable group; x, y, and z each represent a molar fraction of the constituting unit, and x+y+z=100 wherein y and z may be 0, but are not simultaneously 0.

4. The colorant-containing particle according to claim 3, wherein, in the formula (2), x is 10 to 30, y is 10 to 30, and z is 40 to 80.

5. The colorant-containing particle according to claim 1, wherein the colorant-containing particle is an electrophoretic particle.

6. A color-containing particle dispersion that comprises a colorant-containing particle and a dispersion medium, wherein the colorant-containing particle comprises a colorant, a first polymer represented by the following formula (1), and a second polymer having a charged group:

$$(A^1-R^2)_n-R^1-(R^3-P^1)_m \qquad (1)$$

wherein $R^1$ represents an (m+n)-valent organic linking group; $R^2$ each represents a single bond or a divalent linking group; $A^1$ each represents a monovalent organic group containing at least one selected from the group consisting of an organic dye residue, a heterocyclic residue, an acidic group, a group having a basic nitrogen atom, a urea group, a urethane group, a group having a coordinating oxygen atom, a hydrocarbon group of 4 or more carbon atoms, an alkoxysilyl group, an epoxy group, an isocyanate group, and a hydroxyl group; n groups of $A^1$ may be the same or different; n groups of $R^2$ may be the same or different; m represents a number from 1 to 8, n represents a number from 2 to 9, wherein m+n satisfies 3 to 10; $R^3$ each represents a single bond or a divalent linking group; $P^1$ represents a polymer backbone containing a Si atom, and may include a plurality of constituting units; m groups of $R^3$ may be the same or different; and m groups of $P^1$ may be the same or different;

wherein one of the following conditions is met:
(i) $A^1$ is an acidic group, and the charged group of the second polymer is a basic group; or
(ii) $A^1$ is a basic group, and the charged group of the second polymer is an acidic group.

7. The colorant-containing particle dispersion according to claim 6, wherein the dispersion medium contains at least one selected from silicone oil and paraffinic hydrocarbon.

8. A polymer compound represented by the following formula (1'):

$$(A^1-R^4-S)_n-R^1-(R^3-P^1)_m \qquad (1')$$

wherein $R^1$ represents an (m+n)-valent organic linking group; $R^4$ each represents a single bond or a divalent linking group; S represents a sulfur atom; $A^1$ each represents a monovalent organic group containing at least one selected from the group consisting of an organic dye residue, a heterocyclic residue, an acidic group, a group having a basic nitrogen atom, a urea group, a urethane group, a group having a coordinating oxygen atom, a hydrocarbon group of 4 or more carbon atoms, an alkoxysilyl group, an epoxy group, an isocyanate group, and a hydroxyl group; n groups of $A^1$ may be the same or different; n groups of $R^4$ may be the same or different; m represents a number from 1 to 8, n represents a number from 2 to 9, wherein m+n satisfies 3 to 10; $R^3$ each represents a single bond or a divalent linking group; $P^1$ represents a polymer backbone containing a Si atom, and may include a plurality of constituting units; m groups of $R^3$ may be the same or different; m groups of $P^1$ may be the same or different and are a polymer backbone represented by the following formula (2):

$$-(P^2)_x-(P^3)_y-(P^4)_z \qquad (2)$$

wherein $P^2$ represents a constituting unit derived from a silicone macromer; $P^3$ represents a constituting unit that does not contain silicone, and that does not have an ionically dissociable group; $P^4$ represents a constituting unit that does not contain silicone, and that has an ionically dissociable group; x, y, and z each represent a molar fraction of the constituting unit, and x+y+z=100, wherein y and z may be 0, but are not simultaneously 0.

9. The colorant-containing particle according to claim 1, wherein $A^1$ in the formula (1) is an acidic group, the charged group of the second polymer is a basic group, and the colorant is a colorant with a base.

10. The colorant-containing particle according to claim 1, wherein $A^1$ in the formula (1) is a basic group, the charged group of the second polymer is an acidic group, and the colorant is a colorant with an acid.

* * * * *